United States Patent [19]

Scott, Jr.

[11] 4,338,553

[45] Jul. 6, 1982

[54] CONTROL SYSTEM FOR A MOTOR ACTUATED DOOR OPERATING MECHANISM

[76] Inventor: Waller M. Scott, Jr., Madison and Red Bank Rds., Cincinnati, Ohio 45227

[21] Appl. No.: 100,313

[22] Filed: Dec. 4, 1979

[51] Int. Cl.³ .......................................... H02P 1/04
[52] U.S. Cl. ................................. 318/266; 318/466; 49/31
[58] Field of Search ............... 318/468, 466, 470, 739, 318/749, 778, 781, 282, 286, 603, 626, 256, 264, 265, 266, 640, 480; 49/29–31

[56] References Cited

U.S. PATENT DOCUMENTS

| 4,035,702 | 7/1977 | Pettersen et al. | 318/256 |
| 4,134,050 | 1/1979 | Sibalis | 49/28 |
| 4,234,833 | 11/1980 | Barrett | 318/468 |

*Primary Examiner*—Gene Z. Rubinson
*Attorney, Agent, or Firm*—Wood, Herron & Evans

[57] ABSTRACT

A system is disclosed for controlling a motor which drives an operating mechanism for moving a door, such as an overhead garage door, in either direction between a closed position and an open position in response to actuation of a start switch. The control system includes an encoder including a rotatable disc driven by the motor and control circuitry including an encoder pulse verification circuit associated with the encoder for detecting the direction of door movement as well as increments of travel by the door when the door is moved by the motor under control of a motor command circuit in response to actuation of the start switch. The start switch and a start circuit cooperate with the motor command circuit for energizing the motor to move the door in one direction, for de-energizing the motor to stop the door at any position, and for re-energizing the motor to reverse the door in response to repeated actuation of the start switch. An up/down counter circuit is responsive to the direction as well as the increments of travel by the door for containing a count representative of the actual position of the door. A programming circuit is included for setting an up limit setpoint which is stored in a latch circuit. A decoder circuit cooperates with the motor command circuit, the up/down counter circuit, the latch circuit, and a comparator circuit for de-energizing the motor when the door reaches the up limit setpoint as the door is opened. The decoder circuit cooperates with the motor command circuit and the up/down counter circuit for de-energizing the motor when the door reaches the threshold as the door is closed. An obstruction detector circuit is responsive to rate of movement of the door for sensing an obstruction. The obstruction detector circuit cooperates with the motor command circuit for de-energizing the motor if an obstruction is sensed as the door is opened and cooperates with the motor command circuit, the up/down counter circuit, and the decoder circuit for reversing the motor if an obstruction is sensed as the door is closed unless the door is a predetermined distance or less above the threshold whereupon reversal of the motor is inhibited and the motor is merely de-energized. A reset circuit is included for resetting the control circuitry so that the initial actuation of the start switch will cause the door to be opened. Other features are also disclosed.

30 Claims, 12 Drawing Figures

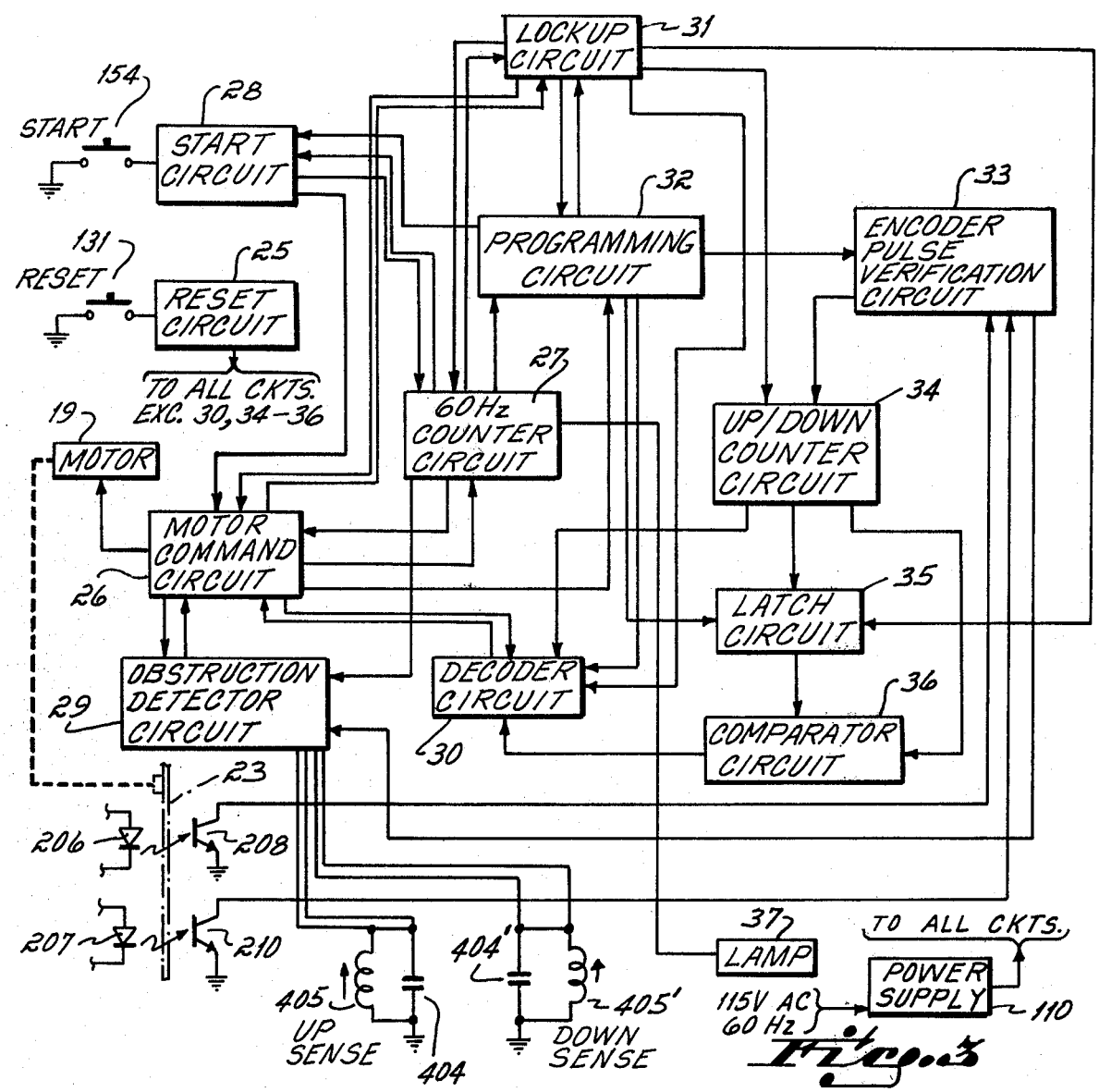
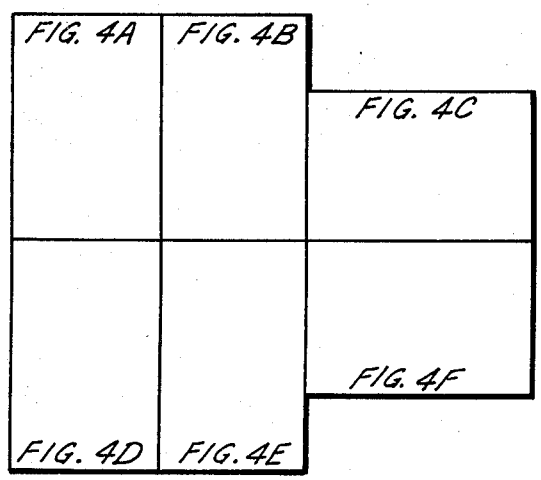

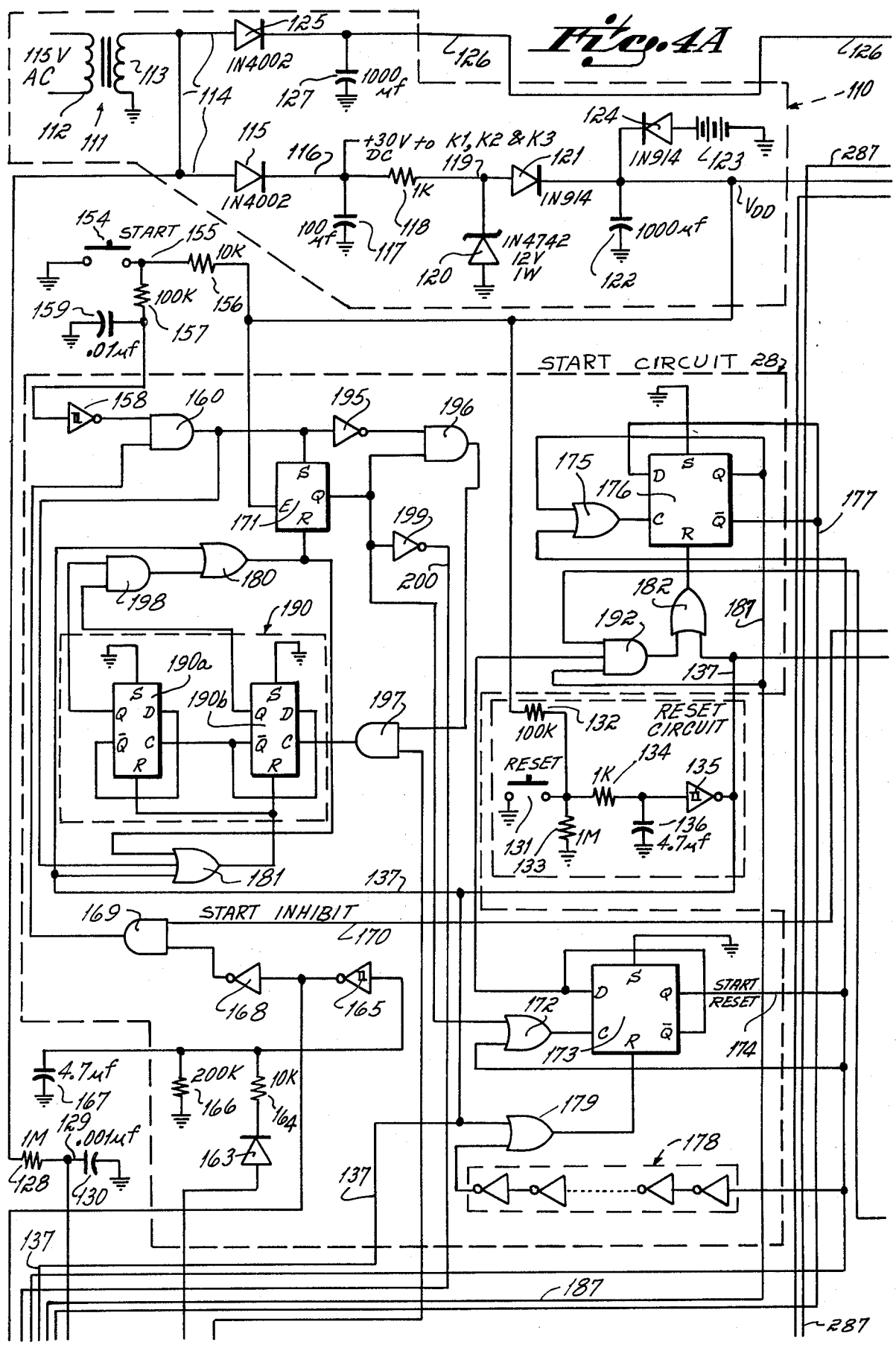

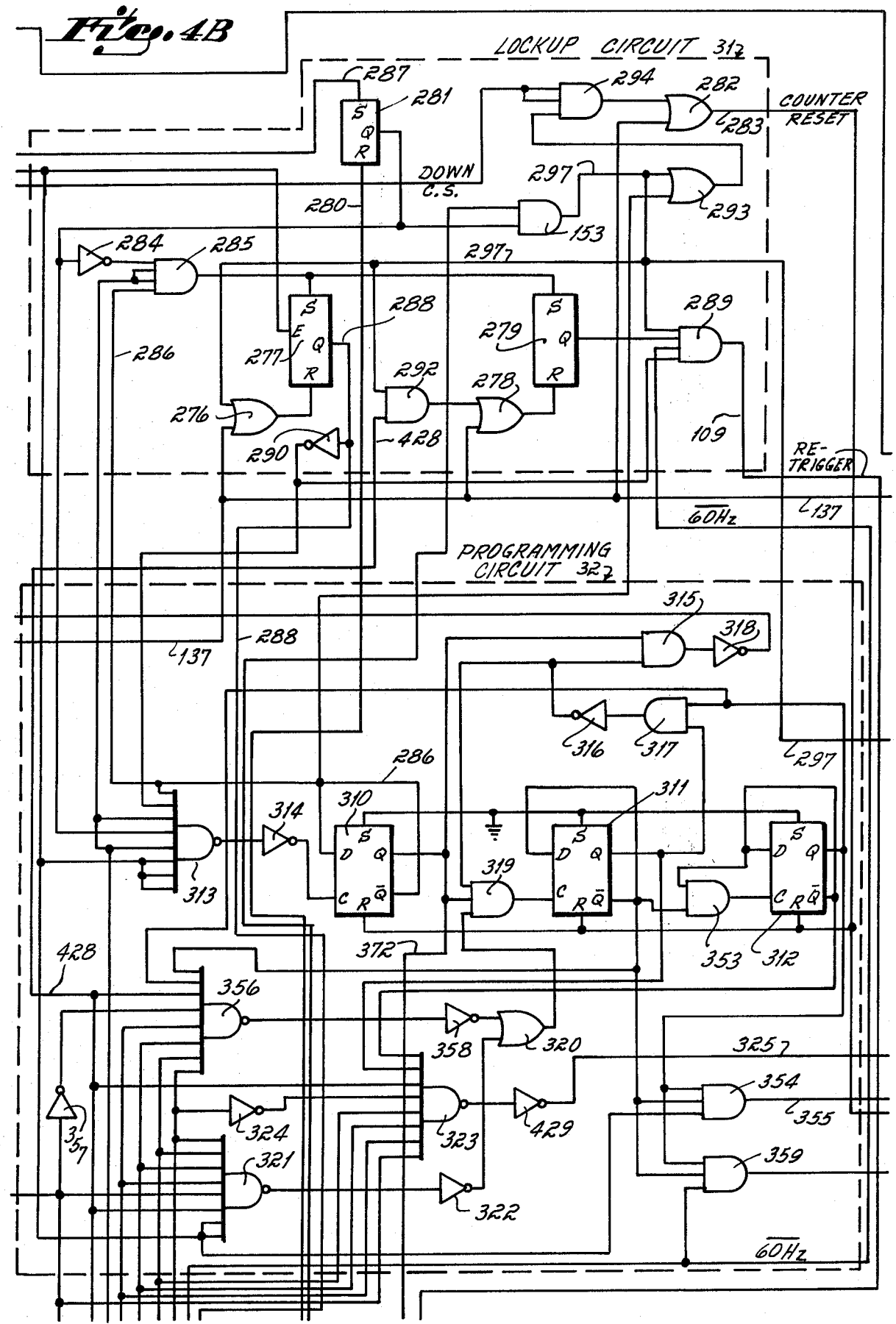

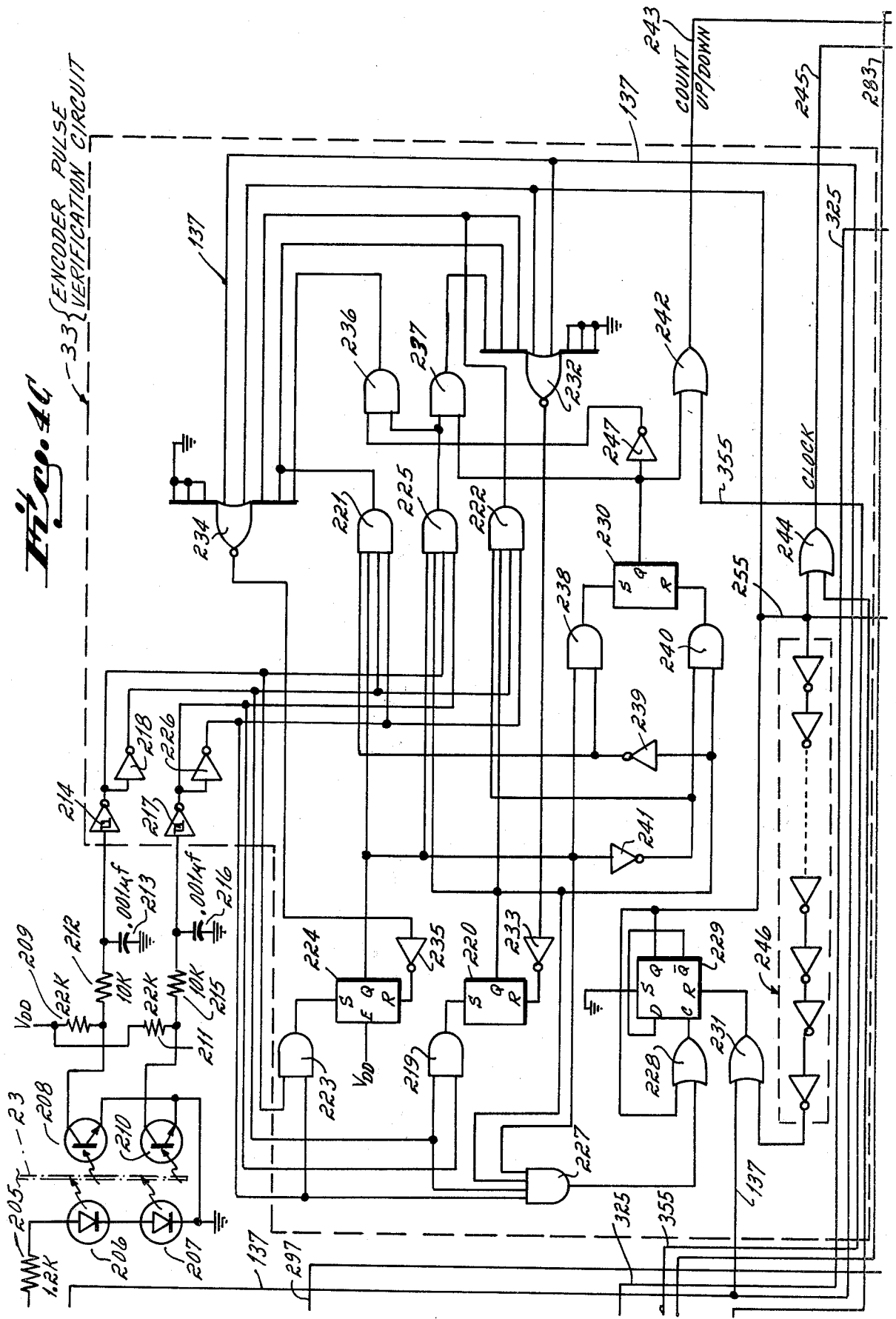

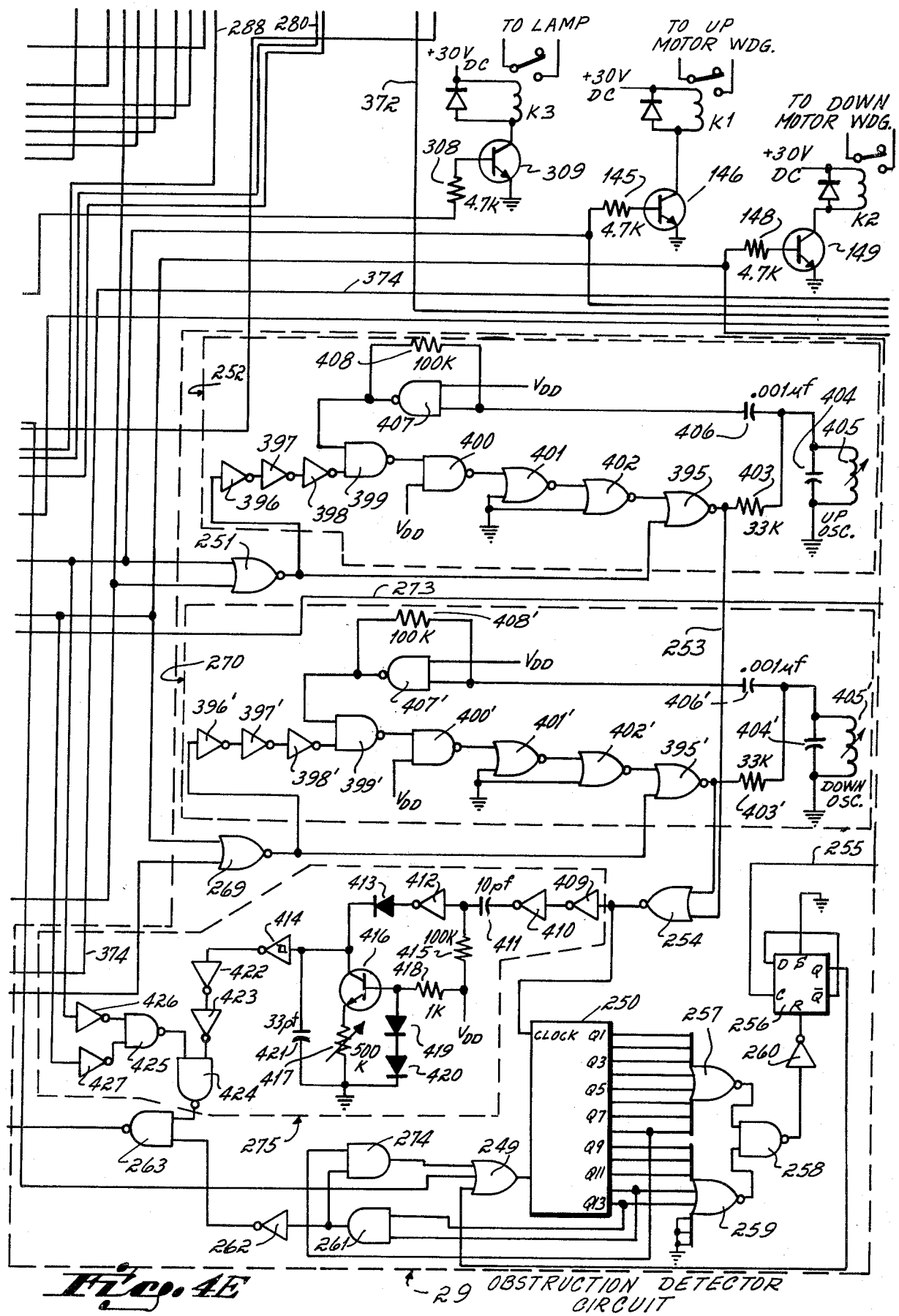

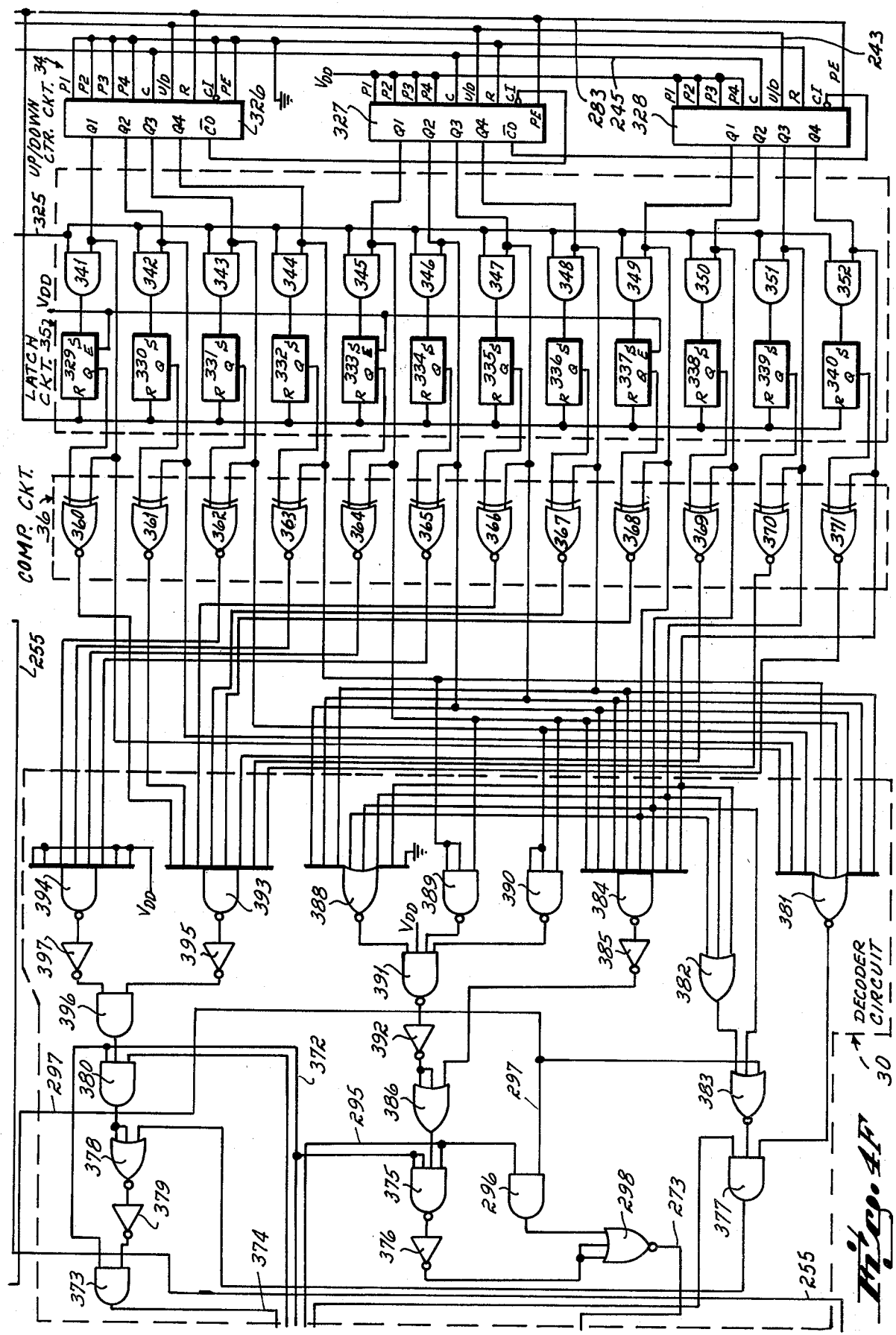

CONTROL SYSTEM FOR A MOTOR ACTUATED DOOR OPERATING MECHANISM

BACKGROUND OF THE INVENTION

This invention relates to door operators for moving doors, such as overhead garage doors, in either direction between an open position and a closed position. More particularly, the invention relates to door operators including an operating mechanism connected to a door and actuated by a motor for moving the door from one position to another. Specifically, the invention is directed to a revolutionary control system for the motor which simplifies construction and facilitates installation of the door operator.

Since the advent of door operators, various structures have been proposed for the operating mechanism connected to the door and selectively actuated for opening and closing the door. The invention is not directed to improvements in the operating mechanism, which may, for example, take the form of a screw drive, a chain drive, or a cable drive operating mechanism, and can be used in combination with any type of operating mechanism.

Although different motors have been used for actuating door operating mechanisms for opening and closing doors, such as reversible hydraulic motors, spring motors, etc., the reversible alternating current induction motor has found most widespread use, especially in non-industrial installations, such as residential garages. The invention could be used for controlling any type of motor for actuating a door operating mechanism. However, the invention will be described in connection with a door operating mechanism actuated by a reversible induction motor by way of example and not by way of limitation in view of the widespread use of the reversible induction motor.

What the invention does relate to is a control system for whatever motor is used for actuating the door operating mechanism. The control system of the invention is a departure from known control systems and leads to simplification of the mechanical structure of the door operator as well as the procedure by which the door operator is installed. As a result, the door operator is less costly to manufacture, and even a novice can install the door operator with relative ease.

In the past, various control systems have been proposed for door operator motors. The most widely used control systems include a first limit switch which is actuated when the door reaches the open position and a second limit switch which is actuated when the door reaches the closed position. Another switch, positioned between the open limit switch and the closed limit switch and known as a reverse override switch, is preferably included and is actuated shortly before the closed limit switch is actuated for preventing reversal of the door if an obstruction is encountered. Such a control system requires contact-type switches mounted to some structure, such as the door guide rail, cams mounted on the door or the operating mechanism for actuating the switches, and wiring for connecting the switches to the control circuitry. As an alternative, a mechanical follower may be mounted near and driven by the door operator motor. The mechanical follower may take the form of a finely threaded control screw having a threadably engaged cam which is driven along the control screw for actuating open and closed limit switches as well as a reverse override switch mounted near the control screw. In either case, the switches are prone to failure, and, therefore, the control system is unreliable. The switches, cams, and so on are relatively expensive and increase the cost of the door operator. Another drawback is that difficulty can be experienced during installation of the door operator relative to mounting the various switches, and often professional skill is required.

In some prior control systems, use has been made of what is known as obstruction detection or centrifugal switch means for eliminating one or more limit switches. Conventionally, obstruction detection means has been included for sensing when the door encounters an obstruction as the door is opened or closed. If an obstruction, such as an automobile, is sensed as the door is closed, the door operator motor is reversed, and the door is reopened, although, if the door is a predetermined distance or less from the threshold as determined by a reverse override switch, the door is merely stopped. On the other hand, if an obstruction is sensed as the door is opened, the door is merely stopped. If use is made of the obstruction detection means for eliminating one or more limit switches, when the door reaches the limit position, the obstruction detection means is relied upon for de-energizing the door operator motor. Of course, if the door is not to be reversed when the door reaches the closed position, a reverse override switch must be included which has the concomitant disadvantages discussed above relative to switch failure, expense, difficulty of installation, and so on. Furthermore, if limit switches are eliminated and use is made instead of the obstruction detection means, every time the door is open or closed, the door is rammed forcibly against a mechanical stop or the threshold which mechanically stresses the operating mechanism, the door mounting structure, and the door, and significantly increases maintenance as well as shortens the life of the door operator, the door mounting structure, and the door.

Furthermore, after installation of the door operator, adjustment of the position of the closed limit, the open limit, and/or the reverse override switches may be required which has the same attendant difficulties as during original installation. Even if readjustment is not necessary, maintenance is needed for keeping the control system in precise mechanical adjustment, for example, due to wear of the cams which actuate the various switches.

The invention is directed to overcoming the disadvantages of known door operator control systems by completely eliminating mechanically actuated position switches, such as closed limit, open limit, and/or reverse override switches, for not only simplifying construction and reducing cost, but also for facilitating installation and reducing required maintenance. Nor is obstruction detection means used to accomplish such a result, but instead an entirely different approach is used. Therefore, there is no reduction in the life of the door operator since no additional mechanical stress is imposed.

SUMMARY OF THE INVENTION

The invention provides an improved control system for a door operator including an operating mechanism connected to a door, such as an overhead door, and a motor for actuating the operating mechanism for moving the door in either direction between an open position and a closed position in response to actuation of a start switch, RF transmitter pushbutton, or the like. The control system includes an encoder and control circuitry for the door operator motor.

The control circuitry includes a reset circuit for resetting the control circuitry after the door operator is installed when power is initially connected to a power supply circuit included in the control circuitry so that the door is moved in the up direction in response to the initial actuation of the start switch for safety. Preferably, a backup battery is included in the power supply circuit so that there is no need for resetting the control circuitry when power is restored following a power outage. The reset circuit is responsive to actuation of a reset switch for manually resetting the control circuitry.

The control circuitry further includes a motor command circuit associated with other circuits for controlling energization of the motor. One of the other circuits associated with the motor command circuit is a start circuit. The start circuit is responsive to actuation of the start switch for selectively conditioning the motor command circuit so that the motor command circuit energizes the motor for opening or closing the door. The start switch may be repeatedly actuated so that the door is moved in one direction, actuated again as the door moves in the one direction so that the door is stopped, and actuated yet another time so that the door is reversed and moved in the other direction through cooperation of the motor command circuit, the start circuit, and the start switch. The start circuit also prevents false conditioning of the motor command circuit due to contact bounce of the start switch.

The encoder is preferably an optical encoder. The encoder includes a rotatable disc driven by the motor. The disc has spaced slots. The disc is rotated between light-emitting diodes and phototransistors which are positioned with respect to each other so that when the disc is rotated an encoder pulse verification circuit included in the control circuitry can detect the direction of rotation of the disc and hence the direction of movement of the door. Based on the spacing between the slots, movement of the door through an increment of travel is also detected.

The control circuitry additionally includes an obstruction detector circuit which is associated with the motor command circuit and the encoder pulse verification circuit for sensing an obstruction or a problem with the operating mechanism or door mounting structure. The obstruction detector circuit is responsive to the rate of movement of the door with respect to a reference set by means of at least one oscillator whose frequency is adjustable for providing desired sensitivity. If the rate of movement of the door is not greater than a predetermined rate, the obstruction detector circuit conditions the motor command circuit for de-energizing the motor to stop the door if movement of the door is in the up direction or for reversing the motor to reopen the door if movement of the door is in the down direction. Preferably, however, if movement of the door is in the down direction and an obstruction is sensed a predetermined distance or less above the threshold, movement of the door is merely stopped. Preferably, the obstruction detector circuit includes two oscillators so that a different sensitivity can be set for obstructions encountered during movement of the door in each direction. For safety, an oscillator failure detection circuit is also preferably included for triggering the obstruction detector circuit if an oscillator fails.

The control circuitry also includes a programming circuit associated with the encoder pulse verification circuit, the obstruction detector circuit, and an up/-down counter circuit for setting an up limit setpoint which is stored in a latch circuit. As the door is moved in the up direction in response to the initial actuation of the start switch, the up/down counter circuit counts increments of travel detected by the encoder pulse verification circuit. The count stops when the obstruction detector circuit senses a mechanical stop at the fully open position whereupon the programming circuit stores the count as the up limit setpoint in the latch circuit. Preferably, the up/down counter circuit is preset initially with a negative count or offset so that the up limit setpoint is a predetermined distance short of the fully open position in which case the programming circuit corrects the count in the up/down counter circuit after the up limit setpoint is stored in the latch circuit.

The control circuitry also includes a decoder circuit associated with the motor command circuit, the encoder pulse verification circuit, the up/down counter circuit, the latch circuit, and a comparator circuit so that as the door is moved in the up direction the motor is de-energized when the door reaches the up limit setpoint. The decoder circuit is also associated with the motor command circuit, the encoder pulse verification circuit, and the up/down counter circuit so that as the door is moved in the down direction the motor is de-energized when the door reaches the fully closed position. Preferably, the motor is de-energized even if the door coasts past the original fully closed position due to settling of the ground beneath the floor or climatic conditions.

The control circuitry preferably includes a lockup circuit associated with the motor command circuit for conditioning the motor command circuit so that the motor is energized for moving the door in the up direction if the up limit setpoint has not been set and the motor is energized for no longer than a predetermined time before the mechanical stop is encountered in response to the initial actuation of the start switch. Preferably, a lamp is flashed when the lockup circuit is in control of the motor command circuit for indicating that the start switch must be held in the actuated condition for overriding the lockup circuit so that the door is moved to the fully closed position and programming takes place in response to the next actuation of the start switch.

A 60 Hz. counter circuit is included in the control circuitry and is associated with the other circuits so that operations are properly timed. The 60 Hz. counter circuit is also associated with the start circuit for illuminating the lamp for lighting the region near the door when the start switch is actuated, is further associated with the motor command circuit and the obstruction detector circuit for overriding the obstruction detector circuit during initial movement of the door until the inertia of the door and operating mechanism has been overcome, and is further associated with the motor command circuit for de-energizing the motor if the motor has been energized longer than is normally necessary for moving the door from one limit position to the other.

The control system of the invention is a departure from known control systems which include position switches mounted on the door supporting structure, cams mounted on the door or operating mechanism for actuating the position switches, and wiring as well as control systems which include a finely threaded control screw driven by the motor and a threadably engaged cam and position switches mounted near the ends of the control screw which are actuated by the cam or control systems which sense limits by a combination of position switches and obstruction detection means. The control system of the invention which includes an encoder, encoder pulse verification circuit, up/down counter circuit, programming circuit, latch circuit, comparator circuit, and decoder circuit effectively eliminates the need for position switches of any kind, thereby increasing reliability while at the same time reducing cost and facilitating installation of the door operator. The maintenance required after installation of the door operator is also reduced.

BRIEF DESCRIPTION OF THE DRAWING

In order that the features and concomitant advantages of the door operator control system of the invention will be better understood by those of skill in the art, a preferred embodiment will now be described. During the course of the description, reference will be frequently made to the accompanying drawing which depicts the preferred embodiment. In the drawing:

FIG. 2, including

FIG. 3 is a block diagram of the preferred door operator control system of the invention.

GENERAL DESCRIPTION

Figure 1:
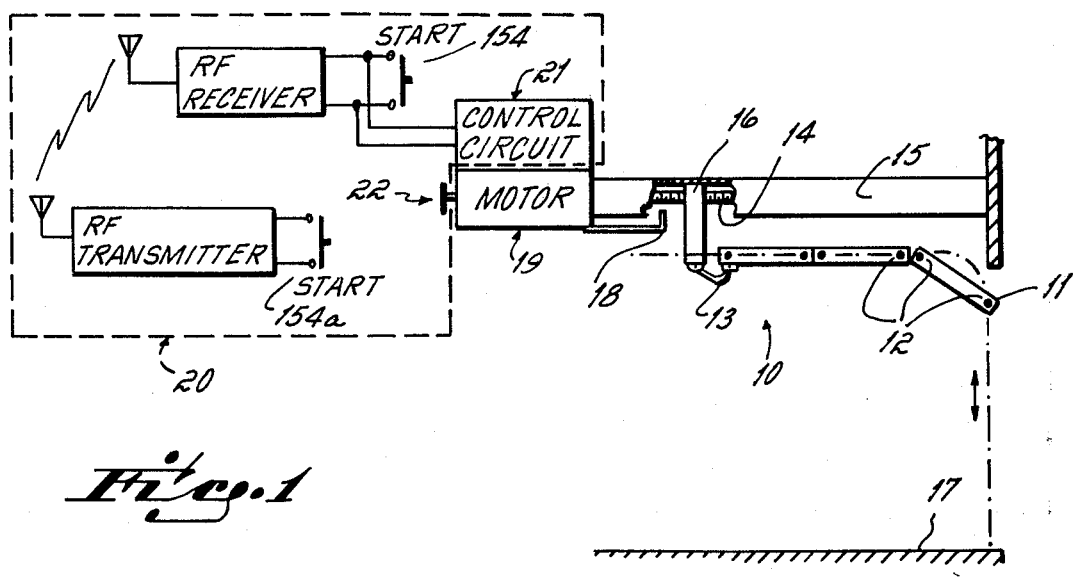
FIG. 1 is a diagrammatic view of a door operator including the improved control system of the invention.

An exemplary door operator including the improved control system of the invention appears in FIG. 1. The door operator 10 shown by way of example in FIG. 1 is for a conventional overhead door 11 comprising panels connected along opposing horizontal edges by hinges and having rollers 12 secured to opposing vertical edges which are rotatable in spaced door guide rails. However, the door may be any type, such as a cantilevered "California" door, a door which is moved along a horizontal track, a door which is moved along a vertical track, or the like. That is, the door operator control system of the invention can be used with a door operator for any type of door.

As shown in FIG. 1, door operator 10 includes an operating mechanism connected to door 11 by connecting means, such as a door bracket 13, bolted to the door. The operating mechanism shown by way of example in FIG. 1 is a conventional screw drive operating mechanism including a threaded shaft 14 rotatably supported by a track 15 mounted to the ceiling and/or walls of a building structure, such as a garage, plus a trolley 16 slidably mounted on track 15, threadably engaged with the threaded shaft, and selectively coupled to bracket 13 for moving the door when the threaded shaft is rotated. However, the operating mechanism may be any type, such as a cable or chain drive, a scissor linkage drive, or the like. That is, the door operator control system of the invention can be used with a door operator including any type of operating mechanism for moving the door.

Also, door operator 10 includes a motor 19 for actuating the operating mechanism for moving door 11 between a fully closed position, whereat the door is substantially perpendicular to the floor 17 and the lower edge of the door abuts the threshold, and a fully open position shown in FIG. 1, whereat the door is substantially parallel with the floor and trolley 16 abuts a mechanical stop 18. Motor 19 is preferably a reversible alternating current induction motor having a motor shaft coupled to threaded shaft 14 of the operating mechanism, for example, but may be any type of motor, such as a hydraulic motor, and may depend on the operating mechanism which is selected for moving the door.

The door, operating mechanism, means for connecting the door to the operating mechanism, and the motor for actuating the operating mechanism are conventional and will not be described in further detail. Attention will now be focused on the door operator control system of the invention designated generally by the numeral 20 in FIG. 1.

Control system 20 includes control circuitry 21 for controlling motor 19. The control circuitry is responsive to actuation of a start switch 154 or an RF transmitter pushbutton 154a for selectively energizing motor 19 for moving door 11 in either direction between the open position and the closed position. The control circuitry is also responsive to an encoder 22 which is driven by motor 19 while the motor is actuating the operating mechanism for moving the door.

Figure 2A:
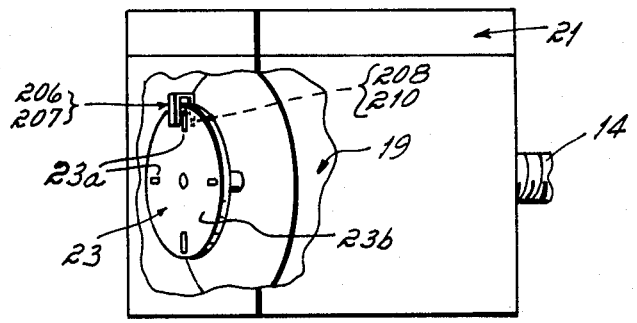
FIGS. 2A–2C, is a detail of the encoder included in the preferred embodiment of the door operator control system of the invention.

As shown in FIG. 2A, encoder 22 includes an encoder disc 23 which is mounted on a shaft extension of the shaft of motor 19. Disc 23 includes slots 23a formed therein which alternate with opaque sections 23b of the disc.

Figure 2B:
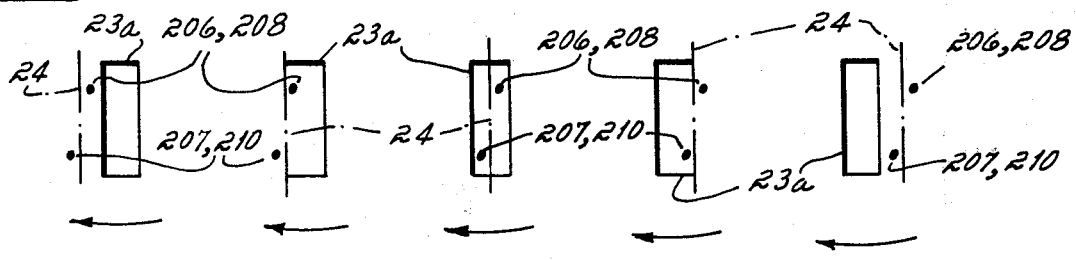

Mounted in proximity to encoder disc 23 are two infrared light-emitting diodes (LEDs) 206 and 207 and associated phototransistors 208 and 210. LED 206 and associated phototransistor 208 are offset to one side of a vertical line 24 while LED 207 and associated phototransistor 210 are offset to the other side of vertical line 24 as shown in FIGS. 2B and 2C.

The direction of door movement is detected based on rotation of disc 23. As shown in FIG. 2B, for example, when door 11 is moved in the up direction, disc 23 is rotated in the clockwise direction. First, an opaque section 23b will be interposed between LEDs 206 and 207 and phototransistors 208 and 210. Then, as disc 23 is rotated by motor 19, a slot 23a will be moved between LED 206 and phototransistor 208 due to the vertical offset of LED 206 and phototransistor 208 with respect to LED 207 and phototransistor 210. Next, the slot will be moved between LED 207 and phototransistor 210 as well as between LED 206 and phototransistor 208. Then, another opaque section 23b will be rotated between LED 206 and phototransistor 208, but the slot will remain between LED 207 and phototransistor 210. Finally, the opaque section is moved between both LEDs 206 and 207 and phototransistor 208 and 210.

Figure 2C:
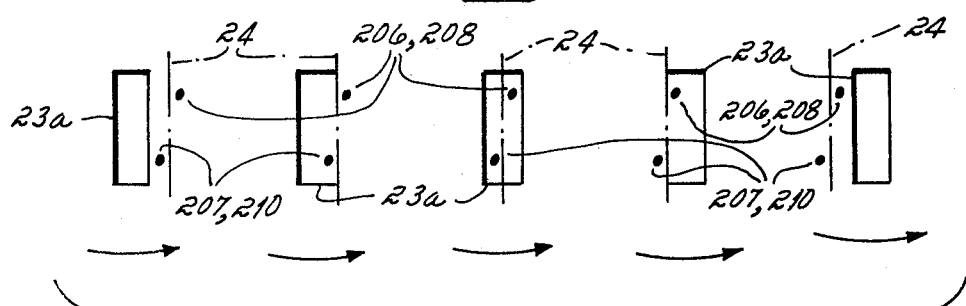

As shown in FIG. 2C, for example, when door 11 is moved in the down direction, disc 23 is rotated in the counterclockwise direction. First, an opaque section 23b will be interposed between LEDs 206 and 207 and phototransistors 208 and 210. Then, as disc 23 is rotated by motor 19, a slot 23a will be moved between LED 207 and phototransistor 210, but the opaque section will not have moved from between LED 206 and phototransistor 208 due again to the vertical offset of LED 207 and phototransistor 210 with respect to LED 206 and phototransistor 208. Next, the slot will be moved between LED 206 and phototransistor 208 as well as between LED 207 and phototransistor 210. Then, another opaque section 23b will be rotated between LED 207 and phototransistor 210, but the slot will remain between LED 206 and phototransistor 208. Finally, the opaque section is moved between both LEDs 207 and 206 and phototransistors 210 and 208 again.

Rotation of encoder disc 23 also incicates movement of door 11 through an incremental distance, such as 3/32", dependent on the distance between slots 23a, the pitch of threaded shaft 14, and so forth. The direction of movement of door 11 and increments of travel are detected by an encoder pulse verification circuit to be described later.

The door operator control system of the invention is shown in the block diagram of FIG. 3. A detailed description will be given later in connection with FIG. 4.

As shown in FIG. 3, the control system includes control circuitry in addition to the encoder described in connection with FIG. 2. The control circuitry preferably includes a power supply circuit 110 having an input connected to a 115 volt, 60 Hz. alternating current power source. The output of the power supply circuit is connected to the other circuits included in the control circuitry for energizing the various elements of those circuits as well as for supplying a 60 Hz. timing reference to a 60 Hz. counter circuit 27.

The control circuitry also includes a reset circuit 25 having an input connected to power supply circuit 110 and an output connected to other circuits included in the control circuitry for resetting the control circuitry when the power supply circuit is initially connected to the 115 VAC, 60 Hz. power source after the door operator is installed or in response to actuation of a manual reset switch 131. A backup battery is preferably included in power supply circuit 110, but, if a backup battery is not included, the reset circuit also resets the control circuitry when power is restored after a power failure. The reset circuit initially conditions a motor command circuit 26 for energizing motor 19 to move door 11 in the up direction in response to the initial actuation of start switch 154 for safety since there is less risk of injury or property damage if the door is initially moved in the up direction as compared to the down direction.

Motor command circuit 26 has inputs connected to power supply circuit 110, reset circuit 25, and 60 Hz. counter circuit 27 as well as to a start circuit 28, an obstruction detector circuit 29, a decoder circuit 30, and a lockup circuit 31. The motor command circuit has outputs connected to motor 19, obstruction detector circuit 29, decoder circuit 30, 60 Hz. counter circuit 27, lockup circuit 31, and a programming circuit 32. The motor command circuit is conditioned by start circuit 28 for selectively energizing the motor in response to actuation of start switch 154.

Start circuit 28 has inputs connected to power supply circuit 110, reset circuit 25, 60 Hz. counter circuit 27, and programming circuit 32. The start circuit has outputs connected to motor command circuit 26 and 60 Hz. counter circuit 27. Programming circuit 32 inhibits further start circuit operation during programming in response to the initial actuation of start switch 154 until the up limit setpoint is set. Otherwise, the start circuit is responsive to each actuation of start switch 154. The start switch can be actuated so that the start circuit resets 60 Hz. counter circuit 27 and conditions motor command circuit 26 for energizing the motor to move the door in one direction. The start switch can be actuated again so that the start circuit resets the 60 Hz. counter circuit and conditions the motor command circuit for de-energizing the motor to stop the door. The start switch can be actuated yet another time so that the start circuit resets the 60 Hz. counter circuit and conditions the motor command circuit for energizing the motor to move the door in the opposite direction. Consequently, the door can be partially opened and stopped to allow a pet to exit and then closed again by repeatedly actuating the start switch rather than having to fully open the door and then close the door again. The start circuit is reset by the 60 Hz. counter circuit each time that the start switch is released for preventing false operation of the start circuit due to contact bounce of the start switch.

When motor command circuit 26 energizes motor 19, the door is moved. The motor also rotates encoder disc 23 between LEDs 206 and 207 and phototransistors 208 and 210.

The control circuitry also includes an encoder pulse verification circuit 33. The encoder pulse verification circuit has inputs connected to power supply circuit 110, reset circuit 25, phototransistors 208 and 210, and programming circuit 32. The encoder pulse verification circuit has outputs connected to obstruction detector circuit 29 and an up/down counter circuit 34. When the encoder disc is rotated, the encoder pulse verification circuit detects the direction of rotation of the disc and hence the direction of movement of the door based on the outputs of phototransistors 208 and 210. Based on the spacing between the slots in the disc, movement of the door through an increment of travel is also detected. The encoder pulse verification circuit conditions up/down counter circuit 34 for counting up or down depending on the direction of door movement detected by the encoder pulse verification circuit. The encoder pulse verification also causes up/down counter circuit 34 to count each increment of travel of the door in the given direction.

Obstruction detector circuit 29 has inputs connected to power supply circuit 110, reset circuit 25, motor command circuit 26, 60 Hz. counter circuit 27, and encoder pulse verification circuit 33. The obstruction detector circuit has an output connected to the motor command circuit. The obstruction detector circuit preferably includes an up oscillator including an adjustable tank circuit 404, 405 and a down oscillator including an adjustable tank circuit 404', 405'. Motor command circuit 26 controls whether the up oscillator or down oscillator oscillates depending on the direction that the door is moved in response to actuation of start switch 154. The obstruction detector circuit compares the frequency that encoder pulse verification circuit 33 detects increments of travel of the door with a rate derived from the frequency of the up or down oscillator depending on the direction of movement of the door for sensing whether or not an obstruction has been encountered by the door or a problem has arisen in the operating mechanism. If the rate of travel of the door is not greater than a predetermined rate determined by the frequency of the up or down oscillator, whichever is in operation, the obstruction detector circuit conditions motor command circuit 26 for de-energizing the motor to stop the door if movement of the door is in the up direction or for energizing the motor to reverse movement of the door if movement of the door is in the down direction. Preferably, however, if movement of the door is in the down direction and an obstruction is sensed a predetermined distance or less above the threshold, which is detected by decoder circuit 30 based on the count in up/down counter circuit 34, the obstruction detector circuit conditions motor command circuit 26 for de-energizing the motor to stop the door. Preferably, the obstruction detector circuit includes two oscillators as shown in FIG. 3 so that a different sensitivity can be set for obstructions encountered during movement of the door in each direction. However, only one oscillator is needed if different sensitivity is not desired. For safety, an oscillator failure detection circuit is also preferably included for triggering the obstruction detector circuit if one of the oscillators fails.

Programming circuit 32 has inputs connected to power supply circuit 110, reset circuit 25, motor command circuit 26, 60 Hz. counter circuit 27, and lockup circuit 31. The programming circuit has outputs connected to start circuit 28, decoder circuit 30, encoder pulse verification circuit 33, and a latch circuit 35. As the door is moved in the up direction in response to the initial actuation of start switch 154, up/down counter circuit 34 counts increments of travel detected by encoder pulse verification circuit 33. The count ceases when obstruction detector circuit 29 senses the mechanical stop whereupon the programming circuit conditions latch circuit 35 for storing the count contained in up/down counter circuit 34 as the up limit setpoint. Preferably, as described above, the programming circuit inhibits start circuit 28 so that setting the up limit setpoint will not be interrupted in response to repeated actuation of start switch 154 during programming. Preferably, up/down counter circuit 34 is initially preset with a negative count or offset so that the up limit setpoint is a predetermined distance short of the mechanical stop at the fully open position in which case the programming circuit conditions encoder pulse verification circuit 33 so that the count in up/down counter circuit 34 is corrected after the up limit setpoint is stored in latch circuit 35.

Up/down counter circuit 34 has inputs connected to power supply circuit 110, encoder pulse verification circuit 33, and lockup circuit 31. The up/down counter circuit has outputs connected to decoder circuit 30 and a comparator circuit 36. The up/down counter circuit is conditioned by encoder pulse verification circuit 33 for counting the increments of travel of the door up or down, depending on the direction of movement of the door.

Latch circuit 35 has inputs connected to power supply circuit 110, up/down counter circuit 34, lockup circuit 31, and programming circuit 32. The latch circuit has an output connected to comparator circuit 36. The latch circuit is conditioned by programming circuit 32 for storing the up limit setpoint during programming.

The comparator circuit has inputs connected to power supply circuit 110, up/down counter circuit 34, and latch circuit 35 and an output connected to decoder circuit 30. The comparator circuit generates a bit-by-bit comparison between the up limit setpoint stored in latch circuit 35 and the count contained in up/down counter circuit 34.

Decoder circuit 30 has inputs connected to power supply circuit 110, motor command circuit 26, up/down counter circuit 34, programming circuit 32, lockup circuit 31, and comparator circuit 36. The decoder circuit has an output connected to motor command circuit 26. The decoder circuit is responsive to the bit-by-bit comparison generated by comparator circuit 36 for detecting coincidence between the up limit setpoint stored in latch circuit 35 with the count contained in up/down counter circuit 34 so that as the door is moved in the up direction the decoder circuit conditions motor command circuit 26 for de-energizing the motor to stop the door when the door reaches the up limit setpoint. The decoder circuit is also responsive to the count contained in up/down counter circuit 34 so that as the door is moved in the down direction the decoder circuit conditions motor command circuit 26 for de-energizing the motor to stop the door when the door reaches the fully closed position. Preferably, the decoder circuit conditions motor command circuit 26 for de-energizing the motor even if the door coasts past the original fully closed position due to settling of the ground beneath the floor or climatic conditions. The decoder circuit is inhibited by programming circuit 32 until the up limit setpoint is stored in latch circuit 35.

Lockup circuit 31 has inputs connected to power supply circuit 110, reset circuit 25, motor command circuit 26, and programming circuit 32. The lockup circuit has outputs connected to up/down counter circuit 34, latch circuit 35, decoder circuit 30, programming circuit 32, 60 Hz. counter circuit 27, and motor command circuit 26. The lockup circuit conditions motor command circuit 26 for energizing the motor to move the door in the up direction if the up limit setpoint has not been set and the motor is energized for no longer than a predetermined time before the mechanical stop is encountered in response to the initial actuation of start switch 154. Preferably, the lockup circuit conditions 60 Hz. counter circuit 27 for flashing a lamp 37 for indicating that start switch 154 must be held in the actuated condition for overriding the lockup circuit. If the start switch is held in the actuated condition, the lockup circuit conditions motor command circuit 26 for energizing the motor to move the door to the fully closed position whereat the motor is de-energized and the door is stopped in which case the lockup circuit presets up/down counter circuit 34, resets latch circuit 35 and conditions programming circuit 32 for setting the up limit setpoint when the motor is energized for moving the door in the up direction in response to the next actuation of start switch 154.

60 Hz. counter circuit 27 has inputs connected to power supply circuit 110, reset circuit 25, motor command circuit 26, start circuit 28, and lockup circuit 31. The 60 Hz. counter circuit has outputs connected to motor command circuit 26, start circuit 28, programming circuit 32, obstruction detector 29, and lamp 37. The 60 Hz. counter circuit is responsive to actuation of start switch 154 for energizing lamp 37 for illuminating the region near the door. The 60 Hz. counter circuit also is responsive to actuation of start switch 154 for conditioning motor command circuit 26 so that obstruction detector circuit 29 is overridden during initial movement of the door until the inertia of the door and operating mechanism has been overcome. The 60 Hz. counter circuit also conditions motor command circuit 26 for de-energizing the motor if the motor is energized longer than is normally required for moving the door from one limit position to another.

Detailed Description

Figure 4D:
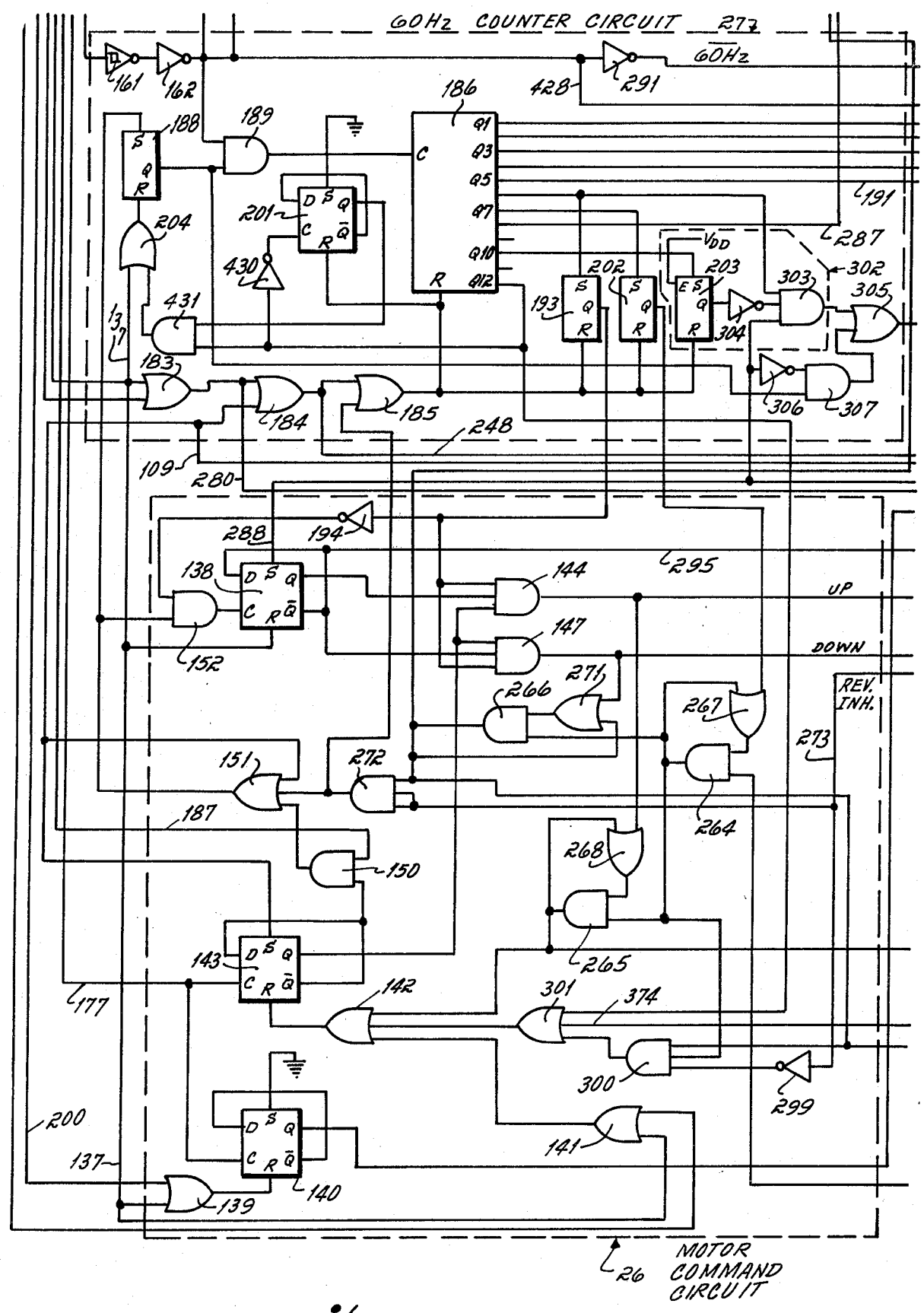
FIG. 4, comprising FIGS. 4A–4F connected as shown, is a schematic circuit diagram of the door operator control system shown in the block diagram of FIG. 3.

The garage door operator motor control circuitry of the invention is shown schematically in FIGS. 4A–F. As shown in FIG. 4A, the control circuitry preferably includes a power supply circuit 110. Power supply circuit 110 includes a transformer 111 having a primary winding 112 and a secondary winding 113. Primary winding 112 is connected to a readily available alternating current power source, such as the 115 volt, 60 Hz. alternating current power source available at an electrical outlet found in the garage of a house, in which case transformer 111 is a step-down transformer for transforming 115 volts, 60 Hz. to 24 volts, 60 Hz. which appears on a line 114.

Line 114 is connected to the anode of a diode 115. The cathode of diode 115 is connected to a line 116. A capacitor 117 is connected between line 116 and common. Diode 115 serves as a half-wave rectifier, and capacitor 117 serves as a filter for converting the 24 volts, 60 Hz. which appears on line 114 into unregulated 30 volts direct current which appears on line 116 for energizing the coils of the lamp and motor control relays K1–K3.

Line 116 is connected by a resistor 118 to a line 119. A Zener diode 120 is connected between line 119 and common. Line 119 is preferably connected to the anode of a blocking diode 121 which is included when a backup battery is provided. The cathode of blocking diode 121 is connected to a line labeled $V_{DD}$. A capacitor 122 is connected between line $V_{DD}$ and common. Resistor 118 serves as a current-limiting resistor, Zener diode 120 serves as a voltage regulator, and capacitor 122 serves as a filter for converting the half-wave rectified 30 volts direct current which appears on line 116 into regulated 12 volts direct current which appears on line $V_{DD}$ for energizing the various elements included in the control circuitry shown in FIGS. 4A–F.

Preferably, a backup battery 123 for energizing the various elements included in the control circuitry in the event of a power failure is connected between the anode of a blocking diode 124 and common. The cathode of blocking diode 124 is connected to line $V_{DD}$. Blocking diode 121 is for preventing the backup battery from draining through current-limiting resistor 118 and the coils of the control relays, while blocking diode 124 is for preventing the 12 volts direct current which appears on line $V_{DD}$ from reaching backup battery 123.

Line 114 is also connected to the anode of a diode 125. The cathode of diode 125 is connected to a line 126. A capacitor 127 is connected between line 126 and common. Diode 125 serves as a half-wave rectifier, and capacitor 127 serves as a filter for converting the 24 volts, 60 Hz which appears on line 114 into unregulated 24 volts direct current which appears on line 126 for energizing the infrared light-emitting diodes included in the optical encoder.

Finally, line 114 is connected by a resistor 128 to a line 129. A capacitor 130 is connected between line 129 and common. Resistor 128 serves as a current-limiting resistor, and capacitor 130 serves as a filter for dropping and filtering the 24 volts, 60 Hz. which appears on line 114 for supplying a 60 Hz. timing reference, or timebase, for the control circuitry. The 60 Hz. timing reference also serves as an indication of the availability of the 115 volts, 60 Hz. for energizing the motor.

Reset Circuit

The control circuitry includes a reset circuit for resetting the various elements included in the control circuitry shown in FIGS. 4A–4F under certain conditions when a backup battery is not included. One condition is when the alternating current power source is first connected to power supply circuit 110 following installation of the garage door operator. Another condition under which the control circuitry is reset is after a power failure, such as due to a storm, when power is restored. Another condition under which the control circuitry is reset is when a manual reset switch 131 is actuated. Preferably, backup battery 123 is included so that the reset circuit is inhibited and the control circuitry is not reset when power is restored after a power failure.

As shown in FIG. 4A, the reset circuit includes a voltage divider comprising series resistors 132 and 133 connected between line $V_{DD}$ and common. The junction between resistors 132 and 133 is connected by a resistor 134 to the input of a Schmitt trigger inverter 136 whose output is connected to a reset line 137. A capacitor 136 is connected between the input of inverter 135 and common.

In operation, if the control circuitry is in an unpowered condition, capacitor 136 will be discharged, and the output of inverter 135 will be at a logic zero state. When the control circuitry goes from an unpowered condition to a powered condition, capacitor 136 will initially be discharged, and a logic zero state will initially appear at the input of inverter 135. Consequently, the output of inverter 135 will initially transpose to a logic one state.

However, as soon as the control circuitry goes from an unpowered to a powered condition, capacitor 136 will begin to charge through a charging circuit comprising resistors 132–134 connected to line $V_{DD}$. After a time delay dependent on the time constant of the charging circuit, the voltage across capacitor 136 will reach a logic one state which will appear at the input of inverter 135. Consequently, the output of inverter 135 will transpose to a logic zero state.

Transposition of the output of inverter 135 first from a logic zero state to a logic one state when the control circuitry goes from an unpowered to a powered condition and then back to a logic zero state when the voltage across capacitor 136 reaches a logic one state results in a logic one state reset pulse at the output of inverter 135 which appears on line 137 for resetting the various elements included in the control circuitry. The reset pulse appears automatically when the control circuitry goes from an unpowered condition to a powered condition. The duration of the reset pulse is preferably one-half second for allowing the power supply voltage ample time to settle after connection of the alternating current power source to the power supply circuit.

The same operation of the reset circuit will result if manual reset switch 131 is actuated. Actuation of manual reset switch 131 causes capacitor 136 to discharge primarily through resistor 134 so that a logic zero state appears at the input of inverter 135. Consequently, the output of inverter 135 transposes to a logic one state. When manual reset switch 131 is released, capacitor 136 will begin to charge. Eventually, the voltage across capacitor 136 will reach a logic one state. Consequently, the output of inverter 135 will transpose back to a logic zero state. As a result, a reset pulse will appear on line 137 for resetting the various elements included in the control circuitry.

Motor Command Circuit

The reset circuit is connected to the motor command circuit shown in FIG. 4D by reset line 137. The reset pulse which appears on reset line 137 resets the flip-flops included in the motor command circuit.

Line 137 is connected to the reset input of a direction control flip-flop 138. Consequently, direction control flip-flop 138 is reset in response to a reset pulse so that a logic zero state initially appears at the Q output and a logic one state initially appears at the $\overline{Q}$ output of direction control flip-flop 138. Since the $\overline{Q}$ output and the D input of direction control flip-flop 138 are interconnected, a logic one state initially appears at the D input of direction control flip-flop 138. Furthermore, line 137 is connected to a first input of an OR gate 139 whose output is connected to the reset input of a start switch held flip-flop 140. In response to a reset pulse, a pulse appears at the output of OR gate 139, and start switch held flip-flop 140 is reset so that a logic zero state initially appears at the Q output and a logic one state initially appears at the $\overline{Q}$ output of start switch held flip-flop 140. Since the $\overline{Q}$ output and the D input of start switch held flip-flop 140 are interconnected, a logic one state initially appears at the D input of start switch held flip-flop 140. Finally, line 137 is connected to a first input of an OR gate 141 whose output is connected to a first input of an OR gate 142. The output of OR gate 142 is in turn connected to the reset input of a motor run flip-flop 143. In response to a reset pule, a pulse appears sequentially at the output of each of the OR gates 141 and 142, and motor run flip-flop 143 is reset so that a logic zero state initially appears at the Q output and a logic one state initially appears at the $\overline{Q}$ output of motor run flip-flop 143. Since the $\overline{Q}$ output and the D input of motor run flip-flop 143 are interconnected, a logic one state initially appears at the D input of motor run flip-flop 143.

As shown in FIG. 4D, the Q output of direction control flip-flop 138 is connected to a first input of an AND gate 144, and the Q output of motor run flip-flop 143 is connected to a second input of AND gate 144. The output of AND gate 144 is connected by a current-limiting resistor 145 to the base of an NPN transistor 146. The coil of the up motor winding control relay K1 is connected in the collector-emitter circuit of NPN transistor 146 so that when NPN transistor 146 is forward-biased the coil of the up motor winding control relay will be energized for actuating a contact in order to connect power to motor winding. Also, the $\overline{Q}$ output of direction control flip-flop 138 is connected to a first input of an AND gate 147, and the Q output of motor run flip-flop 143 is connected to a second input of AND gate 147. The output of AND gate 147 is connected by a current-limiting resistor 148 to the base of an NPN transistor 149. The coil of the down motor winding control relay is connected in the collector-emitter circuit of NPN transistor 149 so that when NPN transistor 149 is forward-biased the coil of the down motor winding control relay is energized for actuating a contact in order to connect power to the down motor winding. Since the Q output of motor run flip-flop 143 initially transposes to a logic zero state in response to a reset pulse, AND gates 144 and 147 are initially disabled so that neither the up motor winding nor the down motor winding will be initially energized.

Furthermore, as shown in FIG. 4D, the $\overline{Q}$ output of motor run flip-flop 143 is also connected to a first input of an AND gate 150 whose output is connected to a first input of an OR gate 151. The output of OR gate 151 is in turn connected to a first input of an AND gate 152 whose output is connected to the clock input of direction control flip-flop 138. Since the $\overline{Q}$ output of motor run flip-flop 143 initially transposes to a logic one state in response to a reset pulse, AND gate 150 is initially enabled for responding to a start pulse as will be described shortly.

Finally, the Q output of the start switch held flip-flop 140 is connected to a first input of an AND gate 153 (FIG. 4B). Since the Q output of start switch held flip-flop 140 initially transposes to a logic zero state in response to a reset pulse, AND gate 153 is initially disabled.

Initially, therefore, the reset pulse which appears on line 137 resets all the flip-flops in the motor command circuit. As a result, motor run flip-flop 143 inhibits the motor command circuit so that the motor will not be initially energized when the control circuitry is reset.

Start Circuit

As described earlier, a reset pulse is generated when the alternating current power source is first connected to power supply circuit 110 following installation of the garage door operator. As shown in FIG. 4A, the reset circuit is connected to the start circuit by line 137. The reset pulse which appears on line 137 resets the latch, flip-flops, and counter included in the start circuit.

Line 137 is connected to a first input of an OR gate 180 whose output is connected to the reset input of a start latch 171. In response to a reset pulse, a pulse appears at the output of OR gate 180, and start latch 171 is reset so that a logic zero state initially appears at the Q output of start latch 171. Line 137 is also connected to a first input of an OR gate 179 whose output is connected to the reset input of a sequence flip-flop 173. In response to a reset pulse, a pulse appears at the output of OR gate 179, and sequence flip-flop 179 is reset so that a logic zero state initially appears at the Q output and a logic one state initially appears at the $\overline{Q}$ output of sequence flip-flop 173. Since the $\overline{Q}$ output and the D input of sequence flip-flop 173 are interconnected, a logic one state initially appears at the D input of sequence flip-flop 173. Furthermore, line 137 is connected to a first input of an OR gate 182 whose output is connected to the reset input of a start pulse flip-flop 176. In response to a reset pulse, a pulse appears at the output of OR gate 182, and start pulse flip-flop 176 is reset so that a logic zero state initially appears at the Q output and a logic one state initially appears at the $\overline{Q}$ output of start pulse flip-flop 176. Since the $\overline{Q}$ output and the D output of start pulse flip-flop 176 are interconnected, a logic one state initially appears at the D input of start pulse flip-flop 176. Finally, line 137 is connected to a first input of an OR gate 181 whose output is connected to the reset input of each of the D flip-flops 190a and 190b which comprise a two-bit counter 190. In response to a reset pulse, a pulse appears at the output of OR gate 181, and counter 190 is reset so that a logic zero state initially appears at the Q output and a logic one state initially appears at the $\overline{Q}$ output of each of the D flip-flops 190a and 190b comprising the counter 190.

The 60 Hz. timing reference which appears on line 129 is connected to the input of a Schmitt trigger inverter 161 whose output is connected to the input of an inverter 162. The output of inverter 162 is connected to the anode of a diode 163 whose cathode is connected by a resistor 164 to the input of a Schmitt trigger inverter 165. Diode 163 serves as a half-wave rectifier, and resistor 164 serves as a current-limiting resistor for supplying positive half cycles of the 60 Hz. timing reference to a capacitor 167 which is connected between the input of inverter 165 and common. Capacitor 167 is charged by the positive half cycles of the 60 Hz. timing reference to a logic one state which will appear at the input of inverter 165. Therefore, the output of inverter 165 will be at a logic zero state when power is available for energizing the motor. Capacitor 167 will discharge through a resistor 166 to a logic zero state which will appear the input of inverter 165 so that the output of inverter 165 will transpose to a logic one state when a power failure occurs.

The output of inverter 165 is connected to the input of an inverter 168 whose output is connected to a first input of an AND gate 169. The second input of AND gate 169 is connected to a start inhibit line 170. As will be described later, a logic one state will appear on start inhibit line 170 in response to a reset pulse and will continue to appear on start inhibit line 170 unless the up travel limit setpoint for the door is in the process of being programmed. Since a logic zero state appears at the output of inverter 165 when power is available for energizing the motor, a logic one state will appear at the output of inverter 168. Therefore, the output of AND gate 169 will transpose to a logic one state in response to a reset pulse when power is available for energizing the motor.

The output of AND gate 169 is connected to a first input of an AND gate 160 so that AND gate 160 is enabled when the output of AND gate 169 transposes to a logic one state in response to a reset pulse when power is available for energizing the motor. If a start switch 154 is actuated, the output of AND gate 160 will transpose to a logic one state for initially energizing the up motor winding as will now be described.

Start switch 154 is connected between a line 155 and common. Line $V_{DD}$ is connected by a current-limiting resistor 156 to line 155. Line 155 is connected by a resistor 157 to the input of a Schmitt trigger inverter 158 whose output is connected to the second input of AND gate 160. A capacitor 159 is connected between the input of inverter 158 and common.

In operation, when the control circuitry is in a powered condition, capacitor 159 will be charged so that a logic one state appears at the input of inverter 158. Consequently, a logic zero state will appear at the output of inverter 158. If start switch 154 is actuated, capacitor 159 will discharge through resistor 157 so that a logic zero state will appear at the input of inverter 158. Consequently, the output of inverter 158 will transpose to a logic one state. Since the first input of AND gate 160 is at a logic one state when power is available for energizing the motor as described earlier, the output of AND gate 160 transposes to a logic one state if start switch 154 is actuated.

The output of AND gate 160 is connected to a second input of OR gate 181 whose output is connected to the reset input of each of the flip-flops 190a and 190b included in two-bit counter 190. Consequently, when the output of AND gate 160 transposes to a logic one state in response to actuation of start switch 154 at a time when power is available for energizing the motor following a reset pulse, the output of OR gate 181 transposes to a logic one state, and two-bit counter 190 is reset so that a logic zero state appears at the Q output of each of the flip-flops 190a and 190b included in two-bit counter 190.

The output of AND gate 160 is also connected to the set input of start latch 171. When the output of AND gate 160 transposes to a logic one state in response to actuation of start switch 154 at a time when power is available for energizing the motor, the Q output of start latch 171 transposes to a logic one state.

The Q output of start latch 171 is connected to a first input of an OR gate 172 whose output is connected to the clock input of sequence flip-flop 173. Consequently, when a logic one state appears at the Q output of start latch 171 in response to actuation of start switch 154 at a time when power is available for energizing the motor, the output of OR gate 172 transposes to a logic one state. Since a logic one state initially appears at the D input of sequence flip-flop 173 as described above, the Q output of sequence flip-flop 173 transposes to a logic one state, and the $\overline{Q}$ output of sequence flip-flop 173 transposes to a logic zero state.

The Q output of sequence flip-flop 173 is connected by a line 174 to a first input of an OR gate 175 whose output is connected to the clock input of start pulse flip-flop 176. Consequently, when a logic one state appears at the Q output of sequence flip-flop 173 in response to actuation of start switch 154 at a time when power is available for energizing the motor, the output of OR gate 175 transposes to a logic one state. Since a logic one state initially appears at the D input of start pulse flip-flop 176 as described above, the Q output of start pulse flip-flop 176 transposes to a logic one state, and the $\overline{Q}$ output of start pulse flip-flop 176 transposes to a logic zero state.

The Q output of start pulse flip-flop 176 is connected to a second input of OR gate 175 whose output is connected to the clock input of start pulse flip-flop 176. Consequently, when the Q output of start pulse flip-flop 176 transposes to a logic one state, start pulse flip-flop 176 is latched until reset.

The $\overline{Q}$ output of start pulse flip-flop 176 is connected by a line 177 to the clock input of motor run flip-flop 143 as well as to the clock input of start switch held flip-flop 140. Consequently, when the $\overline{Q}$ output of start pulse flip-flop 176 transposes to a logic zero state in response to actuation of start switch 154 at a time when power is available for energizing the motor, the Q output of motor run flip-flop 143 and the Q output of start switch held flip-flop 140 remain at a logic zero state in the first instance.

The Q output of start pulse flip-flop 176 is connected to a line 187. Consequently, when the Q output of start pulse flip-flop 176 transposes to a logic one state in response to actuation of start switch 154 at a time when power is available for energizing the motor,, a logic one state appears on line 187.

Line 187 is connected to the second input of AND gate 150. Since the first input of AND gate 150 is connected to the $\overline{Q}$ output of motor run flip-flop 143 which in the first instance is at a logic one state, the output of AND gate 150 transposes to a logic one state. Consequently, since as described above the output of AND gate 150 is connected to the input of OR gate 151, the output of OR gate 151 transposes to a logic one state. As a result, since as described above the output of OR gate 151 is connected to the first input of AND gate 152, AND gate 152 is enabled in response to actuation of start switch 154 when power is available for energizing the motor.

Furthermore, the Q output of sequence flip-flop 173 is connected to a second input of OR gate 172 whose output is connected to the clock input of sequence flip-flop 173 as described above. Consequently, when the Q output of sequence flip-flop 173 transposes to a logic one state, sequence flip-flop 173 is latched until reset.

The Q output of sequence flip-flop 173 is also connected by line 174 to the input of a time delay circuit 178 which preferably comprises a series of inverters as shown in FIG. 4A. There may be eight inverters, for example, included in time delay circuit 178. The output of time delay circuit 178 is connected to the second input of OR gate 179 whose output is connected to the reset input of sequence flip-flop 173 as described above. Consequently, when a logic one state appears at the output of sequence flip-flop 173 in response to actuation of start switch 154 at a time when power is available for energizing the motor, sequence flip-flop 173 is reset after the time delay provided by time delay circuit 178 so that the Q output of sequence flip-flop 173 transposes again to a logic zero state, and the $\overline{Q}$ output of sequence flip-flop 173 transposes again to a logic one state.

60 Hz. Counter Circuit

The reset circuit is connected to the 60 Hz. counter circuit by line 137. The reset pulse which appears on line 137 resets the counter, latches, and flip-flop included in the 60 Hz. counter circuit.

Line 137 is connected to a first input of an OR gate 183 whose output is connected to a first input of an OR gate 184. The output of OR gate 184 is in turn connected to a first input of an OR gate 185 whose output is connected to the reset input of a counter 186. In response to a reset pulse, a logic one state pulse sequentially appears at the output of each of the OR gates 183, 184, and 185 so that counter 186 is reset. Consequently, a logic zero state initially appears at each of the Q outputs of counter 186.

The output of OR gate 185 is also connected to the reset input of each of the latches 193, 202, and 203. Consequently, when a logic one state pulse appears at the output of OR gate 185 in response to a reset pulse, each of the latches 193, 202, and 203 is reset. As a result, the Q output of each of the latches 183, 202, and 203 transposes to a logic zero state.

Furthermore, the output of OR gate 185 is connected to the reset input of a lamp flip-flop 201. Consequently, when a logic one state pulse appears at the output of OR gate 185 in response to a reset pulse, lamp flip-flop 201 is reset so that a logic zero state initially appears at the Q output and a logic one state initially appears at the $\overline{Q}$ output of lamp flip-flop 201.

Finally, line 137 is connected to a first input of an OR gate 204 whose output is connected to the reset input of a timer latch 188. In response to a reset pulse, a logic one state pulse appears at the output of OR gate 204 so that timer latch 188 is reset. Consequently, a logic zero state initially appears at the Q output of timer latch 188.

As described earlier, actuation of start switch 154 at a time when power is available for energizing the motor clocks sequence flip-flop 173 so that the Q output of sequence flip-flop 173 transposes to a logic one state which appears on line 174. Line 174 is also connected to the 60 Hz. counter circuit.

Line 174 is connected to the second input of OR gate 183. As described above, the output of OR gate 183 is connected to the first input of OR gate 184 whose output is connected to the first input of OR gate 185 whose output is in turn connected to the reset input of counter 186, the reset input of each of the latches 193, 202, and 203, and the reset input of lamp flip-flop 201. Consequently, when the Q output of sequence flip-flop 173 transposes to a logic one state in response to actuation of start switch 154 at a time when power is available for energizing the motor, counter 186, latches 193, 202, and 203, and lamp flip-flop 201 are reset in the same manner as in response to a reset pulse.

The Q output of latch 193 is connected to the input of an inverter 194 whose output is connected to the second input of AND gate 152 which is described earlier is enabled in the first instance. When latch 193 is reset in response to actuation of start switch 154 at a time when power is available for energizing the motor following a reset pulse, the Q output of latch 193 will transpose to a logic zero state which will appear at the input of inverter 194. Consequently, the output of inverter 194 will transpose to a logic one state, and since AND gate 152 is enabled, the output of AND gate 152 transposes to a logic one state.

As described earlier, the output of AND gate 152 is connected to the clock input of direction control flip-flop 138. Consequently, when the output of AND gate 152 transposes to a logic one state in response to actuation of start switch 154 at a time when power is available for energizing the motor following a reset pulse, direction control flip-flop 138 is clocked so that the $\overline{Q}$ output of direction control flip-flop 138 transposes to a logic one state and the Q output of direction control flip-flop 138 transposes to a logic zero state. Since as described earlier the output of direction control flip-flop 138 is connected to the first input of AND gate 144, when the Q output of direction control flip-flop 138 transposes to a logic one state in response to actuation of start switch 154 at a time when power is available for energizing the motor, AND gate 144 is partially enabled.

The output of OR gate 151 is also connected to the set input of timer latch 188. Consequently, in response to actuation of start switch 154 at a time when power is available for energizing the motor following a reset pulse when as described earlier the output of OR gate 151 transposes to a logic one state, timer latch 188 is set so that a logic one state appears at the Q output of timer latch 188.

The Q output of timer latch 188 is connected to a first input of an AND gate 189 whose output is connected to the clock input of counter 186. The second input of AND gate 189 is connected to the output of inverter 162. Consequently, when timer latch 188 is set in response to actuation of start switch 154 at a time when power is available for energizing the motor following a reset pulse, 60 Hz. pulses appear at the clock input of counter 186.

The Q output of timer latch 188 is also connected to a first input of an AND gate 307 whose output is connected to a first input of an OR gate 305. The second input of AND gate 307 is connected to the output of an inverter 306 whose input is connected to a lockup line 288. As will be described later, a logic zero state appears on lockup line 288 unless the door is in the up position and the up limit setpoint has not been programmed. Consequently, when the Q output of timer latch 188 transposes to a logic one state in response to actuation of start switch 154 at a time when power is available for energizing the motor following a reset pulse, the output of AND gate 307 transposes to a logic one state.

The output of AND gate 307 is connected to a first input of an OR gate 305 whose output is connected by a current-limiting resistor 308 to the base of an NPN transistor 309 as shown in FIG. 4E. The coil of the lamp relay K3 is connected in the collector-emitter circuit of NPN transistor 309 so that when NPN transistor 309 is forward-biased the coil of the lamp relay will be energized for actuating a contact in order to connect power to the lamp which illuminates the region near the door. Since the output of AND gate 307 transposes to a logic one state in response to actuation of start switch 154 at a time when power is available for energizing the motor, the output of OR gate 305 transposes to a logic one state for energizing the lamp.

The $\overline{Q}$ output of sequence flip-flop 173 is connected to a first input of an AND gate 192 whose output is in turn connected to the second input of OR gate 182. As described earlier, the output of OR gate 182 is connected to the reset input of start pulse flip-flop 176. The $\overline{Q}$ output of sequence flip-flop 173 transposes again to a logic one state after a short time delay interposed by time delay circuit 178 after the $\overline{Q}$ output of sequence flip-flop 173 transposes to a logic zero state in response to actuation of start switch 154 at a time when power is available for energizing the motor following a reset pulse as described earlier. The Q output of start pulse flip-flop 176 is connected to a second input of AND gate 192. As described earlier, the Q output of start pulse flip-flop 176 transposes to a logic one state in response to actuation of start switch 154 at a time when power is available for energizing the motor following a reset pulse. The Q5 output of counter 186 is connected by a line 191 to the third input of AND gate 192. After a predetermined time, for example, 250 milliseconds, after actuation of start switch 154, the Q5 output of counter 186 transposes to a logic one state. Consequently, when the Q5 output of counter 186 transposes to a logic one state, the output of AND gate 192 transposes to a logic one state. As a result, the output of OR gate 182 transposes to a logic one state, and start pulse flip-flop 176 is reset so that the Q output of start pulse flip-flop 176 transposes again to a logic zero state and the $\overline{Q}$ output of start pulse flip-flop 176 transposes again to a logic one state.

As described earlier, the $\overline{Q}$ output of start pulse flip-flop 176 is connected by line 177 to the clock input of motor run flip-flop 43 as well as to the clock input of start switch held flip-flop 140. Since a logic one state initially appears at the D input of motor run flip-flop 143 as described earlier, when the $\overline{Q}$ output of start pulse flip-flop 176 transposes to a logic one state, motor run flip-flop 143 is clocked so that the Q output of motor run flip-flop 143 transposes to a logic one state.

The Q6 output of counter 186 is connected to the set input of latch 193. When counter 186 has counted a sufficient number of 60 Hz. pulses after actuation of start switch 154, the Q6 output of counter 186 transposes to a logic one state. Consequently, latch 193 is set so that the Q output of latch 193 transposes to a logic one state.

The Q output of latch 193 is connected to the third input of AND gate 144 as well as to the third input of AND gate 147. Since the Q output of each of the direction control flip-flop 138 and motor run flip-flop 143 are at a logic one state in response to actuation of start switch 154 at a time when power is available for energizing the motor following a reset pulse, when the Q output of latch 193 transposes to a logic one state approximately 500 milliseconds after actuation of start switch 154, the output of AND gate 144 transposes to a logic one state for energizing the up motor winding.

After start switch 154 is released, capacitor 159 will begin to recharge through a charging circuit which includes resistors 156 and 157. After a time delay which depends on the time constant of the charging circuit, the voltage across capacitor 159 will reach a logic one state which will appear at the input of inverter 158. As a result, the output of inverter 158 will transpose to a logic zero state, and the output of AND gate 160 will transpose to a logic zero state.

The output of AND gate 160 is connected to the input of an inverter 195 whose output is connected to a first input of an AND gate 196. The second input of AND gate 196 is connected to the Q output of start latch 171 which as described earlier transposes to a logic one state in response to actuation of start switch 154 at a time when power is available for energizing the motor following a reset pulse. Consequently, when the output of inverter 195 transposes to a logic one state upon release start switch 154, the output of AND gate 196 transposes to a logic one state.

The output of AND gate 196 is connected to a first input of an AND gate 197. The second input of AND gate 197 is connected to the output of inverter 162. Consequently, upon release of start switch 154, 60 Hz. pulses appear at the output of AND gate 197.

The output of AND gate 197 is connected to the clock input of two-bit counter 190. After a time delay, for example, 32 to 48 milliseconds, the Q output of each of the flip-flops 190a and 190b included in two-bit counter 190 transposes to a logic one state. The Q output of each of the flip-flops 190a and 190b is connected to a respective input of an AND gate 198 whose output is connected to the second input of OR gate 180. The output of OR gate 180 is connected to the reset input of start latch 171 as described earlier. Consequently, after a short time delay of 32 to 48 milliseconds provided by two-bit counter 190 upon release of start switch 154, start latch 171 is reset.

The time delay provided by two-bit counter 190 prevents switch bounce upon release of start switch 154 from retriggering the control circuitry. In contrast, switch bounce when start switch 154 is actuated is of no consequence since start latch 171 is set on the first leading edge of the pulse which occurs when start switch 154 is actuated.

The output of OR gate 180 is also connected to the third input of OR gate 181 whose output is connected to the reset input of each of the flip-flops 190a and 190b included in two-bit counter 190 as described earlier. Consequently, counter 190 is also reset.

The Q output of start latch 171 is also connected to the input of an inverter 199 whose output is connected by a line 200 to the second input of OR gate 139 whose output is connected to the reset input of start switch held flip-flop 140 as shown in FIG. 4D. Consequently, when start latch 171 is reset upon release of start switch 154 so that the Q output of start latch 171 transposes again to a logic zero state, the output of inverter 199 transposes to a logic one state, and start switch held flip-flop 140 is reset so that a logic zero state appears at the Q output and a logic one state appears at the $\overline{Q}$ output of start switch held flip-flop 140.

In summary, if start switch 154 is actuated when power is available for energizing the motor after a reset pulse appears, such as after the alternating current power source is connected to the power supply circuit following installation of the garage door operator, the up motor winding is energized for moving the door in the up direction. Initially moving the door in the up direction rather than in the down direction is for safety. That is, there is less risk of injury or damage if the door is moved in the up direction rather than in the down direction the first time that start switch 154 is actuated.

Once start switch 154 is released and start latch 171 is reset after a short time delay provided by two-bit counter 190, actuation of start switch 154 again will cause the up motor winding to be de-energized so that movement of the door is halted. Actuation of start switch 154 while the up motor winding is energized will initiate the same sequence for the start circuit which has been described in detail above when start switch 154 is actuated the fist time. That is, a pulse is generated by sequence flip-flop 173 for resetting the 60 Hz. counter circuit. The pulse is triggered when start latch 171 is set in response to actuation of start switch 154 and is terminated following a time delay provided by time delay circuit 178 whereupon sequence flip-flop 173 is reset. In response to the pulse generated by sequence flip-flop 173, start pulse flip-flop 176 generates a start pulse for clocking motor run flip-flop 143. Since a logic zero state appears at the $\overline{Q}$ output of motor run flip-flop 143, when motor run flip-flop 143 is clocked, a logic zero state appears at the Q output and a logic one state appears at the $\overline{Q}$ output of motor run flip-flop 143.

Since the Q output of motor run flip-flop 143 is connected to the second input of AND gate 144, when the Q output of motor run flip-flop 143 transposes to a logic zero state in response to the start pulse, the output of AND gate 144 transposes to a logic zero state. Consequently, NPN transistor 146 is reverse-biased so that the up motor winding is de-energized and movement of the door is halted.

After a short time delay provided by two-bit counter 190 following release of start switch 154 after being actuated the second time in order to halt movement of the door, the start circuit is conditioned so that sequence flip-flop 173 will generate another pulse and start pulse flip-flop 176 will generate another start pulse if start switch 154 is actuated again. The 60 Hz. counter circuit is reset by the pulse generated by sequence flip-flop 173. Since a logic one state appears at the $\overline{Q}$ output of motor run flip-flop 143, the output of AND gate 150, the output of OR gate 151, and the output of AND gate 152 sequentially transpose to a logic one state for clocking direction of flip-flop 138 in response to the start pulse generated by start pulse flip-flop 176 so that a logic zero state appears at the Q output and a logic one state appears at the $\overline{Q}$ output of direction flip-flop 138. The start pulse also clocks motor run flip-flop 143 so that a logic one state appears at the Q output and a logic zero state appears at the $\overline{Q}$ output of motor run flip-flop 143.

Since the $\overline{Q}$ output of direction flip-flop 138 is connected to the first input of AND gate 147 and the Q output of motor run flip-flop 143 is connected to the second input of AND gate 147, when the Q output of latch 193 transposes to a logic one state after counter 186 counts a sufficient number of 60 Hz. pulses after the pulse is generated by sequence flip-flop 173, the output of AND gate 147 transposes to a logic one state. Consequently, NPN transistor 149 is forward-biased for energizing the down motor winding for moving the door in the down direction.

The operation of the motor control circuit, start circuit, and 60 Hz. counter circuit in response to actuation of start switch 154 should now be apparent. In response to a subsequent actuation of start switch 154, the down motor winding will be deenergized so that movement of the door is halted. If start switch 154 were actuated another time, the up motor winding would again be energized for moving the door in the up direction. The capability to stop the door at any point of travel and then reverse movement of the door by actuating start switch 154 a number of times has distinct advantages. For example, the door could be raised a short distance from the down position and then stopped in order to allow a pet to exit the garage and then closed again without having to open the door to the fully open position before being able to again close the door.

Encoder Pulse Verification Circuit

Once either the up motor winding or the down motor winding is energized and the door begins to move, the travel encoder disc which is driven by the motor begins to rotate. As described earlier, the disc is a slotted disc.

Line 126 is connected by a current-limiting resistor 205 to the anode of an infrared light-emitting diode (LED) 206 whose cathode is connected to the anode of an infrared LED 207 whose cathode is in turn connected to common. LEDs 206 and 207 are continuously energized by the unregulated 24 volts direct current which appears on line 126.

The light radiated by LED 206 is detected by a phototransistor 208 whose collector is connected by a pullup resistor 209 to line $V_{DD}$ and whose emitter is connected to common. Similarly, the light radiated by LED 207 is detected by a phototransistor 210 whose collector is connected by a pullup resistor 211 to line $V_{DD}$ and whose emitter is connected to common.

The junction between the collector of phototransistor 208 and pullup resistor 290 is connected by a filter comprising a resistor 212 and a capacitor 213 to the input of a Schmitt trigger inverter 214. Similarly, the junction between the collector of phototransistor 210 and pullup resistor 211 is connected by a filter comprising a resistor 215 and a capacitor 216 to the input of a Schmitt trigger inverter 217.

The travel encoder disc is positoned between LEDs 206 and 207 and phototransistors 208 and 210. As described earlier, LEDs 206 and 207 are offset along a vertical line, and also phototransistors 208 and 210 are offset in a similar manner.

When an opaque section of the disc is interposed between LED 206 and phototransistor 208, the impedance of the collector-emitter circuit of phototransistor 208 is large so that a logic one state appears at the input of inverter 214. When, however, a slotted section of the disc rotates between LED 206 and phototransistor 208, the light which impinges on phototransistor 208 causes the impedance of the collector-emitter path of phototransistor 208 to be very low so that a logic zero state appears at the input of inverter 214. Similarly, when an opaque section of the disc is interposed between LED 207 and phototransistor 210, a logic one state appears at the input of inverter 217, whereas, when a slotted section of the disc is interposed between LED 207 and phototransistor 210, a logic one state appears at the input of inverter 217.

The output of inverter 214 is connected to the input of an inverter 218. The output of inverter 218 is in turn connected to a first input of an AND gate 219 whose output is connected to the set input of a latch 220. The output of inverter 218 is also connected to a first input of an AND gate 227. The output of AND gate 227 is in turn connected to a first input of an OR gate 228 whose output is connected to the clock input of a clock pulse flip-flop 229. The output of inverter 218 is also connected to a first input of an AND gate 221 as well as to a first input of an AND gate 222. Additionally, the output of inverter 214 is connected to a first input of an AND gate 223 whose output is connected to the set input of a latch 224. Finally, the output of inverter 214 is connected to a first input of an AND gate 225.

In a somewhat similar fashion, the output of inverter 217 is connected to the input of an inverter 226. The output of inverter 226 is connected to the second input of AND gate 223 and to a second input of AND gate 227. Also, the output of inverter 226 is connected to a second input of AND gate 221 and to a second input of AND gate 222. Additionally, the output of inverter 217 is connected to the second input of AND gate 219. Finally, the output of inverter 217 is connected to a second input of AND gate 225.

The pulses which are produced by inverters 214, 217, 218, and 226 in response to rotation of the disc between LEDs 206 and 207 and phototransistors 208 and 210 are interpreted by the encoder pulse verification circuit for detecting the direction of rotation of the disc in order to determine the direction of movement of the door as well as for detecting whether or not the door has actually moved in the indicated direction over a predetermined incremental distance.

The reset circuit is connected to the encoder pulse verification circuit by line 137. The reset pulse which appears on line 137 initially resets latches 220 and 224 and clock pulse flip-flop 229 but is not utilized to reset a direction latch 230 since the Q output of direction latch 230 will automatically assume a proper logic state dependent of the direction of movement of the door.

Line 137 is connected to a first input of an OR gate 231 whose output is connected to the reset input of clock pulse flip-flop 229 so that a logic zero state initially appears at the $\overline{Q}$ output and a logic one state appears at the Q output of clock pulse flip-flop 229 in response to a reset pulse. Since the $\overline{Q}$ output and the D input of clock pulse flip-flop 229 are interconnected, a logic one state initially appears at the D input of clock pulse flip-flop 229 in response to a reset pulse. Furthermore, line 137 is connected to a first input of a NOR gate 232. The output of NOR gate 232 is connected to the input of an inverter 233 whose output is connected to the reset input of latch 220. Also, line 137 is connected to a first input of a NOR gate 234. The output of NOR gate 234 is connected to the input of an inverter 235 whose output is connected to the reset input of latch 224.

In response to a reset pulse, the output of NOR gate 232 is constrained to transpose to a logic zero state so that a logic zero state pulse appears at the output of NOR gate 232 which in turn means that a logic one state pulse appears at the output of inverter 233 and latch 220 is reset. Consequently, a logic zero state initially appears at the Q output of latch 220. Similarly, in response to a reset pulse, the output of NOR gate 234 is constrained to transpose to a logic zero state so that a logic zero state appears at the output of NOR gate 234 which in turn means that a logic one state pulse appears at the output of inverter 235 and latch 224 is reset. Consequently, a logic zero state initially appears at the Q output of latch 224.

As described earlier, when start switch 154 is actuated at a time when power is available for energizing the motor following a reset pulse, the up motor winding is energized for moving the door in the up direction. For ease of understanding, assume that an opaque section of the disc is initially disposed between LED 206 and phototransistor 208 as well as between LED 207 and phototransistor 210 so that a logic one state appears at the input of inverter 214 as well as the input of inverter 217. Consequently, the output of each of the inverters 214 and 217 will be at a logic zero state. As a result, the output of AND gate 219 whose second input is connected to the output of inverter 217 will be at a logic zero state. Since the output of AND gate 219 is connected to the set input of latch 220, the Q output of latch 220 will remain at a logic zero state. Also, the output of AND gate 223 whose first input is connected to the output of inverter 214 wll be at a logic zero state. Since the output of AND gate 223 which is connected to the set input of latch 224, the Q output of latch 224 will remain at a logic zero state. Furthermore, since the output of inverter 214 and the output of inverter 217 are connected to the first and second inputs of AND gate 225, the output of AND gate 225 will be at a logic zero state. Consequently, since the output of AND gate 225 is connected to a first input of an AND gate 236 and to a first input of an AND gate 237, the output of AND gate 236 which is connected to a second input of NOR gate 234 as well as the output of AND gate 237 which is connected to a second input of NOR gate 232 will be at a logic zero state. Since a logic zero state appears at the first input of each of the AND gates 236 and 237, the output of each of the AND gates 236 and 237 will be at a logic zero state, and each of the NOR gates 232 and 234 will be partially enabled.

On the other hand, the output of each of the inverters 218 and 226 will be at a logic one state. The output of inverter 218 is connected to the second input of AND gate 219 and the output of inverter 226 is connected to the second input of AND gate 223, but as mentioned above the output of each of the AND gates 219 and 223 is initially disabled since a logic zero state appears at the output of each of the inverters 214 and 217. The output of each of the inverters 218 and 226 are connected to the first and second inputs of AND gate 227. Since, however, the Q output of latch 220 is connected to a third input and the Q output of latch 224 is connected to the fourth input of AND gate 227 and a logic zero state initially appears at the Q output of each of the latches 220 and 224, the output of AND gate 227 will be in a logic zero state. Consequently, clock pulse flip-flop 229 whose clock input is connected to the output of OR gate 228 whose first input is in turn connected to the output of AND gate 227 will not be clocked. Furthermore, the output of inverter 218 is connected to the first input of each of the and gates 221 and 222 and the output of inverter 226 is connected to the second input of each of the AND gates 221 and 222. However, the Q output of latch 220 is connected to a third input of AND gate 222. The output of AND gate 222 is connected to a third input of each of the NOR gates 232 and 234. Since the Q output of latch 220 is initially at a logic zero state, the output of AND gate 222 will be at a logic zero state, each of the NOR gates 232 and 234 will be partially enabled. Similarly, the Q output of latch 224 is connected to a third input of AND gate 221, and, since the Q output of latch 224 is initially at a logic zero state, the ouput of AND gate 221 which is connected to a fourth input of NOR gate 232 and to a fourth input of NOR gate 234 transposes to a logic zero state. Consequently, since the output of AND gate 221 will initially be at a logic zero state, each of the NOR gates 232 and 234 will be partially enabled. Since a logic zero state initially appears at the Q output of clock pulse flip-flop 229 which is connected to a fifth input of each of the NOR gates 232 and 234 and the remainder of the inputs of each of the NOR gates 232 and 234 is connected to common, all of the inputs of each of the NOR gates 232 and 234 initially will be at a logic zero state. Consequently, the output of NOR gate 232 transposes to a logic one state which in turn means that the output of inverter 233 transposes to a logic zero state which appears at the reset input of latch 220, and the output of NOR gate 234 transposes to a logic one state which in turn means that the output of inverter 235 transposes to a logic zero state which appears at the reset input of latch 224.

Now, as the door moves in the up direction and the disc rotates, a slot rotates between LED 206 and phototransistor 208, whereas an opaque section continues to be disposed between LED 207 and phototransistor 210. Consequently, a logic zero state appears at the input of inverter 214 while a logic one state continues to appear at the input of inverter 217. As a result, the output of inverter 214 transposes to a logic one state, whereas a logic zero state continues to appear at the output of inverter 217, and the output of inverter 218 transposes to a logic zero state, whereas a logic one state continues to appear at the output of inverter 226. Since the output of each of the inverters 214 and 226 is connected to one of the two inputs of AND gate 223, the output of AND gate 223 transposes to a logic one state. When the output of AND gate 223 transposes to a logic one state, 224 is set so that the Q output of latch 224 transposes to a logic one state. The Q output of latch 224 is connected to a first input of an AND gate 238, whereas the Q output of latch 220 is connected to the input of an inverter 239 whose output is connected to the second input of AND gate 238, and the output of AND gate 238 is connected to the set input of direction latch 230. Since the Q output of latch 220 is initially at a logic zero state, the output of inverter 239 is initially at a logic one state. Consequently, when the Q output of latch 224 transposes to a logic one state when a slot rotates between LED 206 and phototransistor 208, the output of AND gate 238 transposes to a logic one state, and direction latch 230 is set so that a logic one state appears at the Q output of latch 230.

The Q output of direction latch 230 is connected to a first input of an OR gate 242 whose output is connected to a count up/down line 243. Since the direction of movement of the door is in the up direction and the Q output of direction latch 230 is at a logic one state, the output of OR gate 242 transposes to a logic one state which appears on count up/down line 243 for controlling the up/down counter circuit to count up as will be described more fully later.

Since the output of inverter 218 is connected to the second input of each of the AND gates 221 and 222, the output of each of the AND gates 221 and 222 remains at a logic zero state so that the output of each of the NOR gates 232 and 234 remains at a logic one state, and the output of each of the inverters 233 and 235 remains at a logic zero state so that neither of the latches 220 or 224 is reset.

As the door continues to move in the up direction and the disc rotates, the slot rotates between both LEDs 206 and 207 and phototransistors 208 and 210. Consequently, a logic zero state appears at the input of each of the inverters 214 and 217. As a result, the output of inverter 217 transposes to a logic one state while a logic one state continues to appear at the output of inverter 214. Also, the output of inverter 226 transposes to a logic zero state while a logic zero state continues to appear at the output of inverter 218. Since the output of inverter 226 is connected to the second input of AND gate 223, when the output of inverter 226 transposes to a logic zero state, the output of AND gate 223 transposes again to a logic zero state which appears at the set input of latch 224. Otherwise, the outputs of the other elements included in the encoder pulse verification circuit remain unchanged.

As the door continues to move in the up direction, the disc rotates to a point where an opaque section rotates between LED 206 and phototransistor 208 while the slot continues to be disposed between LED 207 and phototransistor 210. Consequently, a logic one state appears at the input of inverter 214 while a logic zero state continues to appear at the input of inverter 217. As a result, the output of inverter 214 transposes to a logic zero state while the output of inverter 217 remains at a logic one state. Also, the output of inverter 218 transposes to a logic one state while the output of inverter 226 remains at a logic zero state. Since the output of each of the inverters 217 and 218 is connected to one of the two inputs of AND gate 219, when the output of inverter 218 transposes to a logic one state, the output of AND gate 219 transposes to a logic one state, and latch 220 is set. When latch 220 is set, the Q output of latch 220 transposes to a logic one state.

The Q output of latch 220 is connected to a first input of an AND gate 240 whose output is connected to the reset input of direction latch 230. A logic zero state continues to appear at the output of AND gate 240, however, because the second input of AND gate 240 is connected to the output of an inverter 241 which is at a logic zero state since the input of inverter 241 is connected to the Q output of latch 224 which as described above is at a logic one state.

As the door continues to open and the disc rotates, the opaque section rotates between LED 207 and phototransistor 210 as well as between LED 206 and phototransistor 208. Consequently, a logic one state will appear at the input of each of the inverters 214 and 217. As a result, the output of inverter 214 remains at a logic zero state, whereas the output of inverter 217 will transpose to a logic zero state. Also, the output of inverter 218 remains at a logic one state, whereas the output of inverter 226 will transpose to a logic one state.

As described above, the $\overline{Q}$ output and the D input of clock pulse flip-flop 229 are interconnected so that a logic one state initially appears at the D input of clock pulse flip-flop 229. Also, the output of each of the inverters 218 and 226 and the Q output of each of the latches 220 and 224 are connected to the first through fourth inputs of AND gate 227. Since a logic one state appears at the output of inverter 218 and at the output of each of the latches 220 and 224, when the output of inverter 226 transposes to a logic one state, the output of AND gate 227 transposes to a logic one state which means that the output of OR gate 228 transposes to a logic one state for clocking clock pulse flip-flop 229 so that a logic one state appears at the Q output and a logic zero state appears at the $\overline{Q}$ output of clock pulse flip-flop 229.

The Q output of clock pulse flip-flop 229 is connected to a first input of an OR gate 244 whose output is connected to a clock pulse line 245. When the Q output of clock pulse flip-flop 229 transposes to a logic one state, the output of OR gate 244 transposes to a logic one state which appears on clock pulse line 245 for incrementing the up/down counter circuit as the door is opened.

Furthermore, the Q output of clock pulse flip-flop 229 is connected to a second input of OR gate 228 whose output is connected to the clock input of clock pulse flip-flop 229 as described above. Consequently, when the Q output of clock pulse flip-flop 229 transposes to a logic one state, clock pulse flip-flop 229 is latched until reset.

Finally, the Q output of clock pulse flip-flop 229 is connected to a time delay circuit 246 whose output is connected to a second input of OR gate 231 whose output is in turn connected to the reset input of clock pulse flip-flop 229 as described above. As shown in FIG. 4C, time delay circuit 246 may comprise a number of inverters, for example, eight inverters, connected in series. Consequently, when the Q output of clock pulse flip-flop 229 transposes to a logic one state, after a time delay provided by time delay circuit 246, the output of OR gate 231 transposes to a logic one state, and clock pulse flip-flop 229 is reset so that a logic zero state appears at the Q output and a logic one state appears at the $\overline{Q}$ output of clock pulse flip-flop 229.

The Q output of clock pulse flip-flop 229 is connected to time delay circuit 246 which provides a delay of at least one microsecond before a reset pulse is applied to the reset input of clock pulse flip-flop 229. The width of the clock pulse which appears on clock pulse line 245 should be sufficient to clock the up/down counter circuit and reset the obstruction detector circuit counter under all conditions.

The Q output of clock pulse flip-flop 229 is also connected to the fifth input of each of the NOR gates 232 and 234. Consequently, when the Q output of clock pulse flip-flop 229 transposes to a logic one state after the disc rotates a certain angular distance as the door is opened, the output of each of the NOR gates 232 and 234 transposes to a logic zero state which in turn means that the output of each of the inverters 233 and 235 transposes to a logic one state, and latches 220 and 224 are reset so that a logic zero state appears at the Q output of each of the latches 220 and 224.

When the down motor winding is energized for closing the door, the sequences of the encoder pulse verification circuit is opposite that when the up motor winding is energized for opening the door.

For ease of understanding, again assume that an opaque section of the disc is initially between LED 206 and phototransistor 208 and between LED 207 and phototransistor 210 as the door commences movement in the closing direction. Consequently, a logic one state will appear at the input of each of the inverters 214 and 217. As a result, a logic zero state will appear at the output of each of the inverters 214 and 217, and a logic one state will appear at the output of each of the inverters 218 and 226. Therefore, only the output of each of the NOR gates 232 and 234 will transpose to a logic one state so that the output of each of the inverters 233 and 235 transposes to a logic zero state.

As the disc rotates while the door is closed, a slot moves between LED 207 and phototransistor 210, whereas an opaque section remains between LED 206 and phototransistor 208. Consequently, a logic zero state appears at the input of inverter 217 while a logic one state continues to appear at the input of inverter 214. As a result, the output of inverter 217 transposes to a logic one state, and the output of inverter 226 transposes to a logic zero state while the output of inverter 214 remains at a logic zero state and the output of inverter 218 remains at a logic one state. Also, the output of AND gate 219 transposes to a logic one state, and, consequently, latch 220 is set so that a logic one state appears at the Q output of latch 220. Since a logic zero state appears at the Q output of latch 224, a logic one state will appear at the output of inverter 241. Consequently, when the Q output of latch 220 transposes to a logic one state, the output of AND gate 240 transposes to a logic one state, and direction latch 230 is reset so that a logic zero state appears at the Q output of direction latch 230.

As the door continues to be closed and the disc continues to rotate, the slot will rotate between both LED 206 and phototransistor 208 as well as between LED 207 and phototransistor 210. Consequently, a logic zero state appears at the input of each of the inverters 214 and 217. The output of inverter 214 transposes to a logic one state and the output of inverter 218 transposes to a logic zero state while the output of inverter 217 remains at a logic one state and the output of inverter 226 remains at a logic zero state. When the output of inverter 218 transposes to a logic zero state, the output of AND gate 219 transposes again to a logic zero state. The outputs of all other elements of the encoder pulse verification circuit retain the same logic state.

As the disc continues to rotate as the door is closed, the slot will appear between LED 206 and phototransistor 208, but an opaque section will move between LED 207 and phototransistor 210. Consequently, a logic zero state will appear at the input of inverter 214 and a logic one state will appear at the input of inverter 217. As a result, the output of inverter 214 will remain at a logic one state, and the output of inverter 218 will remain at a logic zero state, but the output of inverter 217 transposes to a logic zero state, and the output of inverter 226 transposes to a logic one state. Therefore, the output of AND gate 223 transposes to a logic one state, and latch 224 is set so that the Q output of latch 224 transposes to a logic one state. Since the Q output of latch 220 is at a logic one state, however, the output of inverter 239 is at a logic zero state so that the output of AND gate 238 does not transpose to a logic one state when the Q output of latch 224 transposes to a logic one state, and, consequently, direction latch 230 is not set. As a result, a logic zero state continues to appear at the Q output of direction latch 230.

Finally, as the disc continues to rotate as the door is closed, the opaque section of the disc moves between LED 206 and phototransistor 208 as well as between LED 207 and phototransistor 210. Consequently, a logic one state appears at the input of each of the inverters 214 and 217. As a result, the output of inverter 214 transposes to a logic zero state, the output of inverter 218 transposes to a logic one state, and the outputs of inverters 217 and 226 remain at a logic zero state and a logic one state, respectively. The output of AND gate 227 transposes to a logic one state and the output of OR gate 228 transposes to a logic one state for clocking the clock pulse flip-flop 229. Also, the output of each of the NOR gates 232 and 234 transposes to a logic zero state so that the output of each of the inverters 233 and 235 transposes to a logic one state and latches 220 and 224 are reset. After a time delay provided by time delay circuit 246, clock pulse flip-flop 229 is reset. As a result, a logic one state pulse appears on clock pulse line 245 while a logic zero state appears on count up/down line 243.

In summary, operation of the encoder disc causes a direction latch 230 to be set when the door is moved in the opening direction and to be reset when the door is moved in the closing direction. Furthermore, clock pulse flip-flop 229 included in the encoder pulse verification circuit generates a logic one state clock pulse every time the door moves an incremental distance determined by the distance between slots on the encoder disc which may be, for example, 3/32".

Furthermore, AND gates 221, 222, 225, 236, and 237, NOR gates 232 and 234, and an inverter 247 are connected to the various other elements in the encoder pulse verification circuit for resetting latches 220 and 224 in the event that the sequence indicated by the changes of the various states of the outputs of inverters 214, 217, 218, and 226 is not in accordance with the sequence for movement of the door either in the opening direction or the closing direction as described above. The out-of-sequence circuitry 221, 222, 225, 232, 234, 236, 237, and 247 prevents indication of door travel such as when the encoder disc is shaken during the movement of the door or when the door rebounds when the mechanical stop or the threshold is encountered during movement of the door.

That is, AND gates 221, 222, 225, 236, and 237 are included to look for erroneous decodes of the logic states at the outputs of inverters 214, 217, 218, and 226 which indicate an event out of a desired sequence. For example, if the disc should rotate in the opening direction to the point where the input of inverter 214 was at a logic zero state and then, instead of the input of both inverters 214 and 217 becoming a logic zero state the input of inverter 214 returned to a logic one state, such would be an out-of-sequence event indicating that a full slot traverse had not occurred. Consequently, a logic one state would appear at the third input of AND gate 221 as a result of the logic one state which appears at the Q output of latch 224. Also, a logic one state would appear at the fourth input of AND gate 221 as a result of connection to the output of inverter 239 whose input is connected to the Q output of latch 220 which is at a logic zero state. Furthermore, a logic one state would appear at the second input of AND gate 221 since a logic one state appears at the output of inverter 226. If, then, the output of inverter 214 transposes to a logic one state in response to reverse rotation of the disc, the output of AND gate 221 transposes to a logic one state. Consequently, the output of each of the NOR gates 232 and 234 transposes to a logic zero state and the output of each of the inverters 233 and 235 transposes to a logic one state so that latches 220 and 224 are reset. Therefore, the encoder pulse verification circuit ignores the out-of-sequence event. All other out-of-sequence events are covered by the decode gates 221, 222, 225, 236, and 237 for both opening and closing movement of the door. Any erroneous event, therefore, causes reset of latches 220 and 224.

The encoder pulse verification circuit allows the control circuitry to gain information with regard to the actual door location and direction of travel even during coasting and recoil or bouncing of the door, as occurs when the door meets the floor, obstacles, mechanical stops, etc. The number of slots in the encoder disc determines the resolution. In the normal case, the resolution will be 3/32" of linear door travel equivalent to the distance between slots of the disc.

Obstruction Detector Circuit

When a reset pulse is generated by the reset circuit, the obstruction detector circuit is reset. When a reset pulse appears on line 137, a logic one state pulse sequentially appears at the outputs of OR gates 183 and 184.

The output of OR gate 184 is connected by a line 248 to a first input of an OR gate 249 whose output is connected to the reset of a detection counter 250. Detection counter 250 is also reset in response to actuation of start switch 154 at a time when power is available for energizing the motor since the logic one state pulse generated by sequence flip-flop 173 also causes a logic one state pulse to appear sequentially at the outputs of OR gates 183, 184, and 249. In response to a reset pulse or a pulse generated in response to actuation of start switch 154 at a time when power is available for energizing the motor, detection counter 250 is reset, and a logic zero state appears at the Q outputs of detection counter 250.

As described earlier, in response to the initial actuation of start switch 154 when power is available for energizing the motor, the logic one state pulse generated by sequence flip-flop 173 resets counter 186. Furthermore, when a start pulse is generated by the start circuit, lamp latch 188 is set so that counter 186 counts 60 Hz. pulses. After a predetermined amount of time, the Q 6 output of counter 186 transposes to a logic one state which sets latch 193 so that the Q output of latch 193 transposes to a logic one state. Consequently, the output of AND gate 144 transposes to a logic one state for energizing the up motor winding. The output of AND gate 144 is also connected to a first input of a NOR gate 251 as shown in FIG. 4E. Consequently, the output of NOR gate transposes to a logic zero state.

The output of NOR gate 251 is connected to an up oscillator 252. When the output of NOR gate 251 transposes to a logic zero state when the up motor winding is energized, up oscillator 252 commences oscillation.

The output of NOR gate 251 is connected to a first input of a NOR gate 395 whose output is connected by a damping resistor 403 to an up oscillator tank circuit comprising a capacitor 404 and an inductor 405. The output of NOR gate 251 is also connected to the input of an inverter 396 whose output is connected to the input of another inverter 397 whose output is in turn connected to the input of yet another inverter 398. The output of inverter 398 is connected to a first input of a NAND gate 399. A NAND gate 400 has a first input connected to the output of NAND gate 399 and a second input connected to line $V_{DD}$ as well as an output connected to a first input of a NOR gate 401. A second input of NOR gate 401 is connected to common while the output of NOR gate 401 is connected to a first input of a NOR gate 402 whose second input is also connected to common. The output of NOR gate 402 is in turn connected to a second input of NOR gate 395.

The junction between damping resistor 403 and the up oscillator tank circuit is connected by a coupling capacitor 406 to a first input of a NAND gate 407. A second input of NAND 407 is connected to line $V_{DD}$, and the output of NAND gate 407 is connected to a second input of NAND gate 399. A resistor 408 interconnects the output and the first input of NAND gate 407 so that NAND gate 407 in effect serves as an inverting amplifier.

Initially, the outputs of inverter 397, NAND gate 399, and NOR gate 401 will be at a logic one state. The outputs of NOR gate 395, inverter 396, inverter 398, NAND gate 400, and NOR gate 402 will be at a logic zero state.

As soon as the up motor winding is energized, the output of NOR gate 251 transposes to a logic zero state. Since, as just mentioned, the output of NOR gate 402 is at a logic zero state, the output of NOR gate 395 transposes to a logic one state which appears across damping resistor 403 and the up oscillator tank circuit so that the tank circuit is excited. However, shortly after the output of NOR gate 251 transposes to a logic zero state, the output of inverter 398 transposes to a logic one state. When the output of inverter 398 transposes to a logic one state, the output of NAND gate 399 is driven toward a logic zero state. Consequently, the output of NAND gate 400 transposes to a logic one state, the output of NOR gate 401 transposes to a logic zero state, the output of NOR gate 402 transposes to a logic one state, and the output of NOR gate 395 again returns to a logic zero state, thereby removing excitation from the up oscillator tank circuit. As a result, an oscillator start-up pulse is provided to excite the up oscillator tank circuit, the width of the start-up pulse being determined by the pulse propagation time from the output of NOR gate 251 through inverters 396, 397, and 398 and gates 399, 400, 401, 402, and 395.

As the voltage across the up oscillator tank circuit charges in a positive direction, the positive-going voltage is coupled to the first input of NAND gate 407 by feedback capacitor 406. Consequently, the output of NAND gate 407, which is biased as an amplifier, changes in a negative direction passing through the detection threshold of the second input of NAND gate 399 so as to be interpreted as a logic zero state. As a result, the output of NAND gate 399 again returns to a logic one state. Therefore, the output of NAND gate 400 transposes to a logic zero state, and the output of NOR gate 401 transposes to a logic one state. The output of NOR gate 402 then transposes to a logic zero state, and the output of NOR gate 395 transposes to a logic one state once again which appears across damping resistor 403 and the up oscillator tank circuit.

After the up oscillator tank circuit charges to maximum voltage and then begins to decay in a negative direction, the negative-going voltage is coupled to the first input of NAND gate 407 by feedback capacitor 406. Consequently, the output of NAND gate 407, which is biased as an amplifier, changes in a positive direction again traversing the threshold of the second input of NAND gate 399 so as to be interpreted as a logic one state. With both the first and second inputs of NAND gate 399 again at a logic one state, the output of NAND gate 399 again transposes to a logic zero state. This results in the output of NAND gate 400 transposing to a logic one state, the output of NOR gate 401 transposing to a logic zero state, the output of NOR gate 402 transposing to a logic one state, and the output of NOR gate 395 transposing to a logic zero state, once again removing excitation from the oscillator tank circuit.

By way of further elaboration, up oscillator 252 functions as a gated oscillator which transposes from a normally de-energized mode to a start-up mode and then to a sustained oscillatory mode after it is gated on in response to a start-up pulse as described above. The up oscillator is gated off when the up motor winding is de-energized.

The gating control is supplied by the output of inverter 398 transposing to a logic one state so as to energize the up oscillator and by the output of inverter 398 transposing to a logic zero state so as to de-energize the up oscillator. NOR gates 401, 402, and 395, having been previously described, operate in normal digital logic fashion, switching rapidly between the logic zero and logic one states. NAND gates 407, 399, and 400, however, operate in both an analog and a digital manner as will now be described.

NAND gate 407 functions as a Class A inverting amplifier and is self-biased into that mode of operation by a high value resistor 408, or other means, preferably connected from the output of NAND gate 407 to the first input of NAND gate 407. The second input of NAND gate 407 is fixed-biased at a logic one state by connection to line $V_{DD}$. This amplifier functions as an inverting feedback amplifier within the up oscillator, amplifying a sample of the voltage across the up oscillator tank circuit. The sample voltage is coupled from the tank circuit to the first input of NAND gate 407 by capacitor 406.

NAND gate 399 functions as a gated Class A amplifier. The gating means has been previously described as the output of inverter 398. During the de-energized mode of the up oscillator, the first input of NAND gate 399 is held at a logic zero state by the output of inverter 398. Consequently, the output of NAND gate 399 is at a logic one state. When the output of inverter 398 transposes to a logic one state, the output of NAND GATE 399 transposes to approximately $V_{DD}/2$. This state is caused by the DC operating point of the output of NAND gate 407 which is also at a state of approximately $V_{DD}/2$ being applied to the second input of NAND gate 399. Upon application of an amplified feedback voltage by NAND gate 407 to the second input of NAND gate 399, the output of NAND gate 399 provides an inverted and amplified version of the feedback voltage to the first input of NAND gate 400, the second input of NAND gate 400 being connected to line $V_{DD}$.

NAND gate 400 also operates in Class A fashion as defined by the DC operating point of the output of NAND gate 399. The feedback voltage at the first input of NAND gate 400 is of sufficient peak-to-peak amplitude to traverse the input threshold of gate 400 and result in transposition of the output of NAND gate 400 between the logic one and zero states as oscillation continues. Therefore, the combination of inverting amplifier NAND gate 407, gated inverting amplifier NAND gate 399, and inverting amplifier NAND gate 400 as shown in FIG. 4E results in an amplifier chain with feedback of the appropriate phase to sustain oscillations in association with the up oscillator tank circuit after the initial start-up pulse occurs providing initial excitation of the tank circuit which produces the feedback voltage for sustaining oscillations.

Up oscillator 252 continues to operate in the manner just described so that oscillation at a frequency adjustable by means of either a variable capacitor 404 or, preferably, a variable inductor 405 appears on a line 253 connected to the output of NOR gate 395. The frequency of the up oscillator is approximately 440 kHz. The actual frequency of oscillation of the up oscillator will be determined by the adjustment made by means of variable inductor 405 to provide the required obstruction sensitivity.

The output of up oscillator 252 is connected by line 253 to a first input of an OR gate 254 whose output is connected to the clock input of detection counter 250. Consequently, detection counter 250 begins to count pulses which occur at the frequency of the up oscillator when the up motor winding is energized.

Now, while the up motor winding is energized for opening the door, up oscillator 252 is operative for incrementing detection counter 250. As described earlier, detection counter 250 is reset in response to a reset pulse or a logic one state pulse generated by sequence flip-flop 173 so that the Q outputs of counter 250 are initially at a logic zero state. Also, as described earlier, movement of the door in the opening direction causes encoder pulse verification circuit to generate a clock pulse every time the door moves an incremental distance such as 3/32". The Q output of clock pulse flip-flop 229 included in the encoder pulse verification circuit is connected by a line 255 to the clock input of a reset flip-flop 256.

Outputs Q1–Q8 of detection counter 250 are connected to first through eighth inputs of a NOR gate 257 whose output is connected to a first input of a NAND gate 258. Also, outputs Q9–Q13 of detection counter 250 are connected to first through fifth inputs of a NOR gate 259 whose output is connected to a second input of AND gate 258. The sixth through eighth inputs of NOR gate 259 are connected to common. The output of NAND gate 258 is connected to the input of an inverter 260 whose output is connected to the reset input of reset flip-flop 256. Consequently, when detection counter 250 is reset and a logic zero state appears at each of the Q outputs of detection counter 250 in response to a reset pulse or a logic one state pulse generated by sequence flip-flop 173 in response to actuation of start switch 154, the output of each of the NOR gates 257 and 259 transposes to a logic one state. As a result, the output of NAND gate 258 transposes to a logic zero state, and in turn the output of inverter 260 transposes to a logic one state. When the output of inverter 260 transposes to a logic one state, reset flip-flop 256 is reset so that a logic zero state appears at the $\bar{Q}$ output and a logic one state appears at the Q output of reset flip-flop 256. Furthermore, the $\bar{Q}$ output and the D input of reset flip-flop 256 are interconnected so that a logic one state initially appears at the D input of reset flip-flop 256.

The Q output of reset flip-flop 256 is connected to a second input of OR gate 249 whose output is connected to the reset input of detection counter 250 as described above. Consequently, if the encoder pulse verification circuit generates a clock pulse as detection counter 250 counts pulses at the frequency of up oscillator 252, reset flip-flop 256 is clocked so that a logic one state appears at the Q output of reset flip-flop 256, and the output of OR gate 249 transposes to a logic one state to reset detection counter 250. In response to the reset of detection counter 250, the output of each of the NOR gates 257 and 259 in turn transposes to a logic one state which causes the output of NAND gate 258 to transpose to a logic zero state, and the output of inverter 260 transposes to a logic one state so that reset flip-flop 256 is reset.

If, however, an obstruction is in the path of the door such that the door is hindered during upward movement, or if some other problem, such as a broken door operating mechanism or binding of the door rollers in the track, occurs such that movement of the door is abnormally slow, the count in detection counter 250 will reach a predetermined count before reset flip-flop 256 resets detection counter 250 in response to a clock pulse from the encoder pulse verification circuit. For example, the Q12 output of detection counter 250 as shown in FIG. 4E is connected to a first input of AND gate 261, and the Q13 output of detection counter 250 is connected to a second input of AND gate 261. The output of AND gate 261 is in turn connected to the input of an inverter 262 whose output is connected to a first input of a NAND gate 263. The output of NAND gate 263 is connected to a first input of an AND gate 264 whose output is in turn connected to a first input of an AND gate 265. The output of AND gate 265 is connected to a second input of OR gate 142 whose output as described above is connected to the clock input of motor run flip-flop 143. A second input of AND gate 265 is connected to the output of an OR gate 268 whose first input is connected to the output of AND gate 144 which is at a logic one state when the up motor winding is energized.

Furthermore, a second input of AND gate 264 is connected to the output of an OR gate 267 whose first input is connected to the Q output of latch 202 which is set when the Q7 output of counter 186 transposes to a logic one state a short time, such as a half second, after the up motor winding is energized. Consequently, when the Q7 output of counter 186 transposes to a logic one state, latch 202 is set so that the Q output of latch 202 transposes to a logic one state and the output of OR gate 267 transposes to a logic one state, so that AND gate 264 is enabled. If the Q12 and Q13 outputs of detection counter 250 transpose to a logic one state before reset in response to a clock pulse from the encoder pulse verification circuit, the output of AND gate 261 transposes to a logic one state which means that the output of inverter 262 transposes to a logic zero state. Consequently, the output of NAND gate 263 transposes to a logic one state, and the output of AND gate 264 transposes to a logic one state. The output of AND gate 264 is fed back to a second input of OR gate 267 for latching AND gate 264. Also, the output of AND gate 265 transposes to a logic one state which in turn means that the output of OR gate 142 transposes to a logic one state, and motor run flip-flop 143 is reset so that a logic zero state appears at the Q output and logic one state appears at the $\bar{Q}$ output of motor run flip-flop 143. As a result, since the Q output of motor run flip-flop 143 is connected to the second input of AND gate 144, when the $\bar{Q}$ output of motor run flip-flop 143 transposes to a logic zero state, the output of AND gate 144 transposes to a logic zero state, and, therefore, the up motor winding is de-energized. Thus, if an obstruction is encountered as the door moves in the up direction, the obstruction detection circuit is effective to cause movement of the door to stop.

As described earlier, when the down motor winding is energized for moving the door in the down direction, the output of AND gate 147 is at a logic one state. Furthermore, as the door moves in the down direction, the encoder disc is rotated so that clock pulses are generated by the encoder pulse verification circuit.

The output of AND gate 147 is connected to a first input of a NOR gate 269. The output of NOR gate 269 is in turn connected to a down oscillator 270. When the output of AND gate 147 transposes to a logic one state when the down motor winding is energized, the output of NOR gate 269 transposes to a logic zero state so that down oscillator 270 is energized.

As shown in FIG. 4E, the configuration of down oscillator 270 is identical to the configuration of up oscillator 252. Consequently, the detailed structure of oscillator 270 will not be described in detail. The correspondence between the elements of down oscillator 270 and the elements of up oscillator 252 is indicated by the use of primes for the elements of the up oscillator. Preferably, the frequency of down oscillator 270 is also approximately 440 kHz. Again, the actual frequency will be determined by an adjustment made to provide the required obstruction sensitivity, that is, the frequency may be adjusted by means of one of the components of tank circuit so that the down oscillator oscillates at a higher frequency for increased sensitivity or at a lower frequency for lower sensitivity to obstructions. The frequency of down oscillator 270 may be different than the frequency of the up oscillator and, in fact, is preferably higher than that of the up oscillator so that higher obstruction sensitivity is obtained during downward movement of the door.

The output of down oscillator 270 is connected to a second input of NOR gate 254 whose output is connected to the clock input of detection counter 250. Consequently, detection counter 250 counts pulses at the frequency of down oscillator 270 when the down motor winding is energized for moving the door in the down direction. However, as explained earlier, reset flip-flop 256 is responsive to clock pulses generated by clock pulse flip-flop 229 included in the encoder pulse verification circuit to reset detection counter 250. Unless an obstruction is encountered as the door moves in the down direction or some problem develops which hinders movement of the door to the point where downward movement of the door is substantially impeded, the Q12 and Q13 outputs of detection counter 250 will never both transpose to a logic one state since detection counter 250 will not count a sufficient number of pulses at the frequency of down oscillator 270 between times that reset flip-flop 256 resets detection counter 250. If, however, an obstruction is encountered, detection counter 250 will reach a count such that the Q12 and Q13 outputs of detection counter 250 transpose to a logic one state. Consequently, the output of AND gate 261 transposes to a logic one state, and in turn the output of inverter 262 transposes to a logic zero state. As a result, the output of NAND gate 263 transposes to a logic one state which as explained earlier appears at the first input of AND gate 264. Approximately one-half second after the down motor winding is energized for moving the door in the down direction, the Q7 output of counter 186 transposes to a logic one state, and latch 202 is set so that the Q output of latch 202 transposes to a logic one state which in turn means that the output of OR gate 267 connected to the second input of AND gate 264 transposes to a logic one state. Consequently, the output of AND gate 264 transposes to a logic one state.

The output of AND gate 264 is connected to a first input of an AND gate 266 whose second input is connected to the output of an OR gate 271. A first input of OR gate 271 is connected to the output of AND gate 147 whose output is at a logic one state when the down motor winding is energized. Consequently, the output of OR gate 271 is at a logic one state when the down motor winding is energized. As a result, when the output of OR gate 264 transposes to a logic one state when an obstruction is detected as the door is moved in the down direction, the output of AND gate 266 transposes to a logic one state. The output of AND gate 266 is connected to a second input of OR gate 271 so that AND gate 266 is latched.

The output of AND gate 266 is connected to a first input of an AND gate 272 whose output is connected to a second input of OR gate 151. The other inputs of AND gate 272 are connected to a reverse inhibit line 273.

As will be explained later, a logic one state will appear on reverse inhibit line 273, unless the door is within a predetermined distance from the fully closed position. If the door is within a predetermined distance from the fully closed position, a logic zero state will appear on reverse inhibit line 273.

If a logic one state appears on reverse inhibit line 273 which means that the door is more than a predetermined distance above the floor, the output of AND gate 272 transposes to a logic one state when the output of AND gate 266 transposes to a logic one state if an obstruction is encountered as the door moves in the down direction. The output of AND gate 272 is connected to a second input of OR gate 151 whose output is connected to the first input of AND gate 152. Consequently, when the output of AND gate 272 transposes to a logic one state, the output of OR gate 151 transposes to a logic one state, and AND gate 152 is enabled.

Furthermore, the output of AND gate 272 is connected to a second input of OR gate 185 whose output is connected to the reset input of counter 186, to the rest input of lamp flip-flop 201, and to the reset input of each of the latches 193, 202, 203. Consequently, when the output of AND gate 272 transposes to a logic one state, the output of OR gate 185 transposes to a logic one state and counter 186, lamp flip-flop 201, and latches 193, 202, and 203 are reset.

When latch 193 is reset, the Q output of latch 193 transposes to a logic zero state, and the output of inverter 194 transposes to a logic one state. Consequently, since a logic one state appears at the first input of AND gate 152 if an obstruction is encountered as the door moves in the down direction when the door is more than a predetermined distance above the floor, the output of AND gate 152 transposes to a logic one state, and direction flip-flop 138 is clocked so that a logic one state appears at the Q output of direction flip-flop 138 which appears at the first input of AND gate 144. As soon as counter 186 counts a sufficient number of 60 Hz. pulses so that the Q6 output of counter 186 transposes to a logic one state, latch 193 is set so that the Q output of latch 193 transposes to a logic one state. As a result, the output of AND gate 144 transposes to a logic one state, and the up motor winding is energized. Consequently, when an obstruction is sensed by the obstruction detector circuit as the door is moved in the down direction, the combined operation of the obstruction detector circuit and the motor command circuit causes the down motor winding to be de-energized and shortly thereafter the up motor winding to be energized for moving the door back in the up direction if an obstruction is encountered when the door is more than a predetermined distance above the threshold. In response to energization of the up motor winding, up oscillator 252 is set into oscillation, and the obstruction detector circuit is rendered operative for sensing whether or not an obstacle is encountered as the door reopens. That is, the Q8 output of detection counter 250 is connected to a first input of an AND gate 274, and the output of AND gate 261 is connected to a second input of AND gate 274. The output of AND gate 274 is connected to a third input of OR gate 249. Since the Q8 output of detection counter 250 and the output of AND gate 261 transpose to a logic one state when an obstruction is encountered as the door is moved in the down direction, the output of AND gate 274 transposes to a logic one state, and the output of OR gate 249 in turn transposes to a logic one state to reset counter 250 so that detection counter 250 is reset when the door is reversed and moved in the up direction.

As explained earlier, a logic zero state will appear on reverse inhibit line 273 if the door is less than a predetermined distance from the fully closed position. In such case, the door will not be reversed but instead will be stopped.

If the door is less than a predetermined distance above the threshold, a logic zero state will appear on reverse inhibit line. Consequently, AND gate 272 is disabled.

However, reverse inhibit line 272 is connected to the input of an inverter 299 whose output is connected to a first input of AND gate 300. The output of AND gate 300 is connected to a first input of an OR gate 301 whose output is connected to a third input of OR gate 142. As described earlier, the output of OR gate 142 is connected to the reset input of motor run flip-flop 143.

When a logic zero state appears on reverse inhibit line 272, the output of inverter 299 transposes to a logic one state. Since the output of each of the AND gates 264 and 266 transposes to a logic one state if an obstruction is encountered as the door is moved in the down direction, if a logic one state appears at the output of inverter 299, the output of AND gate 300 transposes to a logic one state. Consequently, the outputs of OR gates 301 and 142 sequentially transpose to a logic one state and motor run flip-flop 143 is reset so that a logic zero state appears at the Q output of motor run flip-flop 143. As a result, the output of AND gate 147 transposes to a logic zero state, and the down motor winding is de-energized. Therefore, when an obstruction is sensed by the obstruction detector circuit as the door is moved in the down direction, the combined operation of the obstruction detector circuit and the motor command circuit simply causes the down motor winding to be de-energized if an obstruction is encountered when the door is less than a predetermined distance above the threshold.

As shown in FIG. 4E, the output of NOR gate 254 is also connected to the input of an oscillator failure detection circuit 275. The oscillator failure detection circuit includes an inverter 409 whose input is connected to the output of NOR gate 254. The output of inverter 409 is connected to the input of an inverter 410 whose output is in turn connected through a coupling capacitor 411 to the input of an inverter 412. The output of inverter 412 is connected to the anode of a diode 413 whose cathode is connected to the input of a Schmitt trigger inverter 414. The junction between capacitor 411 and the input of inverter 412 is connected by a resistor 415 to line $V_{DD}$ The junction between the cathode of diode 413 and the input of Schmitt trigger inverter 414 is connected by the collector-emitter circuit of an NPN transistor 416 and a series-connected emitter potentiometer 417 to common. The base of NPN transistor 416 is connected by a resistor 418 to line $V_{DD}$ and by series-connected diodes 419 and 420 to common. The junction between the cathode of diode 413 and the input of Schmitt trigger inverter 414 is also connected by a capacitor 421 to common. Capacitor 421 is charged in response to oscillations of up oscillator 252 or down oscillator 270. Capacitor 421 is allowed to slowly discharge at a linear rate through the constant current collector-emitter circuit of NPN transistor 416 and potentiometer 417. If the oscillation of the up oscillator or the down oscillator, whichever is supposed to be operative, suddenly ceases, capacitor 421 discharges. Since capacitor 421 is connected to the input of Schmitt trigger 414, the output of the Schmitt trigger inverter is at a logic zero state so long as a charge is maintained on capacitor 421. However, when capacitor 421 discharges below the threshold of Schmitt trigger inverter 414 if oscillation of the oscillator which is supposed to be operative ceases, the output of Schmitt trigger inverter 414 transposes to a logic one state.

The output of Schmitt trigger inverter 414 is connected to the input of an inverter 422 whose output is connected to the input of an inverter 423. The output of inverter 423 is in turn connected to a first input of a NAND gate 424 whose other input is connected to the output of a NAND gate 425. A first input of NAND gate 425 is connected to the output of an inverter 426 whose input is connected to the output of AND gate 144. The second input of NAND gate 425 is connected to the output of an inverter 427 whose input is connected to the output of AND gate 147. Consequently, when either the up motor winding or the down motor winding is energized, the output of one of the inverters 426 or 427 will transpose to a logic zero state, and, consequently, the output of NAND gate 425 will transpose to a logic one state. Furthermore, as described above, when up oscillator 252 or down oscillator 270, whichever is supposed to be operative, is in oscillation, the output of Schmitt trigger inverter 414 will be at a logic zero state. Consequently, the output of inverter 422 will be at a logic one state, the output of inverter 423 will be at a logic zero state, and, as a result, the output of NAND gate 424 will be at a logic one state. Therefore, the output of NAND gate 263 will be at a logic zero state when the oscillator which is supposed to be in oscillation is operative.

However, if oscillation of the up oscillator or the down oscillator, whichever is supposed to be operative, suddenly ceases, the output of Schmitt trigger inverter 414 transposes to a logic one state, the output of inverter 422 transposes to a logic zero state, and the output of inverter 423 transposes to a logic one state. As a result, the output of NAND gate 424 transposes to a logic zero state so that the output of NAND gate 263 transposes to a logic one state.

If the door is being moved in the up direction and up oscillator 252 suddenly fails, the output of NAND gate 263 will transpose to a logic one state, and, consequently, the output of each of the AND gates 264 and 265 and the output of OR gate 142 will transpose to a logic one state so that motor run flip-flop 143 is reset. As a result, the up motor winding will be de-energized so that movement of the door stops. If, on the other hand, the door is being moved in the down direction and down oscillator 270 suddenly fails, the output of NAND gate 263 will transpose to a logic one state, and, consequently, the output of each of the AND gates 264 and 266 will transpose to a logic one state. If the door is more than a predetermined distance above the threshold, the outputs of AND gate 272 and OR gate 151 sequentially transpose to a logic one state. Also, counter 186 and latch 193 is reset. The outputs of inverter 194 and AND gate 152 sequentially transpose to a logic one state and direction flip-flop 138 is clocked. After a short period on the order of one-half second, the Q6 output of counter 186 transposes to a logic one state, and latch 193 is set. As a result, the output of AND gate 144 transposes to a logic one state, and the up motor winding is energized so that the door is moved back in the up direction. On the other hand, if the door is a predetermined distance or less above the threshold, the outputs of AND gates 264, 266, and 300 and OR gates 301 and 142 sequentially transpose to a logic one state so that motor-run flip-flop 143 is reset. As a result, the down motor winding will be de-energized so that movement of the door stops.

Lockup Circuit

The reset circuit is connected to the lockup circuit by line 137 as shown in FIG. 4B. The reset pulse which appears on line 137 resets the latches included in the lockup circuit.

Line 137 is connected to a first input of an OR gate 276 whose output is connected to the reset input of a latch 277. Line 137 is also connected to a first input of an OR gate 278 whose output is in turn connected to the reset input of a latch 279 included in the lockup circuit. When a reset pulse appears on line 137, a logic one state pulse appears at the output of each of the OR gates 276 and 278, and each of the latches 277 and 279 is reset. Consequently, a logic zero state initially appears at the Q output of each of the latches 277 and 279.

Furthermore, as described earlier in connection with FIG. 4D, line 137 is connected to the first input of OR gate 183. As shown in FIG. 4B, the output of OR gate 183 is connected by a line 280 to the reset input of a counter latch 281. Consequently, in response to a reset pulse, a logic one state pulse appears at the output of OR gate 183, and counter latch 281 is reset so that a logic zero state initially appears at the Q output of counter latch 281.

Line 137 is also connected to a first input of an OR gate 282 whose output is connected to a counter reset line 283. In response to a reset pulse on line 137, a logic one state pulse appears at the output of OR gate 282 and on counter reset line 283. When a logic one state pulse appears on counter reset line 283, the up/down counter, latch, and the programming circuits to be described shortly are reset.

As described earlier, in response to the initial actuation of start switch 154 at a time when power is available for energizing the motor following a reset pulse, the up motor winding is energized for moving the door in the up direction. The up motor winding is energized when the Q6 output of counter 186 transposes to a logic one state and sets latch 193 so that the Q output of latch 193 transposes to a logic one state and the output of AND gate 144 transposes to a logic one state, thereby energizing the up motor winding. Also, as described earlier, after approximately one-half second after the up motor winding is energized, the Q7 output of counter 186 transposes to a logic one state and sets latch 202 so that the Q output of latch 202 transposes to a logic one state and the output of OR gate 267 transposes to a logic one state, thereby enabling AND gate 264 which is connected to the obstruction detector circuit.

Now, with regard to the lockup circuit, the Q output of latch 281 is connected to the input of an inverter 284 whose output is connected to a first input of an AND gate 285. A second input of AND gate 285 is connected to a line 286 which is initially at a logic one state at the time of initial actuation of start switch 154 when power is available for energizing the motor following a reset pulse as will be described in more detail later. The other inputs of AND gate 285 are connected to the output of AND gate 265 shown in FIG. 4D whose output is at a logic zero state when the up motor winding is energized unless an obstruction is encountered as the door is moved in the up direction in which case the output of AND gate 265 transposes to a logic one state as described earlier.

Now, the Q8 output of counter 186 is connected by a line 287 to the set input of latch 281. The Q8 output of counter 186 transposes to a logic one state approximately two seconds after the initial actuation of start switch 154 at a time when power is available for energizing the motor following a reset pulse and approximately one and one-half seconds after the up motor winding is energized. Until the two-second period has elapsed, a logic zero state appears on line 287, and the Q output of latch 281 remains at a logic zero state. Consequently, the output of inverter 284 is at a logic one state. Since a logic one state initially appears on line 286, until the door has been moved for one and one-half seconds in the up direction, AND gate 285 is enabled so that if the output of AND gate 265 transposes to a logic one state in response to detection of an obstruction as the door moves in the up direction, the output of AND gate 285 transposes to a logic one state.

The output of AND gate 285 is connected to the set input of each of the latches 277 and 279. Consequently, if the up motor winding is energized for at least one and one-half seconds following initial actuation of start switch 154, the Q8 output of counter 186 transposes to a logic one state, and latch 281 is set so that the Q output of latch 281 transposes to a logic one state and the output of inverter 284 in turn transposes to a logic zero state. Consequently, AND gate 285 will be disabled so that latches 277 and 279 are not set if an obstruction is sensed more than one and one-half seconds after the up motor winding is energized.

If, however, the output of AND gate 285 transposes to a logic one state in response to detection of an obstruction during a one and one-half second period after initial movement of the door in the up direction in response to actuation of start switch 154, latches 277 and 279 are set, and the Q output of each of the latches 277 and 279 transposes to a logic one state. If such a result occurs, the control circuitry will presume that the door was in the up position at the time that start switch 154 was initially actuated.

If the door is in the up position at the time of initial actuation of start switch 154 so that latches 277 and 279 are set, a logic one state will appear at the Q output of each of the latches 277 and 279. The Q output of latch 277 is connected by line 288 to the set input of direction flip-flop 138 as shown in FIG. 4D so that a logic one state continues to appear at the Q output of direction flip-flop 138. Consequently, the motor command circuit is constrained to energize the up motor winding if start switch 154 is momentarily actuated again.

The Q output of latch 277 not only holds direction flip-flop 138 in the set condition but also activates a lamp flasher circuit 302 shown in FIG. 4D for indicating that the up motor winding will be energized again if start switch 154 is momentarily actuated again. More particularly, line 288 connects the Q output of latch 277 to a first input of an AND gate 303. A second input of AND gate 303 is connected to the Q6 output of counter 186. The third input of AND gate 303 is connected to the output of an inverter 304 whose input is connected to the Q output of latch 203. The Q output of latch 203 transposes to a logic one state when latch 203 is set. The set input of latch 203 is in turn connected to the Q10 output of counter 186 so that latch 203 is set at the time that the Q10 output of counter 186 transposes to a logic one state approximately eight and one-half seconds after start switch 154 is actuated.

When latch 277 is set, the logic one state which appears at the Q output of latch 277 and the logic one state which initially appears at the output of inverter 304 enable AND gate 303. Consequently, the output of AND gate 303 transposes to a logic one state whenever a logic one state appears at the Q6 output of counter 186 which occurs every other one-half second for a period of one-half second beginning one-half second after latch 277 is set until the Q8 output of counter 186 transposes to a logic one state approximately eight and one-half seconds after start switch 154 is actuated at which time latch 203 is set and the Q output of latch 203 transposes to a logic one state so that the output of inverter 304 transposes to a logic zero state, thereby disabling AND gate 303. Since the output of AND gate 303 is connected to the second input of OR gate 305, when the output of AND gate 303 transposes to a logic one state, the output of OR gate 305 transposes to a logic one state, thereby flashing the lamp.

The flashing lamp indicates that the lockup circuit will cause the door to be moved in the up direction if start switch 154 is momentarily actuated again since direction flip-flop 138 is held in the set condition. However, as will now be described, start switch 154 can be held in an actuated condition for overriding the lockup circuit so that the door can be moved in the down direction.

As described earlier, if start switch 154 is actuated at a time when power is available for energizing the motor, start latch 171 is set, and sequence flip-flop 173 generates a logic one state pulse which appears on line 174. Consequently, a logic one state pulse appears at the output of OR gate 183, and latch 281 is reset so that a logic zero state appears at the Q output of latch 281.

Subsequently, start pulse flip-flop 176 generates a start pulse which appears on line 177. Consequently, start switch held flip-flop 140 is clocked so that a logic one state appears at the Q output of start switch held flip-flop 140.

The Q output of start switch held flip-flop 140 is connected to the first input of AND gate 153 as described earlier. As long as start switch 154 is actuated, start latch 171 remains in the set condition so that a logic one state appears at the Q output of latch 171, and the output of inverter 199 remains at a logic zero state so that start switch held flip-flop 140 is not reset. As a result, AND gate 153 is enabled by the logic one state at the Q output of start switch held flip-flop 140 as long as start switch 154 is actuated.

The Q8 output of counter 186 transposes to a logic one state approximately two seconds after start switch 154 is actuated. Consequently, latch 281 is set so that a logic one state appears at the Q output of latch 281.

The Q output of latch 281 is connected to the second input of AND gate 153. Consequently, if start switch 154 is actuated for a period longer than two seconds, the Q output of latch 281 transposes to a logic one state, and the output of AND gate 153 transposes to a logic one state.

The output of AND gate 153 is connected by a line 297 to a second input of OR gate 276 whose output is connected to the reset input of latch 277. Consequently, if start switch 154 is held in an actuated condition for a two second period, latch 277 is reset so that a logic zero state appears at the Q output of latch 277. When the Q output of latch 277 transposes to a logic zero state, a logic zero state appears at the set input of direction of flip-flop 138. As a result, direction flip-flop 138 can be clocked so that the door can be moved in the down direction as will now be explained. The output of AND gate 153, which is at a logic one state as described above, is connected by line 297 to a first input of an AND gate 289. Also, the Q output of latch 277 is connected to the input of an inverter 290 whose output is connected to a second input of AND gate 289 so that when latch 277 is reset in response to continued actuation of start switch 154 as described above a logic one state will appear at the second input of AND gate 289. Furthermore, the Q output of latch 279, which is at a logic one state as earlier described, is connected to a third input of AND gate 289. Finally, the output of inverter 162 is connected to the input of an inverter 291 as shown in FIG. 4D whose output is connected to a fourth input of AND gate 289 so that on the first lowgoing edge of a 60 Hz. pulse following reset of latch 277, the output of AND gate 289 transposes to a logic one state which appears on a retrigger line 109.

Retrigger line 109 is connected to the second input of OR gate 184 as shown in FIG. 4D so that when a logic one state appears on retrigger line 291 the outputs of OR gates 184 and 185 sequentially transpose to a logic one state, and counter 186 and latch 193 are reset. When latch 193 is reset, the Q output of latch 193 transposes to a logic zero state. Consequently, the output of inverter 194 transposes to a logic one state, and AND gate 152 is enabled.

Retrigger line 109 is also connected to a third input of OR gate 151 as shown in FIG. 4D. The output of OR gate 151 is connected to the second input of AND gate 152 whose output is in turn connected to the clock input of direction flip-flop 138 as described earlier. Consequently, when a logic one state appears on retrigger line 109, direction flip-flop 138 is clocked so that a logic zero state appears at the Q output and a logic one state appears at the $\overline{Q}$ output of direction flip-flop 138. Furthermore, since retrigger line 109 is connected to the set input of motor run flip-flop 143, motor run flip-flop 143 is set so that a logic one state appears at the Q output of motor run flip-flop 143.

As described earlier, the $\overline{Q}$ output of direction control flip-flop 138 is connected to the first input of AND gate 147, and the Q output of motor run flip-flop 143 is connected to the second input of AND gate 147. Since a logic one state appears at the $\overline{Q}$ output of direction control flip-flop 138 and at the Q output of motor run flip-flop 143, AND gate 147 is partially enabled.

After counter 186 has counted a sufficient number of 60 Hz. pulses, the Q6 output of counter 186 transposes to a logic one state, and latch 193 set so that a logic one state appears at the Q output of latch 193 which is connected to the third input of AND gate 147. Consequently, the output of AND gate 147 transposes to a logic one state and the down motor winding is energized for moving the door in the down direction in response to continuous actuation of start switch 154 for a period of two seconds.

Furthermore, after 8.3 milliseconds, the output of inverter 291 will transpose to a logic zero state. Consequently, the output of AND gate 289 transposes to a logic zero state which appears on retrigger line 109.

When the output of inverter 161 transposes to a logic zero state, the output of inverter 162 transposes to a logic one state. The output of inverter 162 is connected by a line 428 to a first input of an AND gate 292 as shown in FIG. 4B. The second input of AND gate 292 is connected to the output of AND gate 153. Consequently, when a logic one state appears at the output of inverter 162 in response to a 60 Hz. pulse, the output of AND gate 292 which is connected to the second input of OR gate 278 transposes to a logic one state. Consequently, latch 279 is reset so that a logic zero state appears at the Q output of latch 279. Additionally, the output of AND gate 153 is connected to a first input of an OR gate 293 whose output is connected to a first input of an AND gate 294. Consequently, start switch 154 is actuated continuously, a logic one state appears at the outputs of AND gate 153 and OR gate 293 so that AND gate 294 is enabled. As a result, if start switch 154 is actuated until the door is moved to the fully closed position and reaches the threshold, the door is automatically stopped as follows.

The $\overline{Q}$ output of direction flip-flop 138 is connected by a line 295 to a first input of an AND gate 296. The second input of AND gate 296 is connectqd by line 297 to the output of AND gate 153. Since a logic one state appears at the $\overline{Q}$ output of direction flip-flop 138 and at the output of AND gate 153 if start switch 154 is continuously held in the actuated condition, the output of AND gate 296, which is connected to an input of a NOR gate 298, transposes to a logic one state. Consequently, the output of NOR gate 298 transposes to a logic zero state which appears at the input of inverter 299. Consequently, the output of inverter 299 transposes to a logic one state. As described earlier, the output of inverter 299 is connected to the first input of AND gate 300. The outputs of AND gates 264 and 266 are respectively connected to the second and third inputs of AND gate 300. As described earlier, the output of each of the AND gates 264 and 266 transposes to a logic one state when an obstruction is encountered as the door closes.

Since the output of inverter 299 is at a logic one state as the door is moved in the down direction while start switch 154 is continuously actuated, when the door reaches the threshold, the output of each of the AND gates 264 and 266 transposes to a logic one state. Consequently, the output of AND gate 300 transposes to a logic one state.

The output of AND gate 300 is connected to the first input of OR gate 301, and the output of OR gate 301 is connected to the third input of OR gate 142 whose output is in turn connected to the reset input of motor run flip-flop 143 as described earlier. Consequently, when the output of AND gate 300 transposes to a logic one state, the outputs of OR gates 301 and 142 sequentially transpose to a logic one state, and motor run flip-flop 143 is reset so that the Q output of motor run flip-flop 143 transposes to a logic zero state. Since the Q output of motor run flip-flop 143 is connected to the second input of AND gate 147, the output of AND gate 147 transposes to a logic zero state, and the down motor winding is de-energized. As a result, the door is stopped when the threshold is reached.

Finally, the output of AND gate 266 is connected to the other inputs of AND gate 294. As described above, a logic one state appears at the first input of AND gate 294 if start switch 154 is continuously held in the actuated condition. Consequently, when the output of NAND gate 266 transposes to a logic one state at the time when the door reaches the threshold, the output of AND gate 294, which is connected to the second input of OR gate 282, transposes to a logic one state. As a result, the output of OR gate 282 transposes to a logic one state which appears on counter reset line 283 for resetting the programming circuit, up/down counter circuit, and latch circuit so that the up limit setpoint is automatically programmed the next time that the door is moved in the up direction in response to the next actuation of start switch 154.

Programming Circuit

As described earlier, the lockup circuit is connected to the reset circuit by line 137. In response to a reset pulse, not only are the latches in the lockup circuit reset, but also the output of OR gate 282 transposes to a logic one state which appears on counter reset line 283. Also, if the lockup circuit is overridden by continuously holding start switch 154 in an actuated condition as the door is moved in the down direction, a logic one state appears on counter reset line 283 when the door encounters the threshold.

Counter reset line 283 is connected to the reset input of each of the D flip-flops 310, 311, and 312 included in the programming circuit as shown in FIG. 4B. Consequently, when a logic one state appears on counter reset line 283 under one of the conditions described above, flip-flops 310, 311, and 312 are reset so that a logic zero state appears at the Q output and a logic one state appears at the $\overline{Q}$ output of each of the flip-flops 310, 311, and 312. As shown in FIG. 4B, the $\overline{Q}$ output and the respective D input of each of the flip-flops 310, 311, and 312 are interconnected so that a logic one state initially appears at the D input of each of the latches 310, 311, and 312 when a logic one state appears on counter reset line 283.

The programming circuit controls a sequence which sets the up limit of travel for the door. The up limit setpoint set by the programming circuit subsequently determines the position during travel of the door in the up direction where the up motor winding is de-energized except in the case where an obstruction is encountered in which case the obstruction detection circuit effects de-energization of the up motor winding.

The inputs of NAND gate 313 indicate whether or not the necessary conditions are satisfied for the programming circuit to set the up limit setpoint. The $\overline{Q}$ output of flip-flop 310 is connected by line 286 to a first input of NAND gate 313. As indicated above, flip-flop 310 is reset so that a logic one state appears at the $\overline{Q}$ output of flip-flop 310 in response to a logic one state pulse on counter reset line 283 which means that the up limit setpoint must be set. If a logic one state appears at the Q output of flip-flop 310, an indication if provided that the up limit setpoint is not set. On the other hand, when the $\overline{Q}$ output of latch 310 transposes to a logic zero state, the programming circuit is inhibited.

Furthermore, the Q output of latch 281 is connected to a second input of NAND gate 313. As described earlier, a logic zero state appears at the Q output of latch 281 until the up motor winding has been energized for a period of approximately one and one-half seconds whereupon the Q8 output of counter 186 transposes to a logic one state, and latch 281 is set so that a logic one state appears at the Q output of latch 281.

Also, the output of inverter 290 whose input is connected to the Q output of latch 277 is connected to a third input of NAND gate 313. As described earlier, latch 277 will be set so that a logic one state appears at the Q output of latch 277 which locks direction flip-flop 138 in the set condition if the door is moved in the up direction less than one and one-half seconds after the up motor winding is energized in response to the initial actuation of start switch 154 at a time when power is available for energizing the motor following a reset pulse. As a result, the output of inverter 290 will be at a logic zero state so that the programming circuit will be inhibited. If, however, latch 277 has not been previously set, a logic zero state will appear at the Q output of latch 277, and the output of inverter 290, which is connected to a third input of NAND gate 313, will be at a logic one state so that the programming circuit is not inhibited.

Finally, the output of AND gate 265 is connected to fourth and fifth inputs of NAND gate 313. As described earlier, the output of AND gate 265 transposes to a logic one state if the obstruction detector circuit senses an obstruction as the door moves in the up direction but otherwise is at a logic zero state. The sixth through eighth inputs of NAND gate 313 are connected to line $V_{DD}$.

If the up motor winding is energized for a period of at least one and one-half seconds for moving the door in the up direction in response to actuation of start switch 154 at a time when power is available for energizing the motor before an obstruction is encountered and the up limit setpoint is not set, as soon as the output of AND gate 265 transposes to a logic one state when the obstruction detector circuit senses an obstruction, that is, the mechanical stop at the up travel limit, the output of NAND gate 313 transposes to a logic zero state.

The output of NAND gate 313 is connected to the input of an inverter 314 whose output is connected to the clock input of flip-flop 310. Consequently, since a logic one state appears at the D input of flip-flop 310, when the output of inverter 314 transposes to a logic one state, flip-flop 310 is clocked so that a logic one state appears at the Q output and a logic zero state appears at the $\overline{Q}$ output of flip-flop 310.

The Q output of flip-flop 310 is connected to a first input of an AND gate 315. The second input of AND gate 315 is connected to the output of an inverter 316 whose input is connected to the output of an AND gate 317. Since a first input of AND gate 317 is connected to the Q output of flip-flop 311 which is initially at a logic zero state, the output of AND gate 317 will be at a logic zero state, and the output of inverter 316 will be at a logic one state. Consequently, when the Q output of latch 310 transposes to a logic one state, the output of AND gate 315 transposes to a logic one state. As a result, a logic zero state will appear on start inhibit line 170 which is connected to the output of an inverter 318 whose input is connected to the output of AND gate 315. Consequently, as shown in FIG. 4A, the output of AND gate 169 will transpose to a logic zero state so that AND gate 160 is disabled which means that actuation of start switch 154 is inhibited and will not interrupt the programming cycle.

Finally, the Q output of flip-flop 310 is connected to a first input of an AND gate 319 whose output is connected to the clock input of flip-flop 311. Also, as shown in FIG. 4B, the output of inverter 316 which as previously mentioned is at a logic one state is connected to a second input of AND gate 319. Consequently, AND gate 319 is enabled. Now, a pause occurs in the programming until the output of AND gate 319 transposes to a logic one state which will occur when a logic one state appears at the output of OR gate 320 which is connected to the third input of AND gate 319.

To that end, the Q1-Q5 outputs of counter 186 are connected to first through fifth inputs of a NAND gate 321 whose output is connected to the input of an inverter 322. A sixth input of NAND gate 321 is connected to the output of inverter 162, and the other inputs of NAND gate 321 are connected to line $V_{DD}$.

The period of the pause for the output of OR gate 320 to transpose to a logic one state depends on the logic states of the Q1-Q5 outputs of counter 186 following the time that flip-flop 310 is set in response to a logic one state which appears at the output of AND gate 265 in response to detection of the mechanical stop by the obstruction detector circuit. The actual pause could be from zero to 526 milliseconds. In response to the first 60 Hz. pulse after the outputs Q1-Q5 of counter 186 transpose to a logic one state, the output of NAND gate 321 transposes to a logic zero state, and the output of inverter 322 transposes to a logic one state. Since the output of inverter 322 is connected to first input of OR gate 320, the outputs of OR gate 320 and AND gate 319 sequentially transpose to a logic one state, and flip-flop 311 is clocked so that a logic one state appears at the Q output and a logic zero state appears at the $\overline{Q}$ output of flip-flop 311. The reason for the pause before flip-flop 311 is clocked will be explained later.

As described earlier, the Q output of flip-flop 311 is connected to the first input of AND gate 317. Consequently, when flip-flop 311 is clocked so that the Q output of flip-flop 311 transposes to a logic one state, a logic one state appears at the first input of AND gate 317. However, the second input of AND gate 317 is connected to the Q output of flip-flop 312 which is at a logic zero state so that the output of AND gate 317 remains at a logic zero state, and the outputs of inverter 316 and AND gate 315 remain at a logic one state, and the output of inverter 318 remains at a logic zero state so that start switch 154 remains inhibited.

Again there is a pause in the programming. At the end of the pause, however, a latch strobe pulse is generated for storing the up limit setpoint in the latch circuit as will now be explained.

The $\overline{Q}$ output of flip-flop 312 which is at a logic one state is connected to a first input of a NAND gate 323. The Q output of flip-flop 311 which is at a logic one state is connected to a second input of NAND gate 323. Additionally, the Q1 output of counter 186 is connected to the input of an inverter 324 whose output is connected to a third input of NAND gate 323. Also, the Q2-Q5 outputs of counter 186 are connected to fourth through seventh inputs of NAND gate 323. The eighth input of NAND gate 323 is connected to the output of inverter 162. Consequently, in response to a 60 Hz. pulse at a time when the Q1 output of counter 186 is at a logic zero state and the Q2-Q5 outputs of counter 186 are at a logic one state following the time that flip-flop 311 is clocked, the output of NAND gate 323 transposes to a logic zero state for a period of 8.3 milliseconds.

The output of NAND gate 323 is connected to the input of an inverter 429 whose output is connected to latch strobe line 325 so that an 8.3 millisecond latch strobe pulse appears on line 325. The pause between the time that flip-flop 311 is clocked and the time that the latch strobe pulse is generated is approximately 500 milliseconds.

Consequently, there are two pauses, one pause of zero to 526 milliseconds between the time that the obstruction detector circuit senses the mechanical stop at the up travel limit which initiates programming and the time that flip-flop 311 is clocked and a second pause of approximately 500 milliseconds between the time that flip-flop 311 is clocked and the time that a latch strobe pulse is generated on line 325. The combination of the zero to 526 millisecond and 500 millisecond delays allows sufficient time for the door and the operating mechanism to come to a complete rest before a latch strobe pulse is generated.

Up/Down Counter Circuit

As shown in FIG. 4F, the up/down counter circuit comprises a 12-bit binary up/down counter which is preferably constructed from three interconnected four-bit up/down counters 326, 327, and 328. The 12-bit up/down counter is structured by connecting the inverted carry in input of counter 326 to common and the $\overline{\text{carry out}}$ output of counter 326 to the inverted carry in input of counter 327 while the $\overline{\text{carry out}}$ output of counter 327 is in turn connected to the inverted carry in input of counter 328. Such an arrangement means that the least significant bit of the 12-bit up/down counter is at output Q1 of counter 326, the next to least significant bit is at output Q2 of counter 326, and so forth, with the most significant bit at output Q4 of counter 328. The up/down counter circuit is of great importance since the binary number contained in the 12-bit up/down counter is the basis for the logic decisions which are made with regard to the current position of the door.

Counter reset line 283 is connected to the reset input of counter 326 and to the preset enable input of each of the counters 327 and 328. The preset enable input of counter 326 is connected to common while the reset input of each of the counters 327 and 328 is connected to common.

Preset inputs P1-P4 of counter 326 are connected to common while preset inputs P1-P4 of each of the counters 327 and 328 are connected to line $V_{DD}$. Consequently, a logic zero state is present at each of the preset inputs of counter 324 while a logic one state is present at each of the preset inputs of the counters 327 and 328.

As described earlier, the first input of OR gate 282 included in the lockup circuit is connected to line 137 while the output of OR gate 282 is connected to counter reset line 283. Consequently, in response to a reset pulse on line 137, a logic one state pulse appears at the output of OR gate 282 on counter reset line 283.

In response to a logic one state pulse on counter reset line 283, counter 326 is preset so that a logic zero state appears at each of the outputs Q1-Q4 of counter 326. In contrast, counters 327 and 328 are preset so that a logic one state appears at each of the outputs Q1-Q4 of each of the counters 327 and 328 in response to a logic one state pulse on counter reset line 283. The reason for presetting a number into the 12-bit up/down counter will be explained shortly.

As described earlier, in response to the initial actuation of start switch 154 at a time when power is available for energizing the motor following a reset pulse, the up motor winding is energized for moving the door in the up direction. As previously explained, as the door is moved in the up direction, the encoder disc is rotated in the up direction.

In response to rotation of the encoder disc, the encoder pulse verification circuit detects upward movement of the door, and latch 230 in the encoder pulse verification circuit is set so that a logic one state appears at the Q output of latch 230. The Q output of latch 230 is in turn connected to the first input of OR gate 242 whose output is connected to count up/down line 243. Consequently, a logic one state will appear on count up/down line 243 as the door is moved in the up direction.

Count up/down line 243 is connected to the up/down control input of each of the counters 326-328 for controlling the counters so that they count up or down. If a logic one state appears on count up/down line 243, counters 326-328 count up, and if a logic zero state appears on count up/down line 243, counters 326-328 count down.

Furthermore, in response to rotation of the encoder disc, the encoder pulse verification circuit detects movement of the door in the up direction, and clock pulse flip-flop 229 produces a clock ulse on clock pulse line 245 whenever the door is detected to have advanced an additional increment of, for example, 3/32" in the up direction. The clock input of each of the counters 326-328 is connected to clock line 245.

Since the inverted carry in input of counter 326 is connected to common, counter 326 will count every clock pulse on clock pulse line 245, and, every sixteenth clock pulse, the $\overline{\text{carry out}}$ output of line 326 will transpose to a logic zero state which appears at the inverted carry in input of counter 327 so that counter 327 counts every sixteenth clock pulse which appears on clock line 245. Furthermore, every 256th clock pulse on clock pulse line 245, the $\overline{\text{carry out}}$ output of counter 327 will transpose to a logic zero state which appears at the inverted carry in input of counter 328 so that counter 328 counts every 256th clock pulse which appears on clock pulse line 245.

As explained earlier, a predetermined count is preset into 12-bit up/down counter 326, 327, and 328. As described above, the preset count is 111111110000, or minus 15.

Consequently, upon the occurrence of the sixteenth clock pulse on clock line 245 during upward movement of the door in response to the initial actuation of start switch 154 at a time when power is available for energizing the motor following a reset pulse, the Q1–Q4 outputs of each of the counters 326–328 will transpose to a logic zero state. As a result, if the door is actually in the closed position when the door begins to move in the up direction in response to the initial actuation of start switch 154, the door will begin upward movement from the threshold with the 12-bit up/down counter 326-328 preset to a minus 15 which provides an offset that will mean that the door will actually have been moved an upward distance represented by 16 clock pulses before the counter arrives at a zero count. Consequently, when the door reaches the mechanical stop, the actual number contained in 12-bit up/down counter 326-328 will still be 16 less than needed for indicating the true position of the door. The purpose for presetting 12-bit up/down counter 326-328 to provide a minus 15 offset is to store a count corresponding to the up limit less the distance represented by 16 clock pulses, for example, one and one-half inches, in the latch circuit as the up limit setpoint in response to the latch strobe pulse on latch strobe line 325 as will be explained shortly. The number stored in the latch circuit, that is, the up limit setpoint, will then become the up travel limit so that the up motor winding will be de-energized at a position 16 clock pulses ahead of the mechanical stop whenever the door is again moved in the up direction. As a result, the operating mechanism will be prevented from driving the door against the mechanical stop when the door is opened, thereby prolonging the life of the mechanical components of the operating mechanism, putting less strain on the garage door and mounting hardware, and providing quieter operation.

Latch Circuit

As shown in FIG. 4F, the latch circuit includes 12 latches 329-340. As mentioned previously, the reset circuit generates a reset pulse on line 137 which is connected to the input of OR gate 282 whose output is connected to counter reset line 283. Counter reset line 283 is in turn connected to the reset input of each of the 25 latches 329-340. Consequently, each of the latches 329-340 is reset in response to a reset pulse so that a logic zero state initially appears at the Q output of each of the latches 329-340.

As shown in FIG. 4F, each of the Q1-Q4 outputs of each of the counters 326-328 is connected to a first input of one of the AND gates 341-352 whose outputs are respectively connected to the set inputs of latches 329-340. Specifically, the Q1 output of counter 326 is connected to a first input of AND gate 341 whose output is connected to the set input of latch 329 while the Q2 output of counter 326 is connected to a first input of AND gate 342 whose output is connected to the set input of latch 330. A first input of AND gate 343 is connected to the Q3 output of counter 326, and the output of AND gate 343 is connected to the set input of latch 331. The set input of latch 332 is connected to the output of AND gate 344 whose first input is connected to the Q4 output of counter 326. The Q1 output of counter 327 is connected to a first input of AND gate 345 whose output is connected to the set input of latch 333, and in a similar fashion, the Q2 output of counter 327 is connected to a first input of an AND gate 346 whose output is connected to the set input of latch 334. Similarly, the Q3 output of counter 327 connects to a first input of an AND gate 347 while the Q4 output of counter 327 connects to a first input of 348. The output of AND gate 347 is in turn connected to the set input of latch 335 while the output of AND gate 348 is in turn connected to the set input of latch 336. The Q1 output of counter 328 is connected to a first input of AND gate 349 whose output is connected to the set input of latch 337. The set input of latch 338 is connected to the output of AND gate 350 whose first input is connected to the Q2 output of counter 328. Finally, the Q3 output of counter 328 is connected to a first input of AND gate 351 whose output is connected to the set input of latch 339 while the Q4 output of counter 328 is connected to a first input of an AND gate 352 whose output is connected to the set input of latch 340.

The second input of each of the AND gates 341-352 is connected to latch strobe line 325 as shown in FIG. 4F. As described earlier, during programming in response to the initial actuation of start switch 154 at a time when power is available for energizing the motor following a reset pulse, when the door has already moved in the up direction for at least one and one-half seconds without an obstruction being sensed by the obstruction detector circuit, the programming circuit generates a latch strobe pulse after a short pause following the detection of the mechanical stop by the obstruction detector circuit when the door reaches the up limit of travel. In response to a latch strobe pulse, AND gates 341-352 are enabled by the latch strobe pulse on line 325 so that the count contained in 12-bit up/down counter 326-328 is stored in the latches 329-340. As indicated earlier, the pulse duration of the latch strobe pulse is 8.3 milliseconds and occurs after a short pause following motor shutdown until after cessation of coasting, recoil, etc. of the door operating mechanism.

Since latches 329-340 are initially reset so that a logic zero state initially appears at the Q output of each of the latches 329-340, those bits of the number contained in 12-bit up/down counter 326-328 which are zeroes will not cause any change in the latch outputs. On the other hand, those bits of the number contained in 12-bit up/down counter 326-328 which are ones will result in logic one states at the Q outputs of the latches.

The number stored in the latch circuit is actually 16 less than the true position of the door at the end of programming comprising the up limit setpoint when the door is opened again, thereby preventing the door from being driven against the mechanical stop each time the door is opened. The stored number in the latch circuit can be compared to the number contained in the 12-bit up/down counter 326-328 for determining whether or not the up motor winding should be de-energized as the door is moved in the up direction.

Storage of the up limit setpoint in the latch circuit completes a first portion of programming, but a second portion of programming is necessary as will now be explained. After programming the up limit setpoint by storing the number contained in the up/down counter circuit in the latch circuit, the 12-bit up/down counter 326-328 must be incremented 16 additional counts by the programming circuit in order to correct for the initial offset preset into the 12-bit up/down counter 326-328 as will now be explained so that at the end of programming the count contained in the up/down counter circuit corresponds to the actual position of the door.

Referring back to the programming circuit shown in FIG. 4B, 8.3 milliseconds after the latch strobe pulse appears on latch strobe line 325, the output of NAND gate 321 again transposes to a logic zero state. Consequently, the outputs of inverter 322, OR gate 320, and AND gate 319 sequentially transpose to a logic one state so that flip-flop 311 is clocked again.

When flip-flop 311 is clocked again, a logic zero state appears at the Q output and a logic one state appears at the $\overline{Q}$ output of flip-flop 311. The $\overline{Q}$ output of flip-flop 311 is connected to the second input of an AND gate 353 whose first input is connected to the $\overline{Q}$ output of flip-flop 312. As described earlier, the Q output of flip-flop 312 is initially at a logic zero state. Consequently, when the $\overline{Q}$ output of flip-flop 311 transposes to a logic one state 8.3 milliseconds after a latch strobe pulse appears on line 325, the output of AND gate 353 which is connected to the clock input of flip-flop 312 transposes to a logic one state. As a result, flip-flop 312 is clocked so that a logic one state appears at the Q output and a logic zero state appears at the Q̄ output of flip-flop 312.

As shown in FIG. 4B, the Q̄ output of flip-flop 311 is connected to a first input of an AND gate 354. A second input of AND gate 354 is connected to the Q output of flip-flop 312 while the other input of AND gate 354 is connected to line $V_{DD}$. Consequently, 8.3 milliseconds after a latch strobe pulse appears on latch strobe line 325 for storing the up limit setpoint in the latch circuit, the output of AND gate 354 transposes to a logic one state.

The output of AND gate 354 is connected by a line 355 to the second input of OR gate 242 whose output is connected to the up/down control input of each of the counters 326, 327, and 328 in the up/down counter circuit. Consequently, when the output of AND gate 354 transposes to a logic one state, the 12-bit up/down counter 326–328 is enabled for counting in the up direction.

Furthermore, another AND gate 359 also has a first input connected to the Q̄ output of flip-flop 311 and a second input connected to the Q output of flip-flop 312. The third input of AND gate 359 is connected to the output of inverter 291 whose input is connected to the 60 Hz. timing reference. As a result, a series of 8.3 millisecond wide pulses appears at the output of AND gate 359.

The output of AND gate 359 is connected to the second input of OR gate 244 whose output is connected to clock line 245 which in turn is connected to the clock input of each of the counters 326, 327, and 328 in the up/down counter circuit. Consequently, a series of 8.3 millisecond wide pulses appears at the clock input of each of the counters 326, 327, and 328 for clocking the 12-bit up/down counter to count upwardly. After 16 pulses have been counted up by the 12-bit up/down counter, counting ceases as will now be explained.

The programming circuit also includes a NAND gate 356 whose first input is connected to the Q̄ output of flip-flop 311. A second input of NAND gate 356 is connected to the Q output of flip-flop 312. Outputs Q1–Q4 of counter 186 are connected to third through sixth inputs of NAND gate 356 while a seventh input of AND gate 356 is connected to the output of an inverter 357 whose input is connected to the Q5 output of counter 186. Finally, an eighth input of NAND gate 356 is connected to the output of inverter 162 so that the 60 Hz. timing reference appears at the input of NAND gate 356.

After the 12-bit up/down counter counts up 16 pulses, the count in the 12-bit up/down counter represents the actual door position. The output of NAND gate 356 transposes to a logic zero state after the 16 pulses are counted.

The output of NAND gate 356 is connected to the input of an inverter 358 whose output is connected to the second input of OR gate 320 so that a logic one state appears at the second input of OR gate 320. Consequently, the output of AND gate 319 transposes to a logic one state, and flip-flop 311 is clocked so that a logic one state appears at the Q output and a logic zero state appears at the Q̄ output of flip-flop 311.

When the Q̄ output of flip-flop 311 transposes to a logic zero state, the outputs of AND gate 354 and 359 transposes to a logic zero state, and the up/down counter circuit ceases to count any more 60 Hz. pulses.

As described earlier, the Q output of flip-flop 311 is connected to the first input of an AND gate 317, and the Q output of flip-flop 312 is connected to the second input of AND gate 317. Consequently, after the 16 60 Hz. pulses has been counted, the output of AND gate 317 transposes to a logic one state, and in turn, the output of inverter 316 transposes to a logic zero state, thereby disabling AND gate 315 whose output is connected to the input of inverter 318. Consequently, the output of inverter 318 transposes to a logic one state which appears on start inhibit line 170 so that start switch 154 is no longer inhibited.

Also, as described above, the output of inverter 316 is connected to the input of AND gate 319. Consequently, at the end of programming when the Q output of each of the flip-flops 311 and 312 transposes to a logic one state so that a logic one state appears at the output of AND gate 317, the logic zero state which sequentially appears at the output of inverter 316 disables AND gate 319 so that no further clock pulses are applied to the clock input of flip-flop 311. As a result, the programming circuit is inhibited and will remain inhibited until a counter reset pulse is generated by the lockup circuit.

After programming, the up limit setpoint is stored in the latch circuit and the 16 count offset is corrected so that the count in 12-bit up/down counter 326–328 represents the actual position of the door. Also, the inhibit is removed from start switch 154 so that the control circuitry is responsive to a subsequent actuation of the start switch. Furthermore, at the end of programming, a logic one state will appear at the Q output of flip-flop 310 in order to indicate that programming has taken place.

Comparator Circuit

Once programming has been completed and the up limit setpoint is stored in the latch circuit and the count in the 12-bit up/down counter has been corrected, the door is ready to be moved between the up limit setpoint and the threshold or down limit. Controlled movement of the door in the up or down direction is as described previously in connection with operation of start switch 154. In order to ascertain when the door has reached the up limit setpoint and the down limit, the control circuitry includes a comparator circuit and a decoder circuit.

The comparator circuit as shown in FIG. 4F comprises 12 EXCLUSIVE NOR gates 360–371. A first input of EXCLUSIVE NOR gate 360 is connected to the Q1 output of counter 326 while a first input of EXCLUSIVE NOR gate 361 is connected to the Q2 output of counter 326. The Q3 output of counter 326 is connected to a first input of EXCLUSIVE NOR gate 362, and the Q4 output of counter 326 connects to a first input of EXCLUSIVE NOR gate 363. A first input of EXCLUSIVE NOR gate 364 is connected to the Q1 output of counter 327, and the Q2 output of counter 327 connects to a first input of EXCLUSIVE NOR gate 365. A first input of EXCLUSIVE NOR gate 366 is connected to the Q3 output of counter 327 while the first input of EXCLUSIVE NOR gate 367 is connected to the Q4 output of counter 327. The Q1 output of counter 328 is connected to a first input of EXCLUSIVE NOR gate 368, the Q2 output of counter 328 is connected to a first input of EXCLUSIVE NOR gate 369, and the Q3 output of counter 328 is connected to a first input of EXCLUSIVE NOR gate 370. Finally, a first input of EXCLUSIVE NOR gate 371 is connected to the Q4 output of counter 328.

The Q outputs of each of the latches in the latch circuit also are connected to the comparator circuit. As shown in FIG. 4F, the respective Q outputs of latches 329–340 connect to respective second inputs of EXCLUSIVE NOR gates 360–371.

As a result, a bit-by-bit comparison is made between the number contained in the 12-bit up/down counter, which represents the actual door position, and the count which represents the up limit setpoint stored in the latch circuit during programming. Each time that a bit indicated by the logic state of one of the Q outputs of the counters 326, 327, and 328 connected to a particular EXCLUSIVE NOR gate is the same as the logic state at the output of the latch connected to the second input of the particular EXCLUSIVE NOR gate, the output of the particular EXCLUSIVE NOR gate transposes to a logic one state, but, otherwise, the output of the EXCLUSIVE NOR gate will be at a logic zero state. The bit-by-bit comparison by the comparator circuit as the door moves in the up direction is determinative of whether or not to de-energize the up motor winding as will be explained shortly in connection with the description of the decoder circuit.

Decoder Circuit

The purpose of the decoder circuit is for determining when the door reaches certain predetermined positions as the door is moved in the down direction as well as when the door is moved in the up direction. The decoder circuit determines when the door reaches a predetermined position above the threshold as the door is moved in the down direction in response to actuation of start switch 154, such as after programming, for inhibiting reversal of the door if an obstruction is encountered as the door to be moved in the down direction and instead merely de-energizes the down motor winding to stop the door. The decoder circuit otherwise determines when the door reaches the threshold and de-energizes the down motor winding when the door is fully closed. In response to a subsequent actuation of start switch 154, the up motor winding is energized, and the decoder circuit determines when the door reaches the up limit setpoint whereupon the up motor winding is de-energized to stop the door.

As described earlier, in response to a reset pulse, a logic one state pulse appears on counter reset line 283. Since counter reset line 283 is connected to the reset input of flip-flop 310 included in the programming circuit, flip-flop 310 is reset each time a reset pulse is generated by the reset circuit.

Each time flip-flop 310 is reset, the $\overline{Q}$ output of flip-flop 310 will be at a logic one state which indicates that programming is needed. Furthermore, each time flip-flop 310 is reset, the Q output of flip-flop 310 transposes to a logic zero state.

The Q output of flip-flop 310 is connected by a line 372 to a first input of an AND gate 373 whose output is connected by a line 374 to a second input of OR gate 301. The output of OR gate 301 as described earlier connects to the third input of OR gate 142 whose output is in turn connected to the reset input of motor run flip-flop 143. When the Q output of flip-flop 310 is at a logic zero state, AND gate 373 is disabled, and, consequently, the decoder circuit is inhibited from resetting motor run flip-flop 143.

Furthermore, line 372 is connected to second and third inputs of a NAND gate 375 whose output is connected to the input of an inverter 376. In response to the logic zero state at the Q output of flip-flop 310, the output of NAND gate 375 transposes to a logic one state which in turn means that the output of inverter 376, which is connected to second and third inputs of NOR gate 298, transposes to a logic zero state.

Also, since as mentioned earlier a logic one state pulse appears at the output of OR gate 183 in response to a reset pulse which resets latch 281 so that the Q output of latch 281 is at a logic zero state, a logic state initially appears on line 297. As explained earlier, latch 281 is set when the Q8 output of counter 186 transposes to a logic one state approximately one and one-half seconds after the door commences movement in the up direction. However, if start switch 154 is released within two seconds, start switch held flip-flop 140 is reset so that a logic zero state remains on line 297.

Line 297 is connected to the first input of AND gate 296. Consequently, since a logic zero state initially appears on line 297, the output of AND gate 296, which is connected to the first input of NOR gate 298, is at a logic zero state. As a result, the output of NOR gate 298 transposes to a logic one state so that AND gate 272 is enabled. Therefore, before programming, door movement will be reversed if an obstruction is encountered so that the door will be returned to the up position even if the obstruction is encountered below the position where the door reaches a predetermined distance above the threshold. In other words, the reverse inhibit is disabled, and the decoder circuit does not affect operation of the other portions of the control circuitry until after programming.

During programming, as previously described, flip-flop 310 is clocked so that a logic one state appears at the Q output of flip-flop 310. As a result, a logic one state appears on line 372. Consequently, AND gate 373 is no longer disabled. Also, the output of NAND gate 375 is no longer constrained to be at a logic one state so that the reverse inhibit line is allowed to assume a logic zero state if the other necessary conditions are fulfilled.

After programming, the up limit setpoint is stored in the latch circuit, and the actual position of the door will be encoded by the count contained in the 12-bit up/down counter. Since the door is fully open at the end of programming, in response to actuation of start switch 154, the down motor winding will be energized so that the door will be moved in the down direction.

After the door reaches a predetermined distance above the threshold as the door is moved in the down direction, reversal of the door preferably is inhibited if an obstruction is sensed by the obstruction detector circuit. Inhibit of door reversal at or below a predetermined distance, for example, two inches, above the floor is desired because of the possibility of snow or ice or small obstructions such as a rake handle that might be present at the lower point of door travel near the threshold. Consequently, the door is preferably not reversed if a small obstruction or the presence of snow or ice is sensed by the obstruction detector circuit when the door is approximately two inches or less from the floor. Instead, the down motor winding is simply de-energized so that the door stops at the point of obstruction. In order to implement the reverse inhibit at a predetermined distance above the threshold, the decoder determines when a predetermined count, corresponding to the distance above the threshold below which reversal of the door is no longer desired, is reaches as the 12-bit up/down counter counts down in response to clock pulses generated by the encoder pulse verification circuit while the door is moved in the down direction.

To that end, the decoder circuit includes a NOR gate 388 whose first through eighth inputs are respectively connected to the Q2–Q4 outputs of counter 327, the Q1–Q4 outputs of counter 328, and common. Consequently, if the Q2–Q4 outputs of counter 327 and the Q1–Q4 outputs of counter 328 are at a logic zero state, the output of NOR gate 388 transposes to a logic one state. Furthermore, the decoder circuit includes a NAND gate 389 whose first and second inputs are connected to the Q4 output of counter 326 and whose third input is connected to the Q1 output of counter 327. Consequently, if the Q4 output of counter 326 and/or the Q1 output of counter 327 are at a logic zero state, the output of NAND gate 389 transposes to a logic one state. Finally, the decoder circuit includes a NAND gate 390 whose first and second inputs are connected to the Q3 output of counter 326 and whose third input is connected to the Q1 output of counter 327. Consequently, if the Q3 output of counter 326 and/or the Q1 output of counter 327 are at a logic zero state, the output of NAND gate 390 transposes to a logic one state.

Effectively, NOR gate 388, NAND gate 389, and NAND gate 390 all transpose to a logic one state in response to counts contained in the 12-bit up/down counter which are 19 or less. Since each count represents a distance approximately 3/32", 19 counts and less represents approximately two inches and less above the threshold as the predetermined distance below which reversal of the door is inhibited.

The output of each of the NAND gates 389 and 390 and the output of NOR gate 388 as well as line $V_{DD}$ are connected to first through fourth inputs of a NAND gate 391 whose output is connected to the input of an inverter 392 as shown in FIG. 4F. The output of inverter 392 is in turn connected to first and second inputs of an OR gate 386 whose output is connected to the fourth input of NAND gate 375. Consequently, when the outputs of NAND gates 389 and 390 and the output of NOR gate 388 transpose to a logic one state when the count in the 12-bit up/down counter is 19 or less, the output of NAND gate 391 transposes to a logic zero state which means that the outputs of inverter 392 and OR gate 386 sequentially transpose to a logic one state. Consequently, a logic one state will appear at each of the inputs of NAND gate 375. As a result, the output of NAND gate 375 transposes to a logic zero state, and the output of inverter 376 transposes to a logic one state which appears at the second and third inputs of NOR gate 298 so that the output of NOR gate 298 transposes to a logic zero state which appears on reverse inhibit line 273.

If a logic zero state appears on reverse inhibit line 273, AND gate 272 is disabled so that direction flip-flop 138 is not clocked in response to a logic one state at the output of AND gate 266 when an obstruction is sensed by the obstruction detector circuit as the door is moved in the down direction. Furthermore, since reverse inhibit line 273 is connected to the input of inverter 299, when a logic one state appears on reverse inhibit line 273, AND gate 300 is enabled which means that if an obstruction is sensed by the obstruction detector circuit so that the outputs of AND gates 264 and 266 sequentially transpose to a logic one state, the outputs of AND gate 300, OR gate 301, and OR gate 142 sequentially transpose to a logic one state, and motor run flip-flop 143 is reset so that the down motor winding is merely de-energized and movement of the door stops when an obstruction is encountered.

As described earlier, when the down motor winding is energized, the output of AND gate 147, which is connected to a first input of AND gate 377, is at a logic one state. On the other hand, since the up motor winding is not energized, the output of AND gate 144 is at a logic zero state. The output of AND gate 144 is connected to a first input of an AND gate 380. Consequently, AND gate 377 will be enabled, and AND gate 380 will be disabled as the door moves in the down direction away from the fully open position. Since AND gate 380 is disabled, the door moves through the position indicated by the up limit setpoint and continues to move in the down direction. As will be explained shortly, the door reaches a position a predetermined distance above the threshold below which reversal of the door is inhibited if an obstruction is encountered and usually continues to be moved in the down direction until the count in 12-bit up/down counter reaches zero whereupon the down motor winding is de-energized.

In order to determine when the count in the 12-bit up/down counter reaches zero, the Q1–Q4 outputs of counter 326 and the Q1–Q4 outputs of counter 327 are respectively connected to the first through eighth inputs of a NOR gate 381 whose output is connected to a second input of AND gate 377. Furthermore, the Q1, Q3, and Q4 outputs of counter 328 are respectively connected to the first through third inputs of an OR gate 382 whose output is connected to a first input of a NOR gate 383. The Q2 output of counter 328 is connected directly to a second input of NOR gate 383. The third input of NOR gate 383 is connected to line 297 which as described above will be at a logic zero state if start switch 154 is released within two seconds following actuation. The output of NOR gate 383 is in turn connected to the third input of AND gate 377.

When the 12-bit up/down counter in response to a logic zero state which appears on count up/down line 243 at the up/down control input of each of the counters 326–328 and clock pulses which appear on clock pulse line 245 at the clock input of each of the counters 326–328 counts down to zero, that is, counts down to where the Q1–Q4 outputs of each of the counters 326–328 are all at a logic zero state, the output of each of the NOR gates 381 and 383 transposes to a logic one state. Consequently, the output of AND gate 377 transposes to a logic one state which appears at the second input of OR gate 301. As a result, the output of OR gates 301 and 142 sequentially transpose to a logic one state, and motor run flip-flop 143 is reset so that a logic zero state appears at the Q output of motor run flip-flop 143. Therefore, the output of AND gate 147 transposes to a logic zero state, and the down motor winding is de-energized.

There is a possibility that the floor could move downwardly with respect to the programmed zero position after initial programming has taken place, such as due to settling of the ground beneath the floor or movement of the floor caused by freezing and thawing, for example. Consequently, the decoder circuit preferably assures that the door is stopped during downward movement even if the door should coast through the zero count in the up/down counter to the binary number 111111111111 and beyond. To that end, the decoder circuit includes a NAND gate 384 whose first through eighth inputs are connected to the Q1–Q4 outputs of each of the counters 327 and 328, respectively. Consequently, if the counters 326, 237, and 328 count through 000000000000 in the down direction to count 111111111111, 111111111110, 111111111101, and beyond in the minus direction, the Q1–Q4 outputs of each of the counters 327 and 328 will transpose from a logic zero state to a logic one state. As a result, the output of NAND gate 384 will transpose to a logic zero state.

The output of NAND gate 384 is connected to the input of an inverter 385 whose output is connected to the third input of OR gate 386. Consequently, if the output of NAND gate 384 transposes to a logic zero state, the outputs of inverter 385 and OR gate 386 sequentially transpose to a logic one state. As a result, since the output of OR gate 386 is connected to the fourth input of NAND gate 375 as described above, the output of NAND gate 375 transposes to a logic zero state, and the output of inverter 376 transposes to a logic one state. Therefore, the output of NOR gate 298 transposes to a logic zero state which appears on reverse inhibit line 273. Therefore, motor run flip-flop 143 is reset if the obstruction detector circuit senses an obstruction so that the down motor winding is merely de-energized and movement of the door stops when an obstruction is encountered as described above.

In response to actuation of start switch 154 after the door is closed following programming will cause the door to be moved in the up direction. As the door is opened, a logic one state appears on count up/down line 243 so that the 12-bit up/down counter counts up in response to clock pulses which appear on clock pulse clock pulse line 245. As the 12-bit up/down counter counts up, the comparator circuit continuously compares on a bit-by-bit basis the count contained in counters 326–328 with the up limit setpoint stored in the latch circuit. When the count contained in the 12-bit up/down counter reaches the up limit setpoint stored in the latch circuit, the output of each of the EXCLUSIVE NOR gates 360 through 371 included in the comparator circuit transposes to a logic one state.

Insofar as the decoder circuit is concerned, a NAND gate 393 is included which has first through eighth inputs connected respectively to the outputs of EXCLUSIVE NOR gates 360 and 361 and 366–371. Furthermore, the decoder circuit includes a NAND gate 394 which has first through fourth inputs connected to the outputs of EXCLUSIVE NOR gates 362 through 365, respectively, while the other inputs of NAND gate 394 connected to line $V_{DD}$.

The output of each of the EXCLUSIVE NOR gates 360 through 371 will transpose to a logic one state when the count in the 12-bit up/down counter equals the up limit setpoint stored in the latch circuit. Consequently, the output of each of the NAND gates 393 and 394 will transpose to a logic zero state.

As shown in FIG. 4F, the output of NAND gate 393 is connected to the input of an inverter 395 whose output is connected to a first input of an AND gate 396. The second input of AND gate 396 is connected to the output of an inverter 397 whose input is connected to the output of NAND gate 394. The output of AND gate 396 is in turn connected to a second input of AND gate 380.

When the output of each of the NAND gates 393 and 394 transposes to a logic zero state when the count contained in the 12-bit up/down counter equals the up limit setpoint stored in the latch circuit, the output of each of the inverters 395 and 397 transposes to a logic one state. Consequently, the output of AND gate 396 transposes to a logic one state. As a result, since the first input of AND gate 380 is at a logic one state as the door is moved in the up direction, the output of AND gate 380 transposes to a logic one state.

The output of AND gate 380 is connected to first and second inputs of a NOR gate 378 whose output is connected to the input of an inverter 379. The output of inverter 379 is in turn connected to the second input of AND gate 373 as described earlier. When the output of AND gate 380 transposes to a logic one state when the count contained in the 12-bit up/down counter equals the up limit setpoint stored in the latch circuit, the output of NOR gate 378 transposes to a logic zero state, and the output of inverter 379 in turn transposes to a logic one state. Since programming has taken place, a logic one state will appear on line 372, and, therefore, the output of AND gate 373 will transpose to a logic one state which appears on line 374 which as described earlier is connected to the second input of OR gate 301. Consequently, the outputs of OR gates 301 and 142 sequentially transpose to a logic one state so that motor run flip-flop 143 is reset. As a result, the output of AND gate 144 transposes to a logic zero state so that the up motor winding is de-energized. Therefore, due to the combined operation of the up/down counter circuit, the latch circuit, the comparator circuit, and the decoder circuit, the up motor winding is de-energized when the door reaches the up limit setpoint.

The up limit setpoint can be reset easily simply by holding start switch 154 in the actuated condition until the door reaches the threshold whereupon the programming circuit, counter circuit, and latch circuit are reset. The up limit setpoint is thereafter reset the next time that start switch is actuated and the door is moved in the up direction.

As described earlier, if start switch 154 is held in the actuated condition, start switch held flip-flop 140 is not reset. Consequently, the Q output of start switch held flip-flop 140 remains at a logic one state. As a result, when counter 186 counts a sufficient number of 60 Hz. pulses such that a time of approximately two seconds elapses while start switch 154 is held in the actuated condition, latch 281 is set, and the output of AND gate 153 transposes to a logic one state which appears on line 297. Since as described earlier line 297 is connected to the third input of NOR gate 383, NOR gate 383 will be disabled so that if a zero count is contained in the 12-bit up/down counter, nevertheless, the door will continue to be moved until the threshold is sensed by the obstruction detector circuit whereupon the output of AND gate 266 transposes to a logic one state which appears at a first input of AND gate 300. The other two inputs of AND gate 300 as described earlier are respectively connected to the output of AND gate 264, whose output will transpose to a logic one state if an obstruction is sensed more than one-half second after the down motor winding is energized, and to the output of inverter 299, whose input is connected to reverse inhibit line 273.

Reverse inhibit line 273 will be at a logic zero state since reverse inhibit line 273 is connected to the output of NOR gate 298 whose first input is connected to the output of AND gate 296, and AND gate 296 has first and second inputs respectively connected to line 297, which is at a logic one state while start switch 154 is held in the actuated condition, and to line 295, which is connected to the $\overline{Q}$ output of direction flip-flop 138 which is at a logic one state while the down motor winding is energized. Consequently, when the threshold is sensed by the obstruction detector circuit, the outputs of AND gate 300 and OR gates 301 and 142 sequentially transpose to a logic one state. As a result, motor run flip-flop 143 is reset, and the down motor winding is de-energized.

Furthermore, when the obstruction detector circuit senses the threshold and the output of AND gate 266 transposes to a logic one state, the output of AND gate 294 shown in FIG. 4B transposes to a logic one state. Since the second input of OR gate 282 is connected to the output of AND gate 294, when the output of AND gate 294 transposes to a logic one state, the output of OR gate 282 transposes to a logic one state which appears on counter reset line 283 for resetting the programming circuit, up/down counter circuit, and latch circuit and inhibiting the decoder circuit. Programming will then take place in response to movement of the door in the up direction in response to the next actuation of start switch 154.

As shown in FIG. 4D, the Q12 output of counter 186 is connected to the third input of OR gate 301. As described earlier, the output of OR gate 301 is connected to the third input of OR gate 142 whose output is in turn connected to the reset input of motor run flip-flop 143. Consequently, if a sufficient number of 60 Hz. pulses is counted by counter 186 before the door is moved from either the down limit to the up limit setpoint or from the up limit setpoint to the down limit, the Q12 output of counter 186 transposes to a logic one state. As a result, the output of each of the OR gates 301 and 142 will sequentially transpose to a logic one state so that motor run flip-flop 143 is reset, and the up motor winding or the down motor winding will be de-energized. The time required for counter 186 to count a sufficient number of 60 Hz. pulses so that the Q12 output transposes to a logic one state is longer than normally required for the door to be moved in either direction from one limit of travel to the other and is preferably about 32 seconds. Consequently, the Q12 output of counter 186 will only transpose to a logic one state and cause de-energization of the motor only if an abnormal condition exists, such as if the motor and operating mechanism or the operating mechanism and the door become disengaged or if an element of the control circuitry fails.

Finally, the Q12 output of counter 186 is also connected to the input of an inverter 430 whose output is connected to the clock input of lamp flip-flop 201. As described earlier, counter 186 and lamp flip-flop 201 are reset in response to a reset pulse so that a logic zero state initially appears at each of the Q outputs of counter 186 and at the Q̄ output of lamp flip-flop 201 while a logic one state initially appears at the Q output of lamp flip-flop 201. The Q̄ output and the D input of lamp flip-flop 201 are interconnected so that a logic one state initially appears at the D input of lamp flip-flop 201.

After counter 186 reaches a maximum count, in response to the next 60 Hz. pulse, each of the Q outputs of counter 186 transposes from a logic one state to a logic zero state. Since the Q12 output of counter 186 is connected to the input of inverter 430, when the Q12 output of counter 186 transposes to a logic zero state, the output of inverter 430 transposes to a logic one state, and lamp flip-flop 201 is clocked so that a logic one state appears at the Q output of lamp flip-flop 201.

The Q output of lamp flip-flop 201 is connected to a first input of an AND gate 431. The output of AND gate 431 is connected to the second input of OR gate 204 whose output is in turn connected to the reset input of lamp latch 188 as described previously. The second input of AND gate 431 is connected to the Q12 output of counter 186.

A logic one state appears at the Q output of lamp flip-flop 201 after counter 186 reaches a maximum count. Consequently, when counter 186 again reaches a count where the Q12 output of counter 186 transposes to a logic one state, such as 102 seconds after start switch 154 is actuated, the outputs of AND gate 431 and OR gate 204 sequentially transpose to a logic one state. As a result, lamp latch 188 is reset, and the Q output of lamp latch 188 transposes to a logic zero state.

As described earlier, the Q output of lamp latch 188 is connected to the first input of AND gate 307 whose output is in turn connected to the first input of OR gate 305. Consequently, when lamp latch 188 is reset approximately 102 seconds after start switch 154 is actuated, the outputs of AND gate 307 and OR gate 305 transpose to a logic zero state. As a result, the lamp which illuminates the region near the door is de-energized.

Values and types for various components are shown in FIG. 4 for a preferred construction of the various circuits. However, the values and types are given by way of example only and not by way of limitation.

As can now be appreciated, the door operator control system of the invention overcomes the disadvantages of known door operator control systems by completely eliminating mechanically actuated position switches, such as closed limit, open limit, and reverse override switches, for not only simplifying construction and reducing cost but also for facilitating installation and reducing required maintenance. Nor is obstruction detection means used in the place of limit switches. Consequently, there is no reduction in the life of the door operator since no additional mechanical stress is imposed. The door operator control system of the invention instead includes an encoder and associated control circuitry for controlling energization of the motor based on the encoded position of the door.

The preferred embodiment for the door operator control system of the invention includes an optical encoder. However, any type of encoder can be used, such as a disc having magnets mounted thereon for closing offset reed switches as the disc is rotated by the motor. A non-contact type of encoder is preferred.

Various modifications such as inclusion of a backup battery so that the up limit setpoint need not be set again if a power failure occurs, use of an RF transmitter and receiver combination in addition to or as a substitute for a start switch, and so forth have been described. A non-volatile memory might also be substituted for the up/down counter output circuitry and latch circuit.

The preferred embodiment for the door operator control system of the invention includes control circuitry implemented in CMOS integrated circuitry. However, the control circuitry can be constructed using PMOS, NMOS, TTL, IIL integrated circuit technology. The method of the control system could also be implemented by means of a microprocessor.

Other modifications may also appear to those of skill in the art which are within the spirit of the invention. In order to ascertain the true scope of the invention, reference must be made to the appended claims.

I claim:

1. A control system for a door operator, said door operator including an operating mechanism connected to a door and a motor for actuating said operating mechanism for moving said door in either direction between a closed position and an open position, said control system comprising:

a selectively actuable start switch means;

control circuitry connected to said start switch means and to said motor for selectively controlling energization of said motor for moving said door in either direction from one of said closed and open positions to the other of said positions in response to actuation of said start switch means; and an encoder driven by said motor during movement of said door;

said control circuitry including circuit means associated with said encoder for detecting the direction of movement of said door as well as increments of travel by said door;

said control circuitry energizing said motor for moving said door in said detected direction from one of said closed and open positions toward the other of said positions;

said control circuitry de-energizing said motor when the sum of said detected increments of travel equals the distance between said closed and open positions.

2. A control system for a door operator, said door operator including an operating mechanism connected to a door and a motor for actuating said operating mechanism for moving said door in either direction between a closed position and an open position, said control system comprising:

a selectively actuable start switch means;

a motor command circuit connected to said start switch means and to said motor for energizing said motor for moving said door in either direction from one of said closed and open positions toward the other of said positions in response to actuation of said start switch means;

a encoder driven by said motor during movement of said door;

an encoder pulse verification circuit connected to said encoder for detecting the direction of movement of said door as well as increments of travel by said door;

an up/down counter circuit connected to said encoder pulse verification circuit for counting said increments of travel in a first direction during movement of said door from said closed position to said open position and for counting said increments of travel in a second direction during movement of said door from said open position to said closed position; and circuit means connected to said up/down counter circuit and to said motor command circuit for detecting when the count in said up/down counter circuit indicates that said door has been moved from one of said closed and open positions to the other of said positions;

said motor command circuit de-energizing said motor in response to detection by said circuit means that said door has been moved from one of said closed and open positions to the other of said positions.

3. The control system in claim 2 wherein said circuit means includes:

a latch circuit connected to said up/down counter for initially storing an up limit setpoint;

a comparator circuit connected to said up/down counter and to said latch circuit for comparing the count in said up/down counter circuit with the up limit setpoint stored in said latch circuit; and a decoder circuit connected to said up/down counter circuit, comparator circuit, and motor command circuit for detecting when the count contained in said up/down counter circuit coincides with said up limit setpoint, thereby indicating that said door has been moved from one of said closed and open positions to the other of said positions, and for detecting when the count in said counter is not greater than zero, thereby indicating that said door has been moved from one of said closed and open positions to the other of said positions;

said motor command circuit de-energizing said motor in response to detection by said circuit means that said door has been moved from one of said closed and open positions to the other of said positions.

4. The control system in claim 3 further comprising:

an obstruction detector circuit connected to said motor command circuit and to said encoder pulse verification circuit for detecting when the rate of travel by said door is not greater than at least one predetermined rate;

said motor command circuit de-energizing said motor in response to detection by said obstruction detector circuit during movement of said door from said closed position toward said open position that the rate of travel by said door is not greater than said predetermined rate;

said motor command circuit reversing said motor in response to detection by said obstruction detector circuit during movement of said door from said open position toward said closed position that the rate of travel by said door is not greater than said predetermined rate.

5. The control system in claim 4 wherein said obstruction detector circuit includes at least one oscillator for generating a reference frequency and wherein said obstruction detector circuit detects when the rate of travel by said door is not greater than a predetermined rate proportional to said reference frequency, said motor command circuit de-energizing said motor in response to detection by said obstruction detector circuit during movement of said door from said closed position toward said open position that the rate of travel by said door is not greater than said predetermined rate proportional to said reference frequency, said motor command circuit reversing said motor in response to detection by said obstruction detector circuit during movement of said door from said open position toward said closed position that the rate of travel by said door is not greater than said predetermined rate proportional to said reference frequency.

6. The control system in claim 5 wherein said obstruction detector circuit includes a first oscillator for generating a first reference frequency and a second oscillator for generating a second reference frequency and wherein said obstruction detector circuit detects when the rate of travel by said door is not greater than a first predetermined rate proportional to said first reference frequency and when the rate of travel by said door is not greater than a second predetermined rate proportional to said second reference frequency, said motor command circuit de-energizing said motor in response to detection by said obstruction detector circuit during movement of said door from said closed position toward said open position that the rate of travel by said door is not greater than said first predetermined rate, said motor command circuit reversing said motor in response to detection by said obstruction detector circuit during movement of said door from said open position toward said closed position that the rate of travel by said door is not greater than said second predetermined rate.

7. The control system in claim 5 wherein said obstruction detector circuit further includes an oscillator failure detection circuit for detecting absence of said reference frequency, said motor command circuit de-energizing said motor in response to detection of the absence of said reference frequency by said oscillator failure detection circuit during movement of said door from said closed position toward said open position, said motor command circuit reversing said motor in response to detection of the absence of said reference frequency by said oscillator failure detection circuit during movement of said door from said open position toward said closed position.

8. The control system in claim 5 or 7 wherein the reference frequency generated by said at least one oscillator is adjustable for setting the sensitivity of said obstruction detector circuit for detecting obstructions.

9. The control system in claim 6 wherein said obstruction detector circuit further includes an oscillator failure detection circuit for detecting absence of said first reference frequency during movement of said door from said closed position toward said open position and for detecting absence of said second reference frequency during movement of said door from said open position toward said closed position, said motor command circuit de-energizing said motor in response to detection of the absence of said first reference frequency by said oscillator failure detection circuit during movement of said door from said closed position toward said open position, said motor command circuit reversing said motor in response to detection of the absence of said second reference frequency by said oscillator failure detection circuit during movement of said door from said open position toward said closed position.

10. The control system in claim 6 or 9 wherein the first reference frequency generated by said first oscillator and the second reference frequency generated by said second oscillator are independently adjustable for independently setting sensitivities for said obstruction detector circuit for detecting obstruction's during movement of said door from said closed position toward said open position and said open position toward said closed position, respectively.

11. The control system in claim 4, 5, 6, 7, or 9, wherein said decoder circuit detects when the count contained in said up/down counter circuit is not greater than a predetermined count for inhibiting said motor command circuit from reversing said motor during movement of said door from said open position toward said closed position in response to detection by said obstruction detector circuit.

12. The control system in claim 4 further comprising: a mechanical stop positioned to be detected by said obstruction detector circuit and a programming circuit connected to said motor command circuit and said latch circuit for leading the count contained in said up/down counter into said latch circuit for setting said up limit setpoint in response to detection of the mechanical stop by said obstruction detector circuit during initial movement of said door from said closed position toward said open position.

13. The control system in claim 12 further comprising:

a lockup circuit connected to said motor command circuit and to said programming circuit and responsive to detection by said obstruction detector circuit within a predetermined time following the initial actuation of said start switch means when said up limit setpoint is not stored, for conditioning said motor command circuit to energize said motor for moving said door toward said open position in response to each subsequent momentary actuation of said start switch means.

14. The control system in claim 13 further comprising:
a selectively energizable lamp connected to said lockup circuit for illuminating the region near said door;
said lockup circuit flashing said lamp in response to each said subsequent momentary actuation of said start switch means.

15. The control system in claim 13 or 14 wherein said lockup circuit is responsive to sustained actuation of said start switch means for conditioning said motor command circuit to energize said motor for moving door toward said closed position, whereby sustaining actuation of said start switch means overrides said lockup circuit.

16. The control system in claim 15 wherein said motor command circuit is conditioned for de-energizing said motor in response to detection of the door threshold by said obstruction detector circuit when said door is moved toward said closed position in response to sustained actuation of said start switch means for overriding said lockup circuit.

17. The control system in claim 4 which further comprises means for inhibiting said obstruction detector circuit for a predetermined time following energization of said motor by said motor command circuit in response to actuation of said start switch means, whereby the inertia of said door and said operating mechanism is overcome before said obstruction detector circuit is conditioned for detecting an obstruction.

18. The control system in claim 13 further comprising:
a reset circuit connected to said motor command circuit, encoder pulse verification circuit, obstruction detector circuit, programming circuit, and lockup circuit for resetting said circuits in response to connection of power following installation of said door operator and in response to restoration of power following a power outage such as due to a storm.

19. The control system in claim 18 further comprising a manual reset switch connected to said reset circuit, said reset circuit being responsive to actuation of said manual reset switch for resetting said circuits.

20. The control system in claim 18 or 19 further comprising a backup battery connected to said reset circuit for inhibiting said reset circuit from resetting said circuits if a power outage occurs.

21. The control system in claim 18 of 19 which further includes means for resetting said motor command circuit for energizing said motor to move said door toward said open position in response to the initial actuation of said start switch means.

22. The control system in claim 12 which further includes means for presetting said up/down counter circuit so that said up limit setpoint loaded into said latch circuit is reached a predetermined distance ahead of said mechanical stop, said programming circuit and said encoder pulse verification circuit conditioning said up/down counter circuit for correcting the count contained in said up/down counter circuit after said up limit setpoint is stored.

23. The control system in claim 2 wherein said motor command circuit is responsive to a first actuation of said start switch means for energizing said motor for initially moving said door from one of said closed and open positions toward the other of said positions and is responsive to a second actuation of said start switch means for de-energizing said motor for stopping said door at a position intermediate one of said closed and open positions.

24. The control system in claim 23 wherein said motor command circuit is responsive to a third actuation of said start switch means for reversing said motor for moving said door back toward said initial position.

25. The control system in claim 2 further comprising a start circuit connected to said start switch means for preventing contact bounce of said start switch means from causing said motor command circuit to respond to release of said start switch means.

26. The control system in claim 2 further comprising:
a selectively energizable lamp energized for a predetermined time for illuminating the region near said door in response to actuation of said start switch means.

27. The control system in claim 2 further comprising:
a 60 Hz. counter circuit connected to said motor command circuit for conditioning said motor command circuit to de-energize said motor if said motor remains energized a predetermined time or longer for moving said door in either direction from one of said closed and open positions toward the other of said positions.

28. The control system in claim 12 or 22 wherein said programming circuit loads the count contained in said up/down counter into said latch circuit for setting said up limit setpoint a predetermined time after detection of said mechanical stop by said obstruction detector circuit, whereby said door and said operating mechanism come to rest before said up limit setpoint is stored.

29. A method for controlling a door operator, said door operator including an operating mechanism connected to a door and a motor for actuating said operating mechanism for moving said door in either direction between a closed position and an open position, said control system comprising:
actuating a start switch means;
controlling energization of the motor for moving the door in either direction from one of the closed and open positions toward the other of position in response to actuation of the start switch means;
driving an encoder by means of the motor during movement of the door for detecting the direction of movement of the door as well as increments of travel by the door;
energizing the motor for moving the door in the detected direction from one of the closed and open positions toward the other position; and
de-energizing the motor when the sum of the detected increments of travel equals the distance between the closed and open positions.

30. The control system of claim 18 or 19 further comprising a backup battery connected to said up/down counter circuit and to said latch circuit for maintaining storage of representations of said door position and said up limit setpoint in the event of a power outage.

* * * * *

UNITED STATES PATENT AND TRADEMARK OFFICE
CERTIFICATE OF CORRECTION

PATENT NO. : 4,338,553
DATED : July 6, 1982
INVENTOR(S) : Waller M. Scott, Jr.

Page 1 of 3

It is certified that error appears in the above-identified patent and that said Letters Patent is hereby corrected as shown below:

In column 2, line 66, between "overhead" and "door", insert --garage--.

In column 12, line 23, "136" should be --135--.

In column 13, line 32, "pule" should be --pulse--.

In column 14, line 12, the second occurrence of the word "the" should be deleted.

In column 15, line 14, between "appear" and "the", insert --at--.

In column 18, line 14, the first occurrence of the word "is" should be --as--.

In column 19, line 49, "43" should be --143--.

In column 23, line 45, "$\overline{Q}$" should be --Q--.

In column 23, line 46, "Q" should be --$\overline{Q}$--.

In column 25, line 39, before "224", insert --latch--.

In column 33, line 48, "$\overline{Q}$" should be --Q--.

In column 33, line 49, "Q" should be --$\overline{Q}$--.

In column 36, line 36, "rest" should be --reset--.

In column 37, line 29, after the first occurrence of the words "of" and "AND", insert --an--.

UNITED STATES PATENT AND TRADEMARK OFFICE
CERTIFICATE OF CORRECTION

PATENT NO. : 4,338,553
DATED : July 6, 1982
INVENTOR(S) : Waller M. Scott, Jr.    Page 2 of 3

It is certified that error appears in the above-identified patent and that said Letters Patent is hereby corrected as shown below:

In column 38, line 16, between "trigger" and "414", insert --inverter--.

In column 44, line 65, "Q" should be --$\overline{Q}$--.

In column 44, line 65, "if" should be --is--.

In column 46, line 36, "Q" should be --$\overline{Q}$--.

In column 48, line 28, "ulse" should be --pulse--.

In column 54, line 7, insert --zero-- between "logic" and "state".

In column 56, line 47, "output" should be --outputs--.

In column 56, line 67, "237" should be --327--.

In column 59, line 50, "$\overline{Q}$" should be --Q--.

UNITED STATES PATENT AND TRADEMARK OFFICE
CERTIFICATE OF CORRECTION

PATENT NO. : 4,338,553
DATED : July 6, 1982
INVENTOR(S) : Waller M. Scott, Jr.

It is certified that error appears in the above-identified patent and that said Letters Patent is hereby corrected as shown below:

In column 59, line 51, "Q" should be --$\bar{Q}$--.

In column 61, line 37, "a" should be --an--.

In column 64, line 59, "of" should be --or--.

Signed and Sealed this

Thirtieth Day of August 1983

[SEAL]

Attest:

GERALD J. MOSSINGHOFF

Attesting Officer

Commissioner of Patents and Trademarks